US005256774A

United States Patent [19]

Harms et al.

[11] Patent Number: 5,256,774

[45] Date of Patent: Oct. 26, 1993

[54] BIFUNCTIONAL REACTIVE DYESTUFFS CONTAINING THE 2-(N-SUBSTITUTED AMINO)-4-(N-PHENYLAMINO)-1,3,5-TRLAZINYL MOIETY

[75] Inventors: Wolfgang Harms, Odenthal; Thomas Eizenhöfer, Cologne, both of Fed. Rep. of Germany

[73] Assignee: Bayer Aktiengesellschaft, Leverkusen, Fed. Rep. of Germany

[21] Appl. No.: 839,460

[22] Filed: Feb. 20, 1992

[30] Foreign Application Priority Data

Feb. 28, 1991 [DE] Fed. Rep. of Germany ....... 4106255

[51] Int. Cl.[5] .................... C09B 62/503; C09B 62/04; D06P 1/38

[52] U.S. Cl. .................................... 534/612; 534/617; 534/618; 534/623; 534/625; 534/628; 534/632; 534/634; 534/635; 534/636; 534/637; 534/638; 540/126; 544/75; 544/76; 544/189; 558/29

[58] Field of Search ............... 534/612, 618, 623, 625, 534/628, 632, 635-638; 540/126; 544/75, 76, 189

[56] References Cited

U.S. PATENT DOCUMENTS

| | | | |
|---|---|---|---|
| 4,876,334 | 10/1989 | Tzikas et al. | 534/638 X |
| 5,023,326 | 6/1991 | Tzikas et al. | 534/638 X |

FOREIGN PATENT DOCUMENTS

| | | |
|---|---|---|
| 0282443 | 9/1988 | European Pat. Off. . |

*Primary Examiner*—Mary C. Lee
*Assistant Examiner*—Fiona T. Powers
*Attorney, Agent, or Firm*—Sprung Horn Kramer & Woods

[57] ABSTRACT

Improved reactive dyestuffs have the following formula

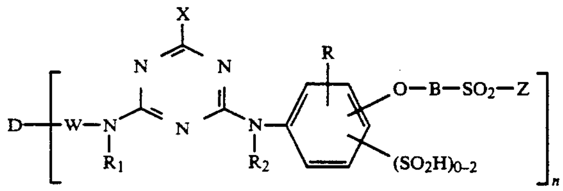

in which the substituents have the meaning given in the description.

5 Claims, No Drawings

BIFUNCTIONAL REACTIVE DYESTUFFS CONTAINING THE 2-(N-SUBSTITUTED AMINO)-4-(N-PHENYLAMINO)-1,3,5-TRLAZINYL MOIETY

The present invention relates to new reactive dyestuffs of the formula

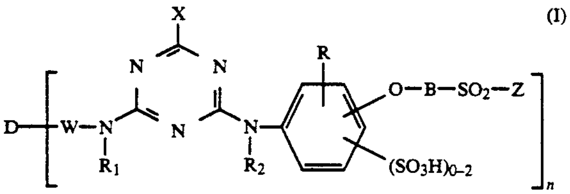

(I)

in which

D denotes a radical of an organic dyestuff,
W denotes a direct bond or bridging member,
$R_1$ denotes H or alkyl,
$R_2$ denotes H or alkyl,
R denotes H, $C_1$-$C_2$-alkyl, halogen, $C_1$-$C_4$-alkoxy,
B denotes $C_2$-$C_6$-alkylene, which, if desired, is branched and/or interrupted by hetero atoms or groups containing hetero atoms,
X denotes F, Cl,

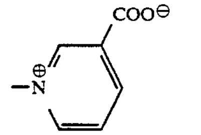

Z denotes $-CH{=}CH_2$, $-CH_2-CH_2-OSO_3H$, $-CH_2-CH_2-Cl$, $-CH_2-CH_2-Br$, $-CH_2-CH_2-S_2O_3H$, $-CH_2-CH_2-O-CO-CH_3$, $-CH_2-CH_2-OPO_3H_2$, $-CH_2-CH_2-OH$,
n denotes 1 or 2.

Examples of radicals D are those from the monoazo, polyazo, metal complex, anthraquinone, phthalocyanine, formazan, azomethine, dioxazine, phenazine, stilbene, triphenylmethane, xanthene, thioxanthone or nitroaryl series. A particularly suitable radical of an organic dyestuff is one containing one or more water-solubilising groups, in particular sulpho groups.

For the alkyl, aryl, aralkyl, hetaryl, alkoxy, halogen and acylamino radicals mentioned in the present application and for the bridging members the following applies:

Alkyl groups are understood to mean in particular those having 1 to 4 C atoms, with or without the substituents, for example halogen, such as Cl or Br, OH, CN or $OSO_3H$.

Aryl groups are understood to mean in particular phenyl radicals, with or without substituents, for example halogen, such as Cl and Br, $C_1$-$C_4$-alkyl, $C_1$-$C_4$-alkoxy, $C_1$-$C_4$-alkylsulphonyl, $NO_2$, CN, $CF_3$, $SO_3H$, COOH.

Aralkyl radicals are understood to mean in particular benzyl radicals, with or without the substituents mentioned for the phenyl radicals.

Alkoxy radicals are understood to mean in particular those having 1 to 4 C atoms.

Halogen is understood to mean in particular chlorine or fluorine.

Acylamino radicals are understood to mean in particular those having 1 to 4 C atoms, such as formylamino, acetylamino, propionylamino or n-butyrylamino.

Examples of suitable bridging members W are:

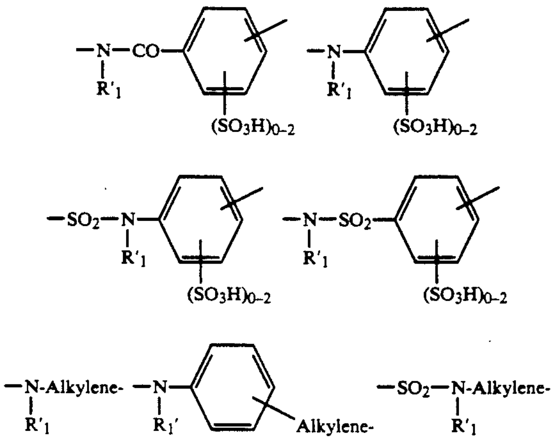

$-O$-alkylene-, -alkylene-, -alkylene-CO—, alkylene-$SO_2$—, in which $R_1$ represents hydrogen or alkyl, and alkylene denotes an alkylene radical having 1 to 6 C atoms.

Alkylene radicals are $-CH_2-$,

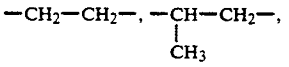

$-(CH_2)_3-$, $-(CH_2)_4-$, $-(CH_2)_6-$.

Examples of suitable aliphatic bridging members B are

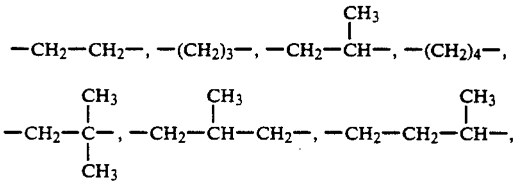

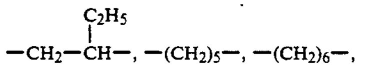

$-CH_2-CH_2O-CH_2-CH_2-$,

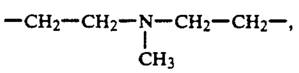

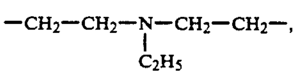

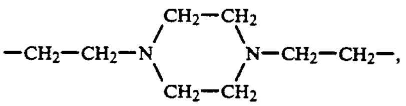

$-CH_2-CH_2-SO_2-CH_2-CH_2-$.

The present invention furthermore relates to the preparation of the reactive dyestuffs of the formula (I) by methods known per se:

a) either by condensation of dyestuffs of the formula

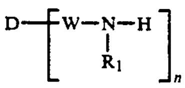

(II)

in which

D, W, $R_1$ and n have the abovementioned meaning, ps with n mol of trihalogenotriazines of the formula

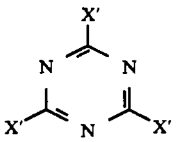

(III)

in which

X' is F, Cl to give compounds of the formula

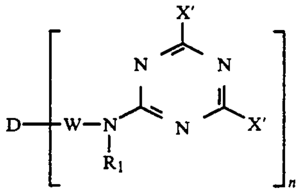

(IV)

and further condensation of the compounds of the formula (IV) with n mol of the components of the formula

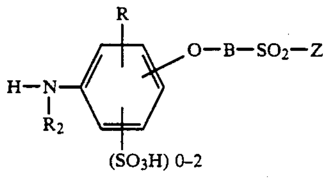

(V)

in which $R_2$, R, B and Z have the abovementioned meaning, or b) in reverse order, by condensation of trihalogenotriazines of the formula (III) with the components of the formula (V) to give the primary condensation products

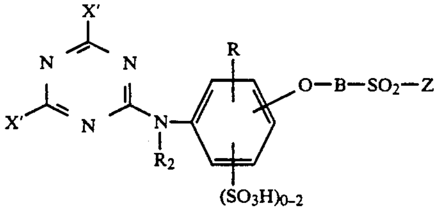

(VI)

in which

X', $R_2$, R, B and Z have the abovementioned meaning, and further condensation with n mol of the compounds of the formula (VI) with the dyestuffs of the formula (II), or c) by condensation of suitable precursors with trihalogenotriazines (III) and the components of the formula (V) or by condensation of suitable precursors with the primary condensation products of the formula (VI), followed by dyestuff synthesis, and d) if desired, by exchange of the halogen atom X' for the radical of pyridine-3-carboxylic acid in the synthesised halogenotriazine dyestuff.

The condensations of the starting components with the trihalogenotriazines are carried out irrespective of the order in aqueous or organic-aqueous media in the presence of acid-binding agents. Depending on the nature of the starting components, the first step of the condensation is carried out in pH ranges of 2 to 8, preferably 3 to 7, and at temperatures of 0° to 40° C., preferably 0° to 25° C.

Exchange of the second halogen atom of the triazine is completed in the pH range of 4 to 10, preferably 5 to 9, and in the temperature range of 0° to 60° C., preferably 0° to 30° C.

Examples of acid-binding agents are carbonates, hydroxides or phosphates, such as sodium carbonate, sodium bicarbonate, dilute sodium hydroxide solution, di-or trisodium phosphate or sodium fluoride.

If it is desired for the condensation or the dyestuff synthesis to lead directly to a dyestuff solution or to a liquid dyestuff preparation, the use of lithium carbonates or lithium hydroxide may be advantageous, if appropriate in combination with solubilising agents and/or stabilising buffer systems. Other conversion reactions of the dyestuffs or their precursors, such as metallisation reactions, sulphonations or introduction of acylamino groupings can in general be carried out in any desired steps of the dyestuff syntheses.

Particularly valuable dyestuffs of this series are water-soluble azo, formazan, anthraquinone, triphendioxazine and phthalocyanine dyestuffs, and in particular those having sulpho and/or carboxyl groups. The dyestuffs can be either metal-free or metal-containing, their preferred metal complexes being the copper, nickel, chromium and cobalt complexes.

Suitable dyestuff radicals D or amino-containing dyestuffs underlying the dyestuffs of the formula (I) are described in the literature in very large numbers. Examples are:

EP-A 54,515, EP-A 69,703, EP-A 70,807, German Auslegeschrift 3,222,726, German Auslegeschrift 2,650,555, German Auslegeschrift 3,023,855, German Auslegeschrift 2,847,938, German Auslegeschrift 2,817,780, GB-A 2,057,479, German Auslegeschrift 2,916,715, German Auslegeschrift 2,814,206, German Auslegeschrift 3,019,936, EP-A 45,488 and Venkataraman: The Chemistry of Synthetic Dyes, Vol. VI, Chapter II, p. 211-325, New York, London, 1972.

Examples of important azo dyestuffs are those of the benzene-azo-naphthalene series, bis(benzeneazo)naphthalene series, benzene-azo-5-pyrazolone series, benzene-azo-benzene series, naphthalene-azo-benzene series, benzene-azo-aminonaphthalene series, naphthalene-azo-naphthalene series, naphthalene-azo-5-pyrazolone series, benzene-azo-pyridone series, benzene-azo-aminopyridine series, naphthalene-azopyridone series, naphthalene-azo-aminopyridine series and of the stilbene-azo-benzene series, in this case too sulpho-containing dyestuffs being preferred. In the case of metal-complex azo dyestuffs, the groups bound in the form of a metal complex are preferably in the o positions relative to the azo group, for example in the form of o,o'-dihydroxy-, o-hydroxy-o'-carboxy, o-carboxy-o'-amino-and o-hydroxy-o'-amino-azo groupings.

Preferred dyestuffs are those of the formulae (VII) to (XXIII) below, in which in general A contains a radical of the formula

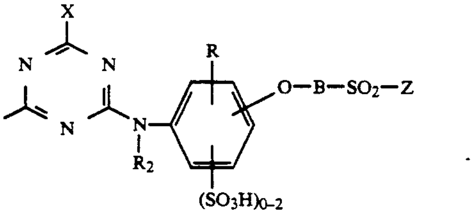
(VIa)

and X, $R_2$, R, B and Z have the abovementioned meaning.

Preferred dyestuffs are those of the formulae (VII) to (XXIII) below

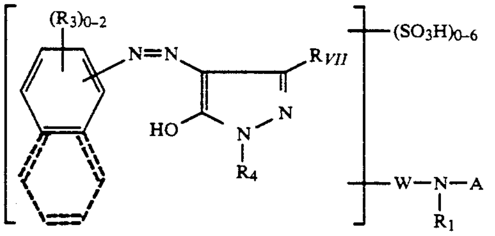
(VII)

$R_3$ alkyl, alkoxy, halogen,
$R_4$ H, alkyl, aryl, hetaryl, aralkyl
$R_{VII}$ COOH, $CH_3$

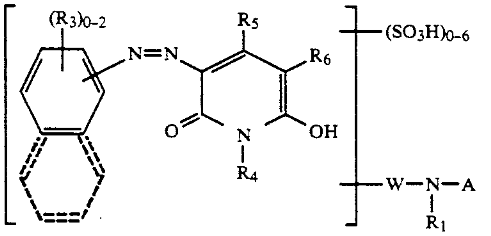
(VIII)

$R_3$ alkyl, alkoxy, halogen,
$R_4$ alkyl, aralkyl, aryl,
$R_5$ alkyl, aryl, aralkyl, hetaryl,
$R_6$ H, $COOR_3$,

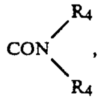
,

CN, $CH_2$—$SO_3H$, $SO_3H$,

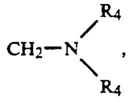
,

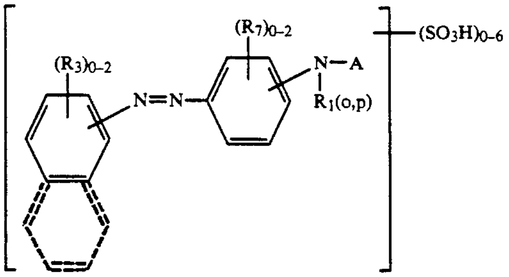
(IX)

$R_3$ alkyl, alkoxy, halogen
$R_7$ H, alkyl, alkoxy, acylamino, amino
o,p in o or p position relative to the azo group

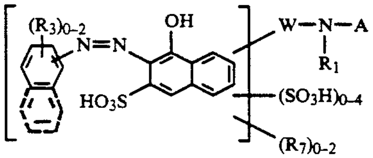
(X)

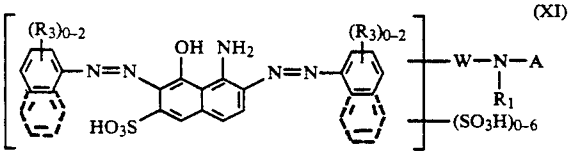
(XI)

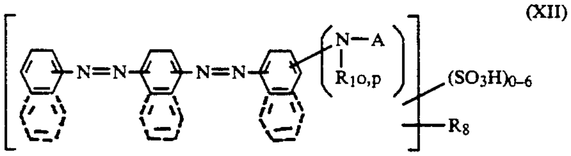
(XII)

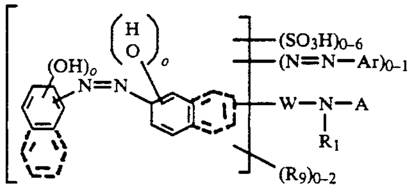
(XIII)

$R_3$ alkyl, alkoxy, halogen
$R_7$ alkyl, alkoxy, arylamino
$R_8$ alkyl, alkoxy, acylamino, ureido
o in ortho position relative to the azo group
$R_9$ $N_8$, $NO_2$ Azo derivatives of this type can be converted to 1:1 (Cu, Ni) or 1:2 (Cr, Co) metal complexes (symmetrical and unsymmetrical).

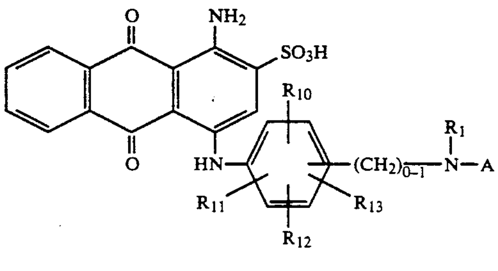
(XIV)

$R_{10}$ H, $C_1$–$C_4$-alkyl, halogen (Cl, Br) $C_1$–$C_4$-alkoxy, carboxyl, $SO_3H$,
$R_{11}$ H, $C_1$–$C_4$-alkyl, $SO_3H$
$R_{12}$ H, $C_1$–$C_4$-alkyl, Cl, Br,
$R_{13}$ H, $C_1$14 $C_4$-alkyl,

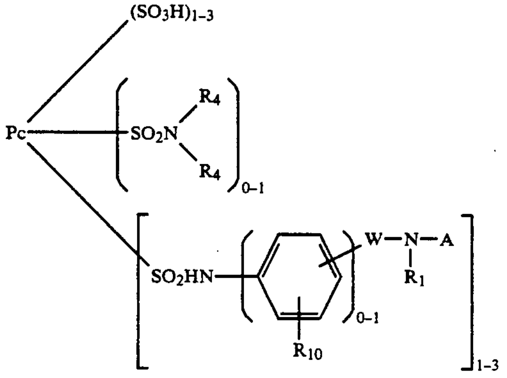
(XV)

$R_4$ H, alkyl,
$R_{10}$ H, $SO_3H$, COOH
Pc Cu or Ni phthalocyanine radical

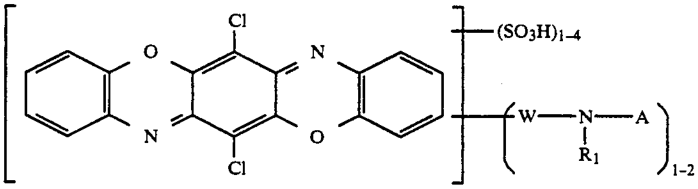
(XVI)

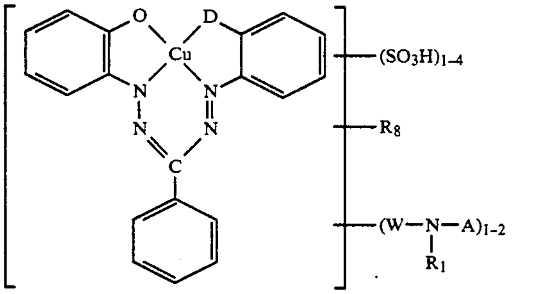
(XVII)

$R_8$ alkyl, halogen, alkylsulphonyl
D substituent capable of complex formation, such as, for example, OH, COOH,

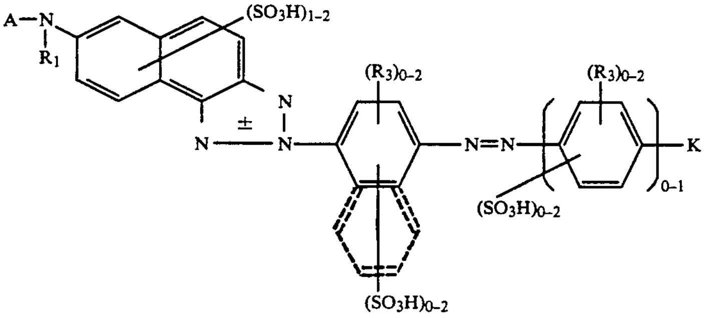
(XVIII)

$R_3$ alkyl, alkoxy, halogen
K radical of a coupling component, suitable coupling components being in particular those for the pyridone, pyrazolone, acetoacetylarylide and naphtholsulphonic acid series.

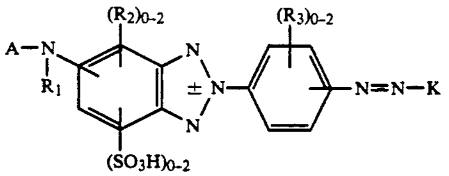
(XIX)

where
$R_2$ alkyl, halogen
$R_3$ alkyl, alkoxy
K radical of a coupling component (XX)
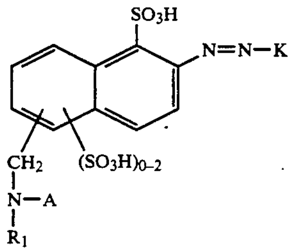

-continued

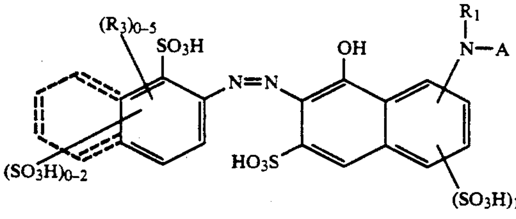

(XXI)

$R_3$ alkyl, alkoxy, arylamino

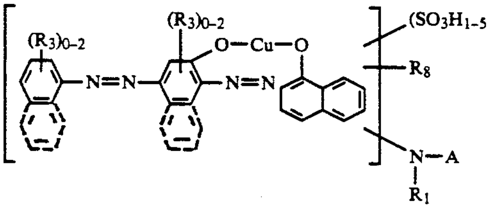

(XXII)

$R_3$ alkyl, alkoxy
$R_8$ H, $NH_2$, arylamino

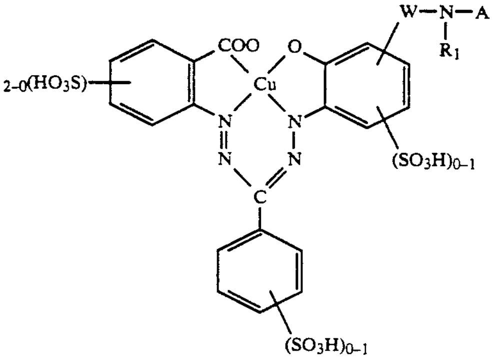

(XXIII)

$R_3$ alkyl, alkoxy
$R_8$ H, $NH_2$, arylamino

Compounds of the formula (V) and methods for their preparation are described in European Patent 0,355,492.

The reactive dyestuffs of the formula (I) are suitable for the dyeing and printing of the wide range of substrates, such as silk, leather, wool, synthetic polyamide fibres, but in particular of cellulose-containing materials of fibrous structure, such as linen, cellulose, regenerated cellulose and in particular cotton. They are suitable not only for the exhaust method but also for the dyeing by the customary pad-dyeing processes, in which the material to be dyed is impregnated with aqueous and, if desired, also salt-containing dyestuff solutions, and the dyestuffs are fixed after an alkaline treatment or in the presence of alkali, if desired with the application of heat.

The reactive dyestuffs of the formula (I) are distinguished by high reactivity and excellent fixation properties. Owing to their bifunctionality, they give high fixation yields even from a long liquor. They are characterised by a relative independence of the yield from the dyeing temperature and can therefore be used in the exhaust method at low to medium dyeing temperatures. In the pad-steaming process, they require only short steaming times. They produce dyeings of high colour strength and good light and wet fastness properties.

EXAMPLE 1

78.4 g of 1-amino-8-hydroxynaphthalene-3,6-disulphonic acid as monosodium salt are dissolved in 800 ml of water at a pH of 6.5. After cooling to 0° C., 21.5 ml of cyanuric fluoride are swiftly run in, and the pH is maintained at 4.0 to 4.5 with 20% strength sodium carbonate solution and the temperature is further maintained at around 0° C.

78 g of the component of the formula

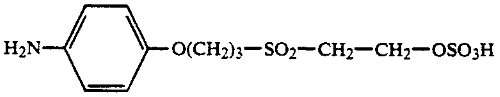

prepared by the procedure given in European Patent 0,355,492 are dissolved in 500 ml of water at 0° to 3° C. with the addition of 60 ml of 10% strength lithium hydroxide solution up to a pH of 6.9. Both solutions are combined and the pH in the reaction mixture is maintained at 5.0 to 5.2 with 2N sodium carbonate solution.

51.3 g of 2-aminonaphthalene-1-sulphonic acid are dissolved in 575 ml of water by neutralisation with sodium hydroxide solution at a pH of 6.5 and 0° C. 57.5 ml of concentrated hydrochloric acid are added in one portion, and the mixture is then diazotised using 57.5 ml of 4N sodium nitrite solution. Stirring is continued for one hour, and any excess nitrite is then destroyed with sulphamic acid solution.

The diazo suspension obtained is then stirred into the solution prepared above at 0° to 5° C., while maintaining the pH in the mixture at 7. 0 with 2N sodium carbonate solution. After 3 hours, the temperature is allowed to increase to 20° C. and the mixture is stirred until the coupling reaction is complete. The dyestuff obtained of the formula

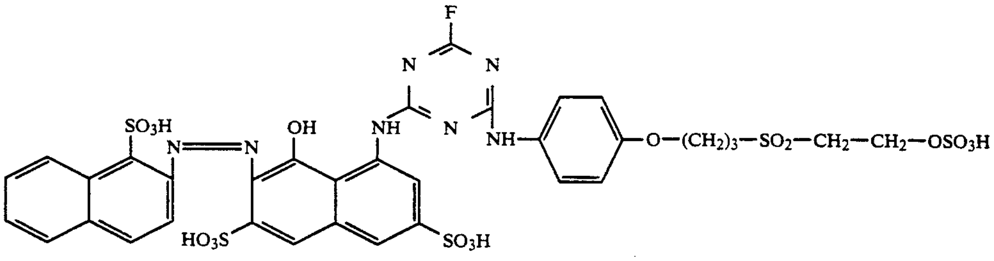

is salted out with potassium chloride, isolated and, after addition of a small amount of phosphate buffer, dried at 50° C. in vacuo.

It dyes cotton from a long liquor at an optimum dyeing temperature of 50° C. in bluish red hues having high fixation yields.

$\lambda_{max.}$=545 nm in water.

EXAMPLE 2

78.4 g of 1-amino-8-hydroxynaphthalene-3,6-disulphonic acid are reacted as in Example 1 with 21.5 ml of cyanuric fluoride. A solution of 78 g of the component

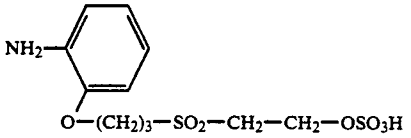

obtained by neutralisation in 400 ml of water up to a pH of 6.5 and cooled to 0° to 3° C. is then added over a period of a few minutes, while maintaining the pH at 5.2 with 2N sodium carbonate solution.

When condensation is complete, a diazo suspension, prepared according to Example 1 from 51.3 g of 2-amino-naphthalene-1-sulphonic acid, is added. During this, the pH of the coupling mixture is maintained at 7.0 to 7.5 with sodium carbonate solution. The temperature is allowed to increase gradually to 10° C. over a period of 2½ hours and then to 20° C. overnight, while further maintaining the PH at 7.0. The partially precipitated dyestuff is salted out further with sodium chloride, filtered off with suction and washed with 25% strength sodium chloride solution. After addition of phosphate buffer, it is dried at 50° C. in vacuo.

It has the formula

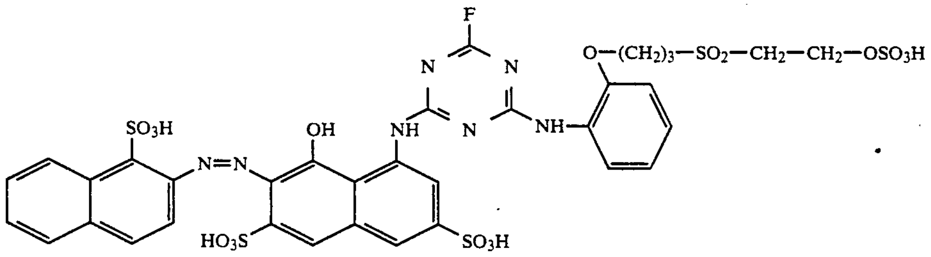

and dyes cotton in bluish red hues at an optimum dyeing temperature of 50° C. and with a high fixation yield.

$\lambda_{max.}$=545 nm in water.

EXAMPLE 3

41.7 g of the azo compound of the formula

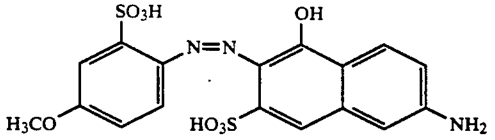

are dissolved in 800 ml of water by adjusting the pH to 4.5 with 2N sodium hydroxide solution. After cooling the solution to 0° C., 8.2 ml of cyanuric fluoride are added dropwise over a period of 10 minutes, and the pH is maintained at 4.5 to 4.7 with 2N sodium carbonate solution. Stirring is continued for another 10 minutes, and a neutral solution of 40.5 g of the component of the formula

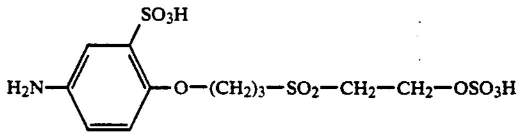

in 150 ml of water, obtained from the sulpho- and sulphate-free compound by treatment in 20% strength oleum and work-up by the procedure given in European Patent 0,355,492, is then added. While this compound is metered in, the temperature is further maintained at 0° to 2° C. and the pH is maintained at 5.2 to 5.5 with sodium carbonate solution. After 2 hours, the temperature is allowed to rise to 20° C. After condensation is complete, the dyestuff is salted out with potassium chloride, filtered off with suction, washed with 15% strength potassium chloride solution and, after addition of a small amount of phosphate buffer solution, dried at 50° C. in vacuo.

The dyestuff of the formula

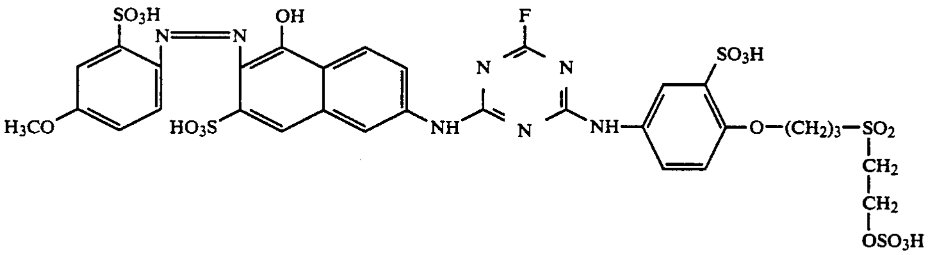

dyes cotton from a long liquor at an optimum dyeing temperature of 50° C. and with a high fixation yield, in scarlet hues.

$\lambda_{max.}$=501 nm in water.

EXAMPLE 4

78.4 g of 1-amino-8-hydroxynaphthalene-3,6-disulphonic acid are condensed, by the procedure of Example 1, with 21.5 ml of cyanuric fluoride. A solution of 41.3 g of the component of the formula

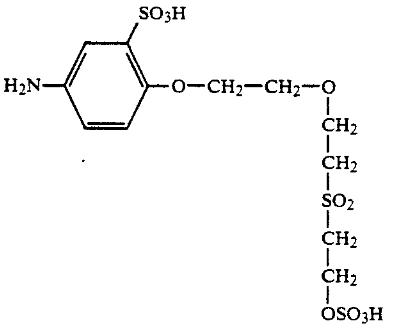

in 130 ml of water which is cooled to 0° to 3° C. and adjusted to a PH of 5 is run in over a period of 10 minutes, while maintaining the pH at 5.2 with 2N sodium carbonate solution. After 2½ to 3 hours, condensation is complete.

51.3 g of 2-aminonaphthalene-1-sulphonic acid are diazotised by the procedure of Example 1, and the diazo suspension is added to the above condensation solution in portions. During this, the pH of the reaction mixture is maintained at 6.5. After the addition, the pH is maintained at 7.0 with dilute sodium carbonate solution and cooling is continued. The temperature is allowed to rise to 20° C. overnight and the dyestuff is then salted out. After buffering, it is dried at 50° C. in vacuo.

The dyestuff of the formula

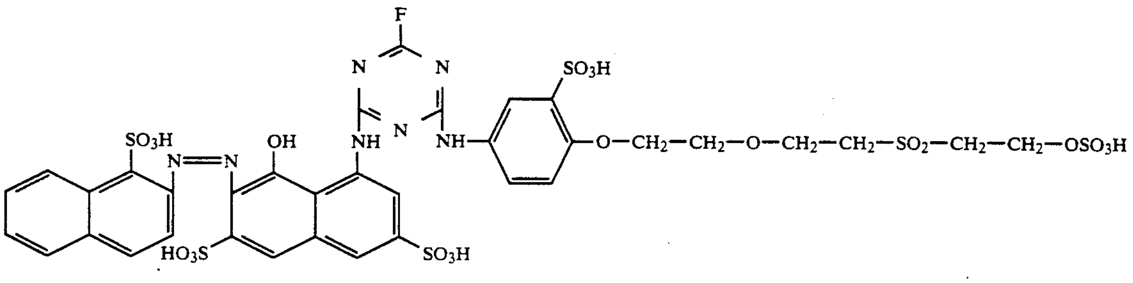

dyes cotton from a long liquor at an optimum dyeing temperature of 40° C. and with a high fixation yield in bluish red hues.

$\lambda_{max.}$ = 545 nm in water.

EXAMPLE 5

In accordance with the procedure of Example 1, a solution of the coupling component

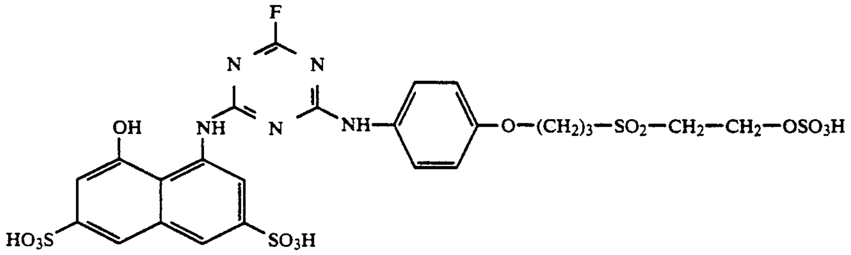

is prepared from 78.4 g of 1-amino-8-hydroxynaphthalene-3,6-disulphonic acid, 21.5 ml of cyanuric fluoride and 78 g of 3-(4-aminophenoxy)propyl β-sulphatoethyl sulphone.

39.8 g of 2-aminobenzenesulphonic acid are dissolved in 300 ml of water and 112 ml of 2N sodium hydroxide solution at a pH of 6. 57.5 ml of 4N sodium nitrite solution are added. The solution obtained is run into an initially introduced mixture of 200 ml of water, 60 ml of concentrated hydrochloric acid and 2.5 ml of 4N sodium nitrite solution at 0° to 2° C. over a period of 30 minutes. Stirring is then continued for 1 hour, a small amount of excess nitrous acid is removed using sulphamic acid, and the diazo suspension obtained is stirred into the above solution of the coupling component at 0° to 3° C., while maintaining the pH in the resulting mixture at 6.5 by simultaneous addition of 2N sodium carbonate solution. After stirring for two hours with cooling, the temperature is allowed to rise to 20° C.

After coupling is complete, the dyestuff is salted out with potassium chloride, filtered off with suction, washed with 20% strength potassium chloride solution and, after buffering, dried at 50° C. in vacuo.

It has the formula

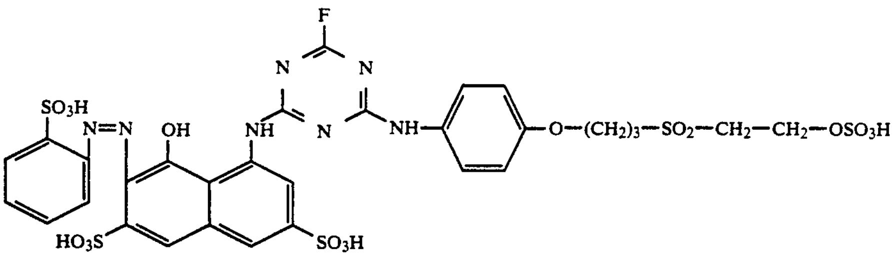

and dyes cotton from a long liquor at an optimum dyeing temperature of 50° C. and with good fixation yields in red hues.

$\lambda_{max.}=532$ nm in water.

EXAMPLE 6

74.8 g of 1-amino-8-hydroxynaphthalene-3,6-disulphonic acid are condensed by the procedure of Example 1 with 21.5 ml of cyanuric fluoride.

A solution of 84.9 g of

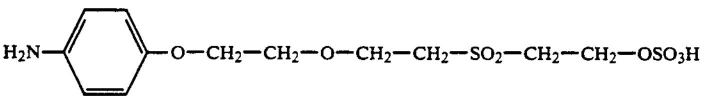

in 250 ml of water which is cooled to 0° to 3° C. and adjusted to a pH of 5 is run in over a period of 10 minutes, while maintaining the pH at 5.2 with 2N sodium carbonate solution.

The solution is prepared by sulphation of 2-[2-(4-aminophenoxyethoxy)ethoxy]-2-hydroxyethyl sulphone in the 2.5-fold volume of 96% strength sulphuric acid at 0° to 3° C., stirring the mixture into ice, neutralising the solution up to a pH of 5 with calcium carbonate, filtering the calcium sulphate and concentrating the filtrate.

69.7 g of 2-aminonaphthalene-1,5-disulphonic acid are dissolved in 500 ml of water by adding sodium hydroxide solution up to a pH of 7. The solution is cooled to 0° C., 67.5 ml of 4N sodium nitrite solution and 300 g of ice are added, and 60 ml of concentrated hydrochloric acid are added in one portion. After stirring is continued for one hour, diazotisation is complete. Sulphamic acid is added until no more nitrite is detected.

The diazonium suspension is stirred into the initially introduced solution of the coupling component prepared above at 0° C., while, at the same time, maintaining the pH in the coupling mixture at 7.0 with dilute sodium carbonate solution. After 3 hours, the temperature is allowed to rise to 20° C. and, after coupling is complete, the dyestuff is salted out. It is filtered off with suction, washed and, after adding a small amount of phosphate buffer, dried. The dyestuff of the formula

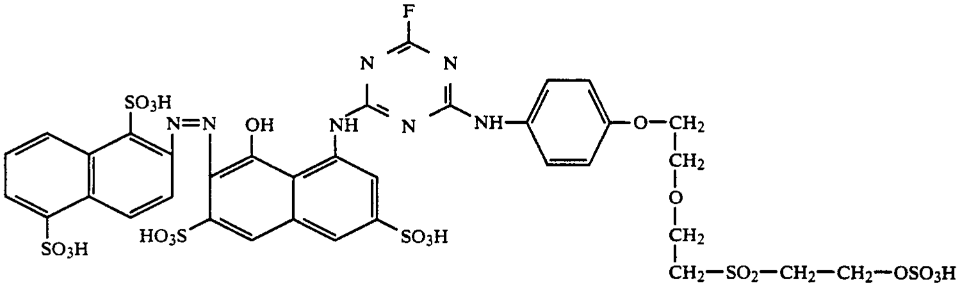

dyes cotton from a long liquor at an optimum dyeing temperature of 50° C. and with good fixation yield in bluish red hues.

$\lambda_{max.}=541$ nm in water.

Further red bifunctional reactive dyestuffs are obtained by reacting the components mentioned in Examples 7-23 below.

| No. | Diazo component | 1-Amino-8-hydroxy-naphthalenedisulphonic acid | Trihalogenotriazine | 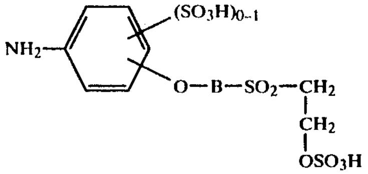 | Hue | $\lambda_{max}(H_2O)$ |
|---|---|---|---|---|---|---|
| 7 | 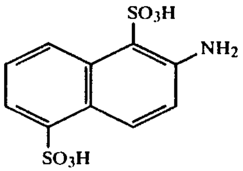 | 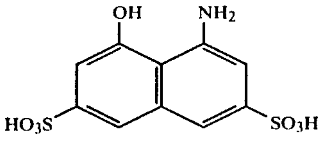 | 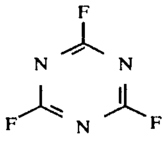 | 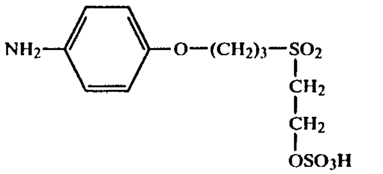 | bluish red | 540 nm |
| 8 | 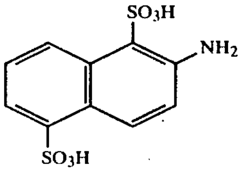 | 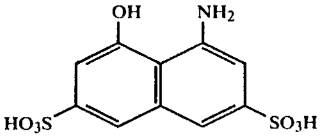 | 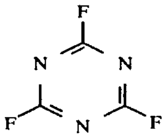 | 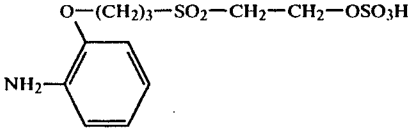 | bluish red | 546 nm |
| 9 | 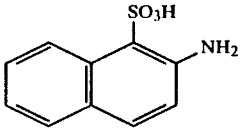 | 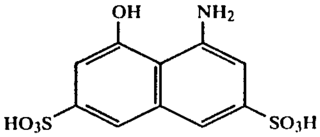 | 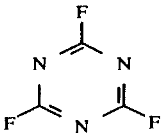 | 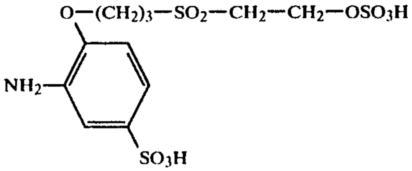 | bluish red | 546 nm |
| 10 | 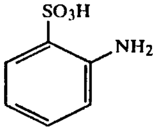 | 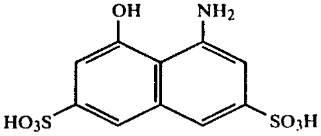 | 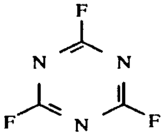 | 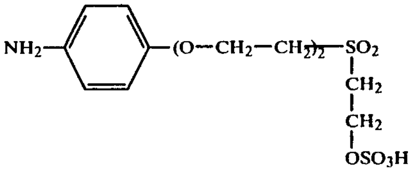 | red | 532 nm |
| 11 | 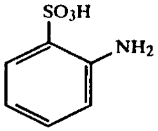 | 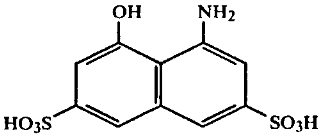 | 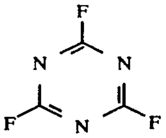 | 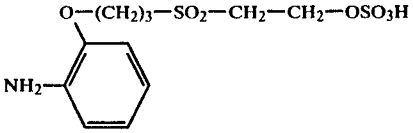 | red | 533 nm |

-continued
| No. | Diazo component | 1-Amino-8-hydroxy-naphthalenedisulphonic acid | Trihalogenotriazine | 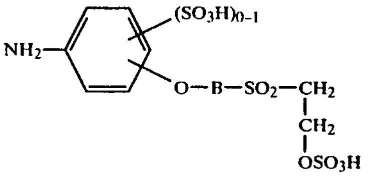 | Hue | $\lambda_{max}(H_2O)$ |
|---|---|---|---|---|---|---|
| 12 | 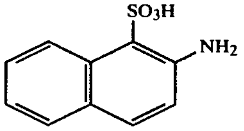 | 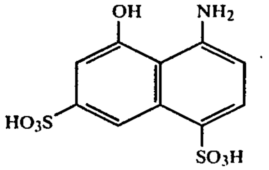 | 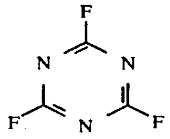 | 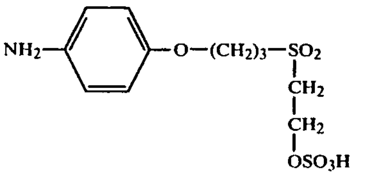 | bluish red | |
| 13 | 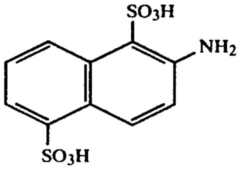 | 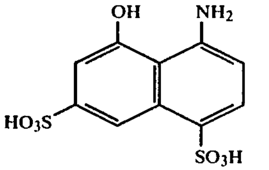 | 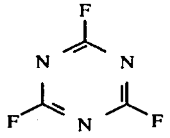 | 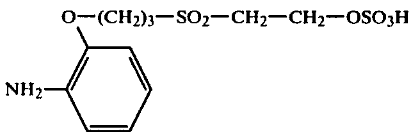 | bluish red | |
| 14 | 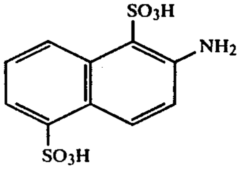 | 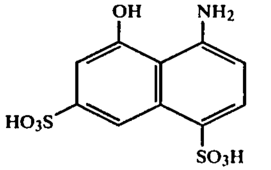 | 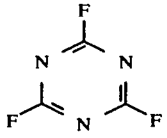 | 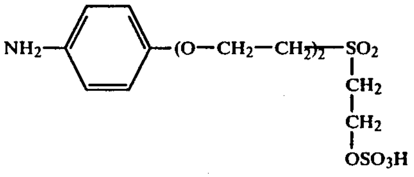 | bluish red | |
| 15 | 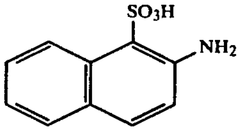 | 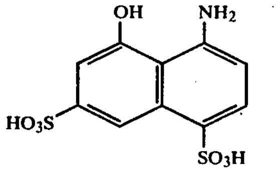 | 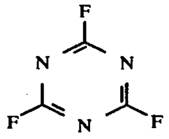 | 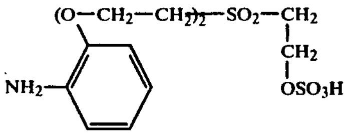 | bluish red | |

-continued
| No. | Diazo component | 1-Amino-8-hydroxy-naphthalenedisulphonic acid | Trihalogenotriazine | 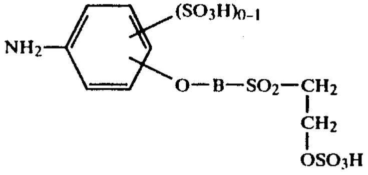 | Hue | $\lambda_{max}(H_2O)$ |
|---|---|---|---|---|---|---|
| 16 | 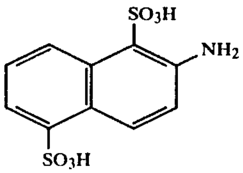 | 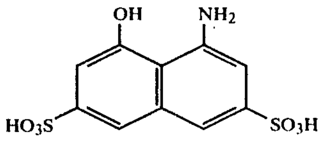 | 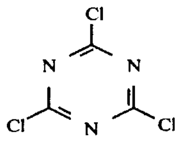 | 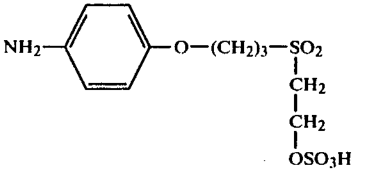 | bluish red | 541 nm |
| 17 | 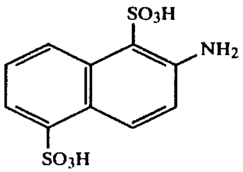 | 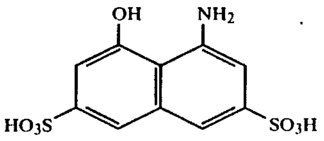 | 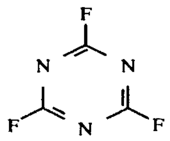 | 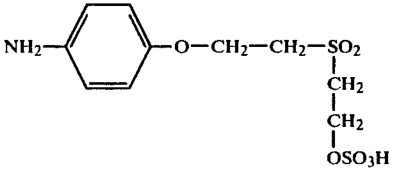 | bluish red | 541 nm |
| 18 | 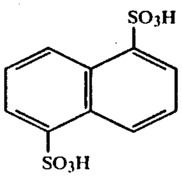 | 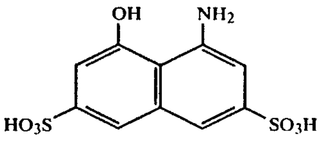 | 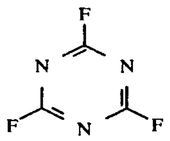 | 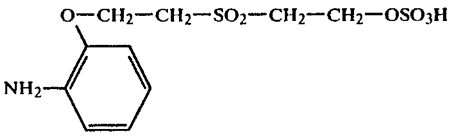 | bluish red | 541 nm |
| 19 | 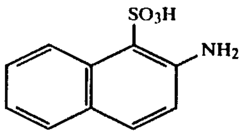 | 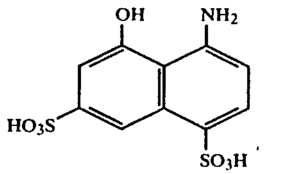 | 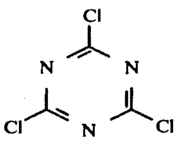 | 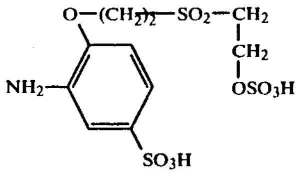 | bluish red | |

-continued
| No. | Diazo component | 1-Amino-8-hydroxy-naphthalenedisulphonic acid | Trihalogenotriazine | 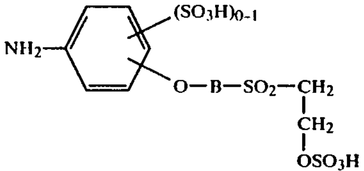 | Hue | $\lambda_{max}(H_2O)$ |
|---|---|---|---|---|---|---|
| 20 | 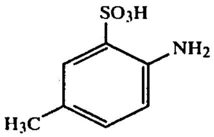 | 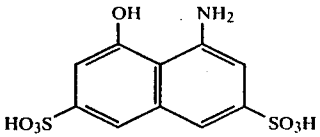 | 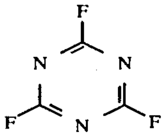 | 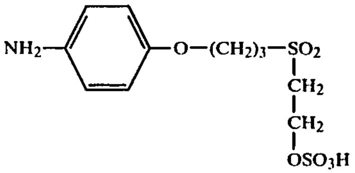 | bluish red | |
| 21 | 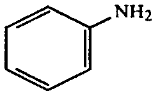 | 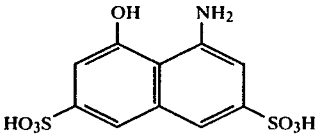 | 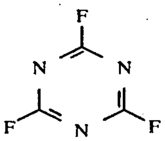 | 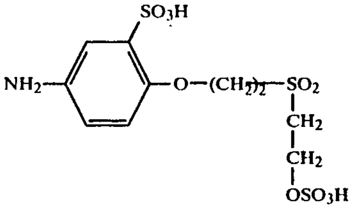 | red | |
| 22 | 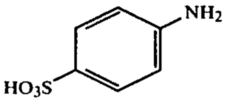 | 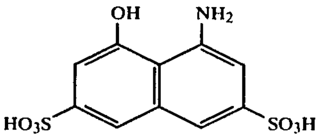 | 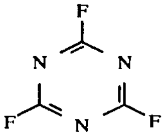 | 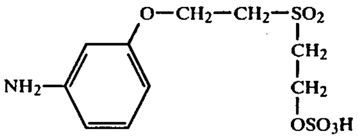 | red | |
| 23 | 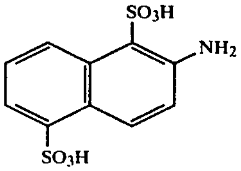 | 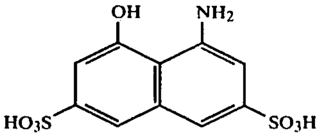 | 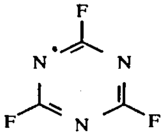 | 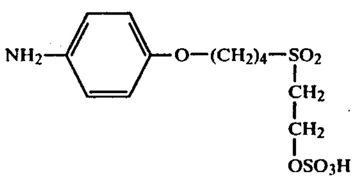 | bluish red | 544 nm |

EXAMPLE 24

24.5 g of the azo compound of the formula

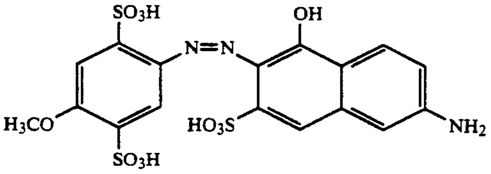

are dissolved in 340 ml of water at a pH of 7. After cooling to 0° to 2° C., the pH is brought to 4.5 with dilute hydrochloric acid, and 4.3 ml of cyanuric fluoride are then immediately added dropwise over a period of 4 minutes. The pH is further maintained at 4.5 with 2N sodium carbonate solution. 15 minutes later, the reaction is complete.

A solution of 18.5 g of the component of the formula

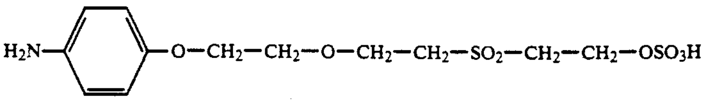

in 50 ml of water adjusted to a pH of 5 is added and the pH in the reaction mixture is maintained at 5.0 to 5.5. After 2 hours, the temperature is allowed to rise to 20° C.

1 g of primary sodium phosphate is added, the pH is brought to 5.5 with dilute sodium hydroxide solution and the solution is then evaporated at 35° to 40° C. in vacuo in a rotary evaporator. This gives an orange powder which dyes cotton from a long liquor at an optimum dyeing temperature of 40° to 60° C. and with an excellent fixation yield in reddish orange hues.

The dyestuff obtained has the formula

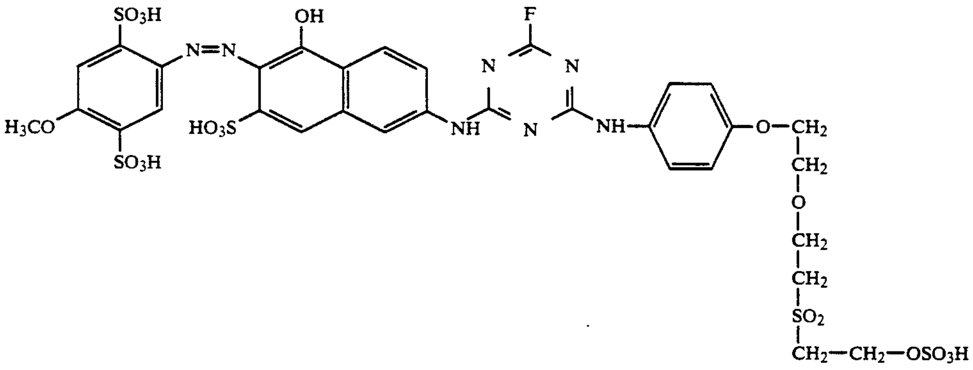

$\lambda_{max.}$=498 nm in water.

Further orange-dyeing dyestuffs are obtained by condensing the following azo components in an analogous manner with cyanuric fluoride and aminophenoxyalkyl β-sulphatoethyl sulphones.

| No. | Azo component | 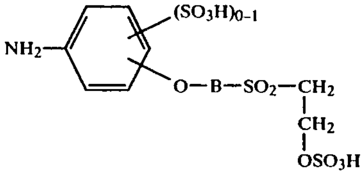 | Hue | $\lambda_{max}(H_2O)$ |
|---|---|---|---|---|
| 25 | 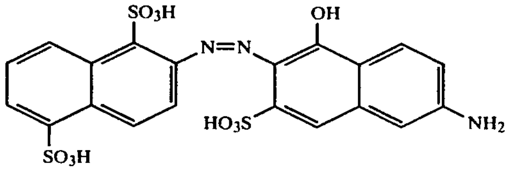 | 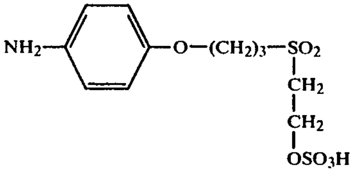 | orange | |
| 26 | 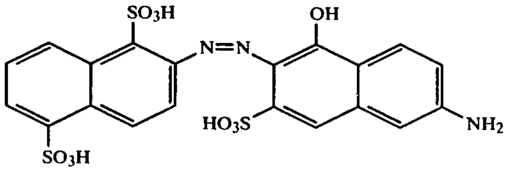 | 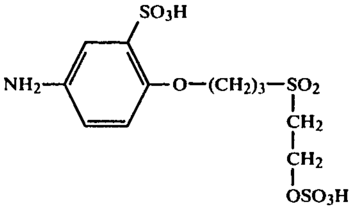 | orange | 485 nm |
| 27 | 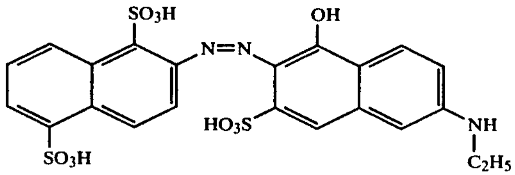 | 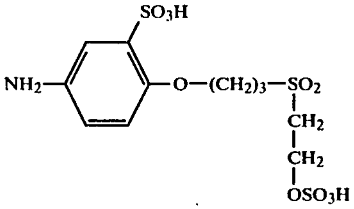 | orange | |
| 28 | 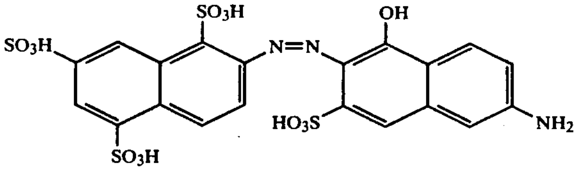 | 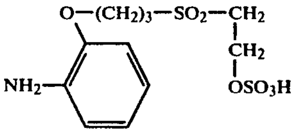 | orange | 482 nm |

-continued
| No. | Azo component | 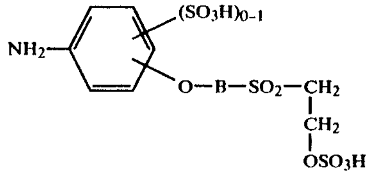 | Hue | $\lambda_{max}(H_2O)$ |
|---|---|---|---|---|
| 29 | 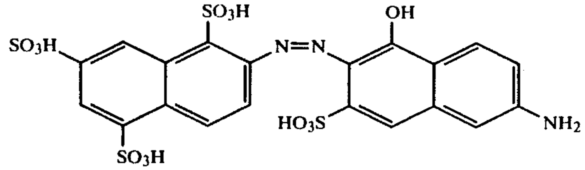 | 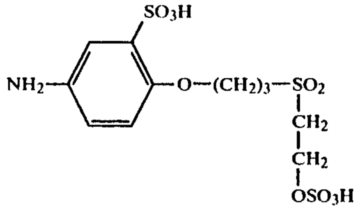 | orange | 481 nm |
| 30 | 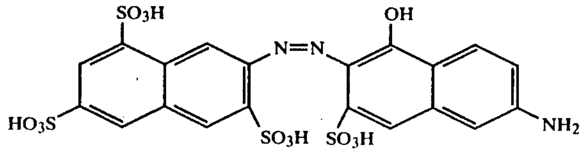 | 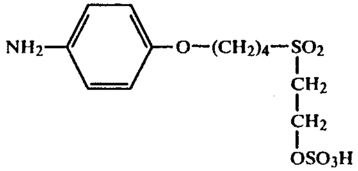 | orange | |
| 31 | 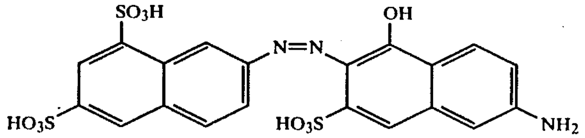 | 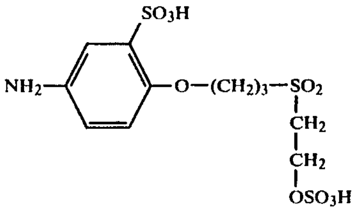 | orange | |
| 32 | 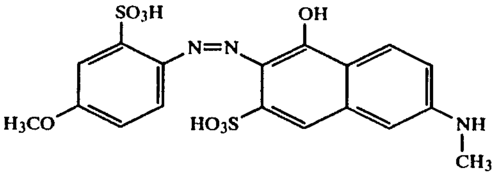 | 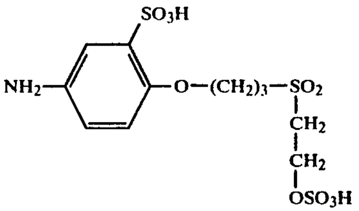 | scarlet | |

-continued
| No. | Azo component | 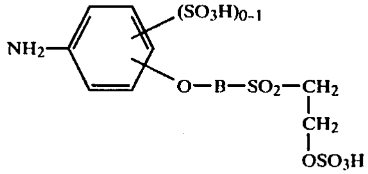 | Hue | $\lambda_{max}(H_2O)$ |
| --- | --- | --- | --- | --- |
| 33 | 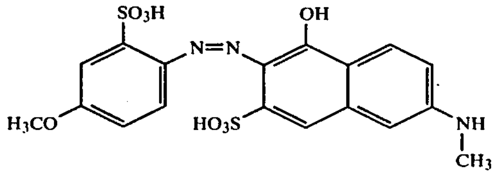 | 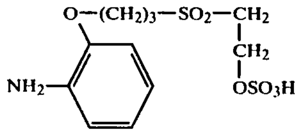 | scarlet | |
| 34 | 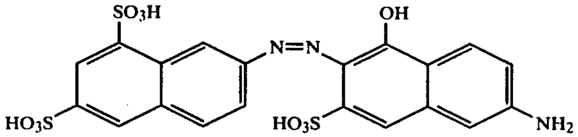 | 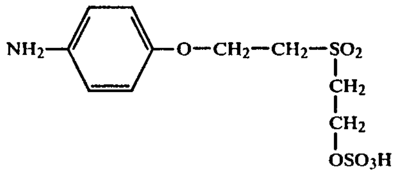 | orange | |
| 35 | 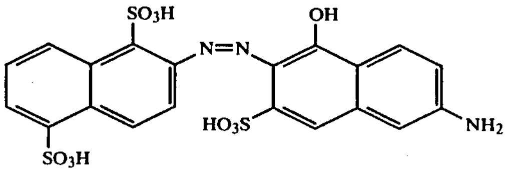 | 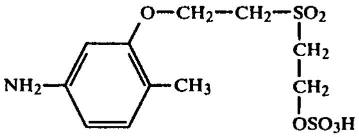 | orange | |
| 35a | 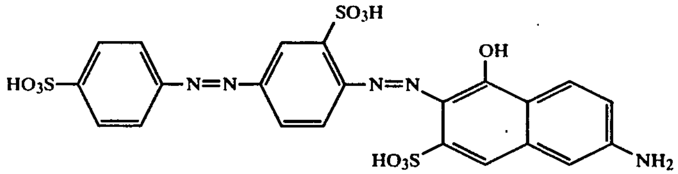 | 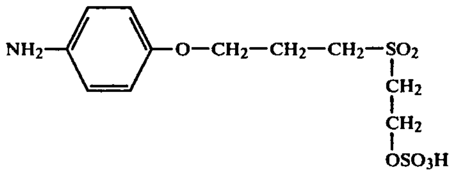 | yellowish red | |

-continued
| No. | Azo component | 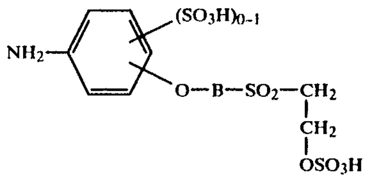 | Hue | $\lambda_{max}(H_2O)$ |
|---|---|---|---|---|
| 35b | 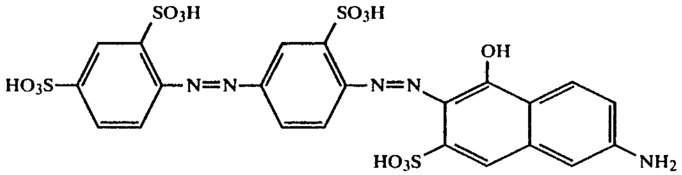 | 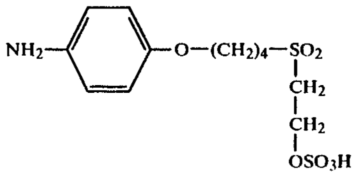 | yellowish red | |
| 35c | 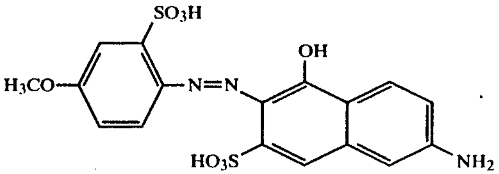 | 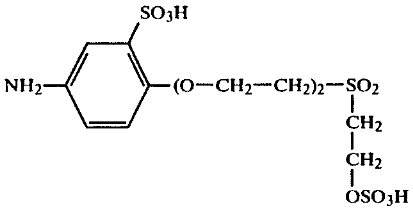 | yellowish red | 501 nm |
| 35d | 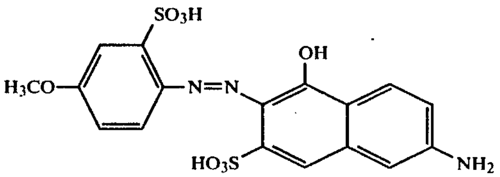 | 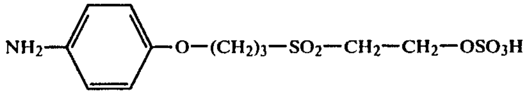 | scarlet | 501 nm |

EXAMPLE 36

35.0 g of the coupling product of 2-aminonaphthalene-6,8-disulphonic acid onto 3-aminoacetanilide are dissolved in 600 ml of water at a pH of 5.5 with heating to 50° C. The mixture is cooled to 0° C., and 7.7 ml of cyanuric fluoride are added dropwise over a period of 5 to 10 min. During this time, the pH is maintained at 5.2 to 5.5 with dilute sodium carbonate solution.

When reaction is complete after about 10 to 15 minutes, a solution of 30.5 g of the compound

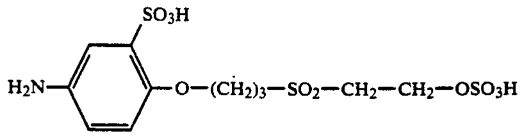

in 80 ml of water adjusted to a pH of 5.5 is added dropwise, the pH is maintained at 5.5 to 5.7 with dilute sodium carbonate solution and the temperature is maintained at 0° to 5° C., later rising to 15° to 20° C.

The solution obtained, after addition of 1.5 g of phosphate buffer of pH 6, is evaporated at 35° to 40° C. in vacuo or spray-dried.

The dyestuff of the formula

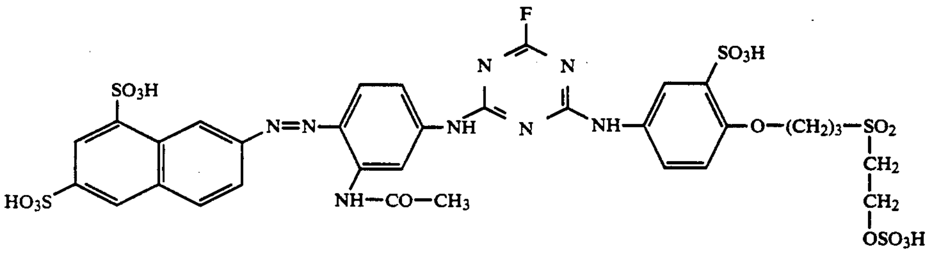

dyes cotton from a long liquor at an optimum dyeing temperature of 50° C. in golden yellow hues.

$\lambda_{max.}$ = 389 nm in water.

Further reddish yellow-dyeing dyestuffs are obtained by condensing the following p-aminoazo compounds with cyanuric fluoride or cyanuric chloride and aminophenoxyalkyl β-sulphatoethyl sulphones.

| No. | Azo component | Trihalogenotriazine | 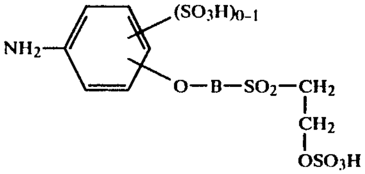 | Hue | $\lambda_{max}(H_2O)$ |
|---|---|---|---|---|---|
| 37 | 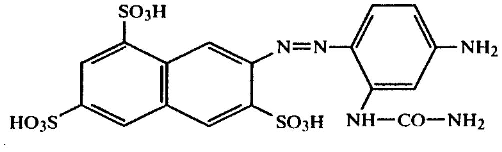 | 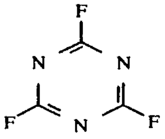 | 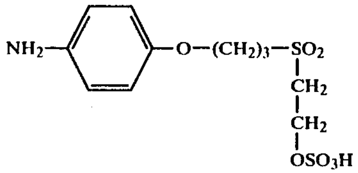 | reddish yellow | |
| 38 | 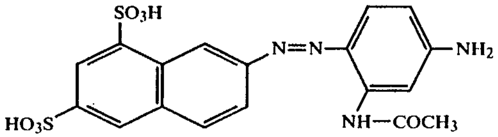 | 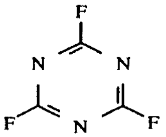 | 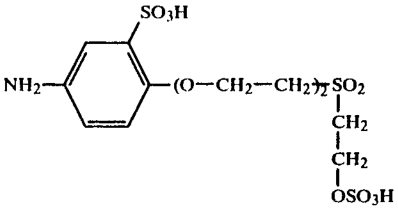 | reddish yellow | 389 nm |
| 39 | 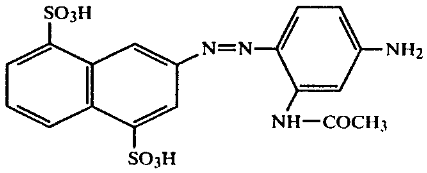 | 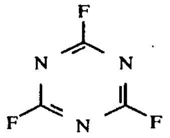 | 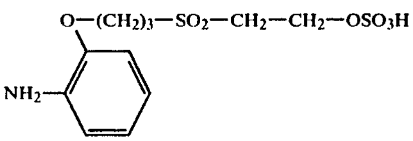 | reddish yellow | 389 nm |
| 40 | 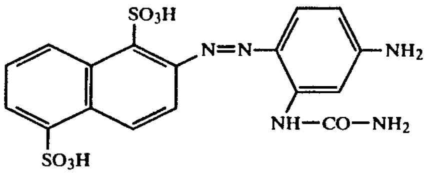 | 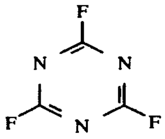 | 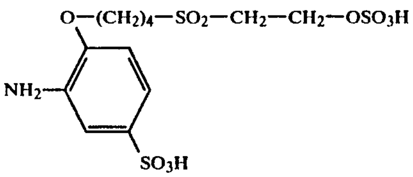 | reddish yellow | |

-continued
| No. | Azo component | Trihalogenotriazine | 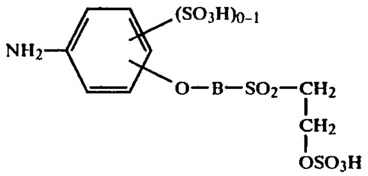 | Hue | $\lambda_{max}(H_2O)$ |
|---|---|---|---|---|---|
| 41 | 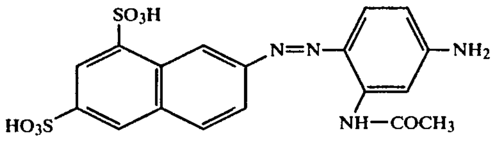 | 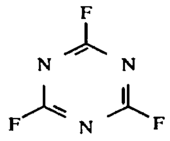 | 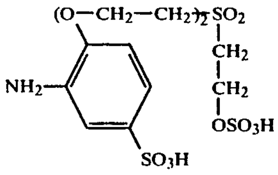 | reddish yellow | |
| 42 | 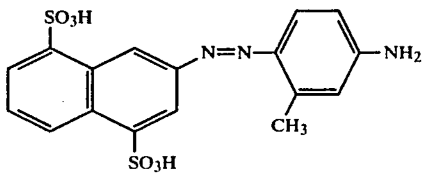 | 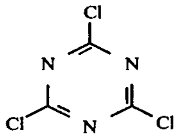 | 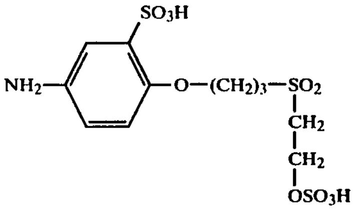 | reddish yellow | |
| 43 | 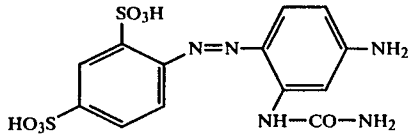 | 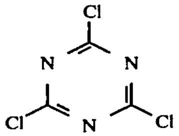 | 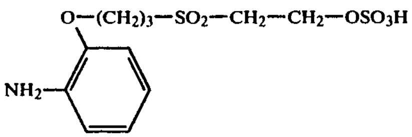 | reddish yellow | |
| 44 | 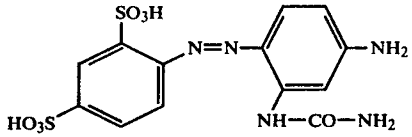 | 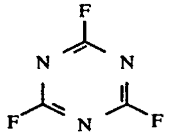 | 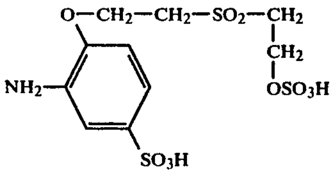 | reddish yellow | |

-continued
| No. | Azo component | Trihalogenotriazine | 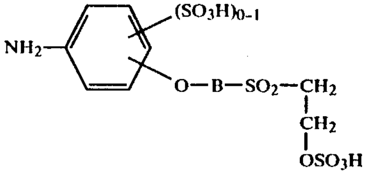 | Hue | $\lambda_{max}(H_2O)$ |
|---|---|---|---|---|---|
| 45 | 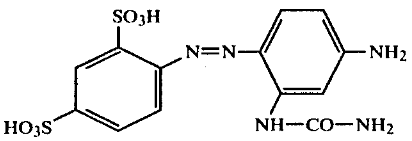 | 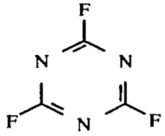 | 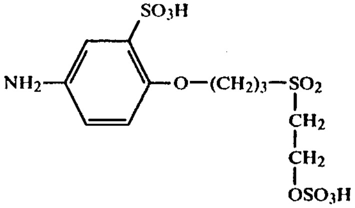 | reddish yellow | 386 nm |
| 46 | 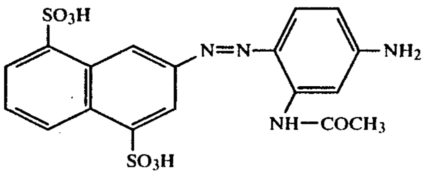 | 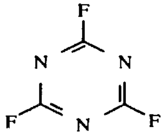 | 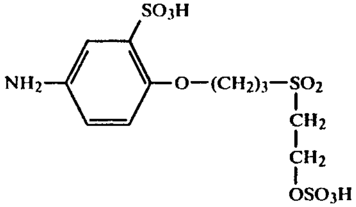 | reddish yellow | |
| 47 | 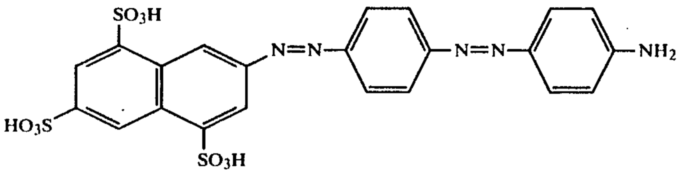 | 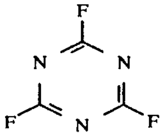 | 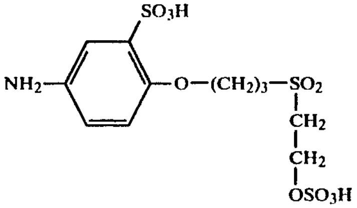 | orange | |

EXAMPLE 48

24.2 g of the aminoazopyrazolone of the formula

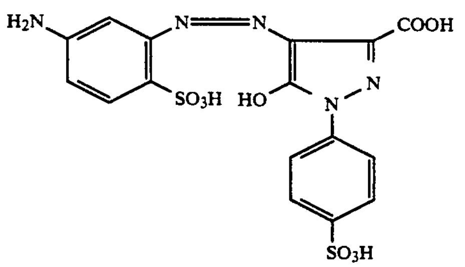

(prepared by coupling diazotised 2-amino-4-formylaminobenzenesulphonic acid onto 1- (4'-sulphophenyl) -3-carboxy-5-pyrazolone and hydrolysis using dilute sodium hydroxide solution) are dissolved in 600 ml of water in the form of the sodium salt. The mixture is cooled to 0° to 2° C., the pH is brought to 5.0 with dilute hydrochloric acid and 4.0 ml of cyanuric fluoride are immediately added dropwise over a period of about 5 minutes. During this, the pH is constantly maintained between 4.3 and 4.6 with 2N sodium carbonate solution. When the reaction is complete after 15 minutes, a neutral solution of 18.6 g of the compound of the formula

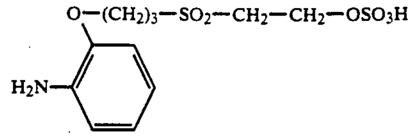

in 100 ml of water is added at 0° to 5° C. During this, the pH is maintained at 5.5 to 6 with 2N sodium carbonate solution, and the temperature is allowed to rise to 20° C. after 2 hours.

The dyestuff obtained of the formula

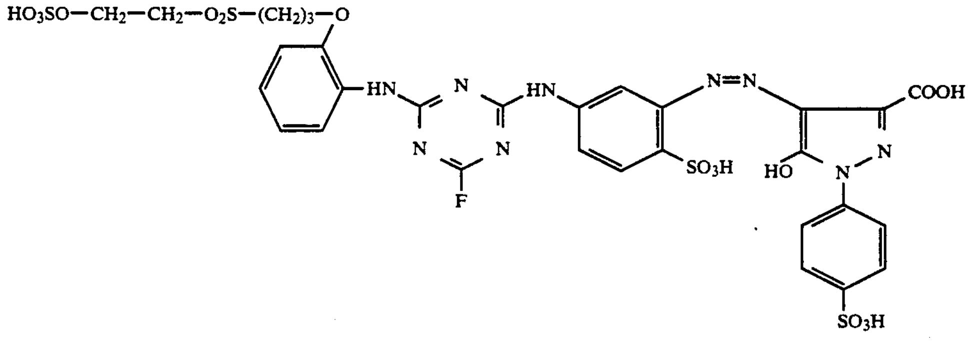

dyes cotton from long liquor in greenish yellow hues with a high fixation yield.

EXAMPLE 49

Example 48 is repeated, except that the 5-amino-2-sulphophenylazopyrazolone component is replaced by an equivalent amount of the corresponding 4-amino-2-sulphophenylazopyrazolone, giving a dyestuff of the formula

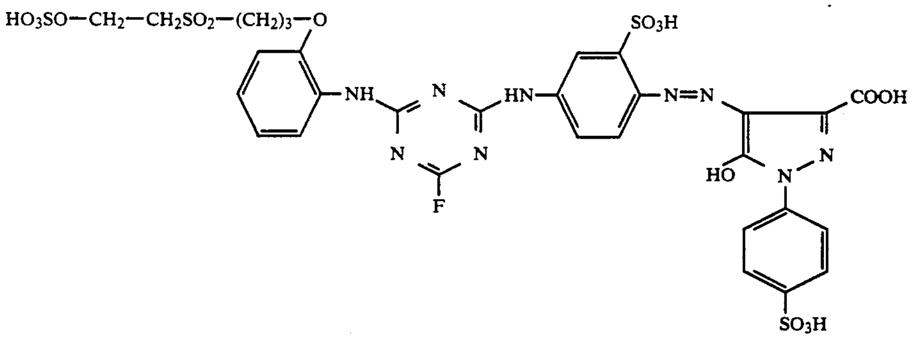

which dyes cotton in more reddish yellow hues than that from Example 48.

Further yellow dyestuffs having similar properties are obtained by condensing the following aminophenylazopyrazolones with cyanuric fluoride and the aminophenoxyalkyl β-sulphatoethyl sulphones listed.

| No. | Aminophenylazopyrazolone | 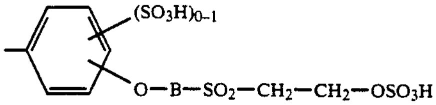 |
|---|---|---|
| 50 | 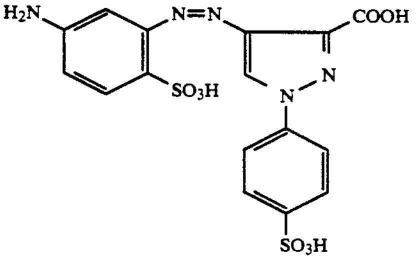 | 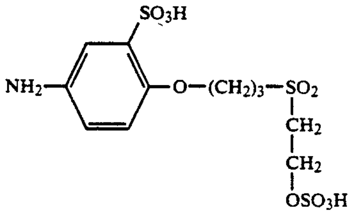 |
| 51 | 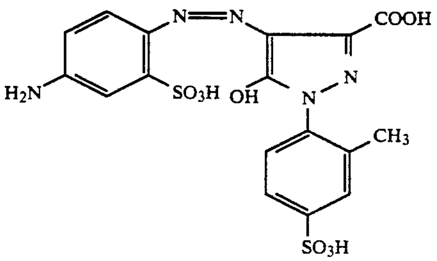 | 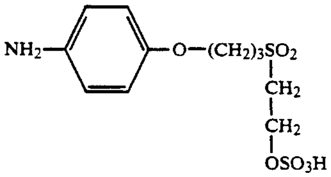 |
| 52 | 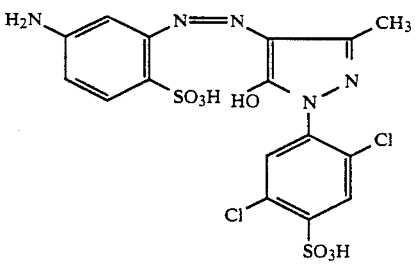 | 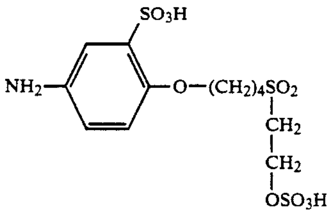 |
| 53 | 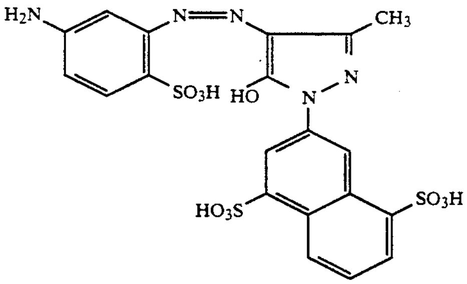 | 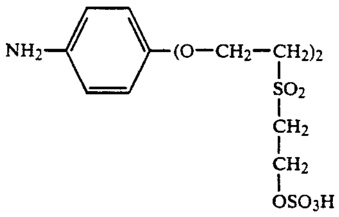 |
| 54 | 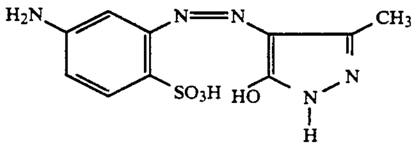 | 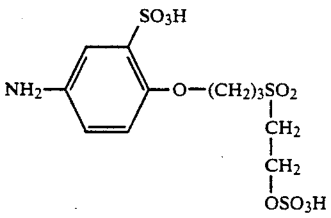 |

-continued

| No. | Aminophenylazopyrazolone | 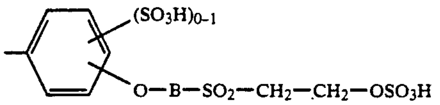 |
| --- | --- | --- |
| 55 | 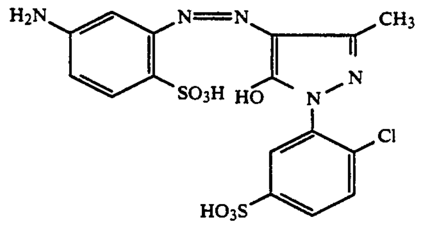 | 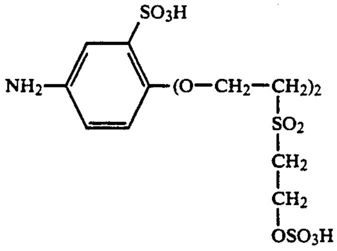 |
| 56 | 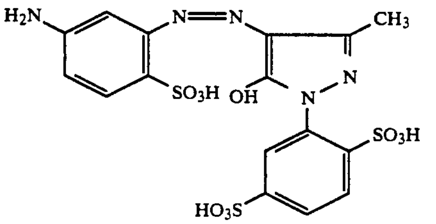 | 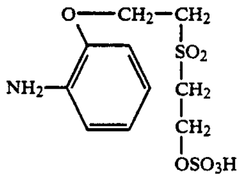 |

EXAMPLE 57

19.9 g of the azo compound of the formula

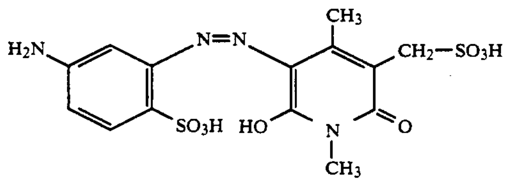

prepared by coupling diazotised 4-acetylamino-2-aminobenzenesulphonic acid onto 1,4-dimethyl-6-hydroxy-5-amino-carbonyl-3-sulphomethyl-2-pyridone and hydrolysis of the acetylamino group in dilute sodium hydroxide solution are dissolved in 400 ml of water at a pH of 5.0. After cooling to 0° C., 4.1 ml of cyanuric fluoride are run in, and the pH is maintained at 4.5 with 2N sodium carbonate solution. Stirring under the same conditions is continued for 15 minutes, and a neutral solution of 21.3 g of the component of the formula

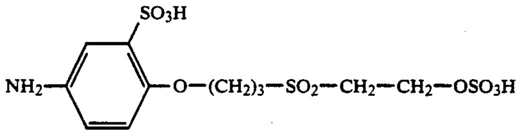

in 55 ml of water are then added. The pH is maintained at 5.2 to 5.3 with sodium carbonate solution and the temperature is further maintained at 0° to 3° C., and the condensation is completed by stirring overnight. The dyestuff is salted out with potassium chloride, filtered off with suction and washed with 15% strength potassium chloride solution.

It has the formula

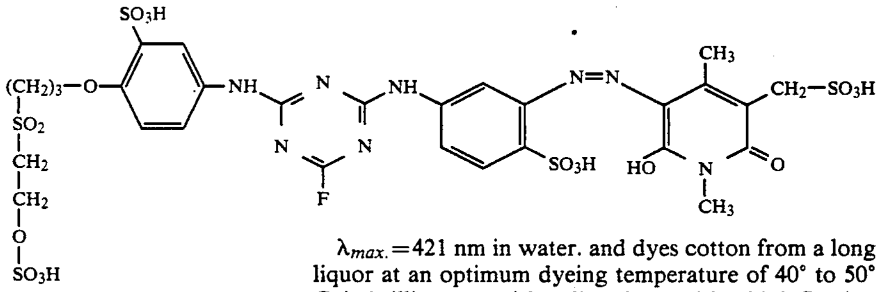

$\lambda_{max.}$ = 421 nm in water. and dyes cotton from a long liquor at an optimum dyeing temperature of 40° to 50° C. in brilliant greenish yellow hues with a high fixation yield.

A dyestuff is obtained with a high fixation yield by condensing 17.3 g of the component of the formula

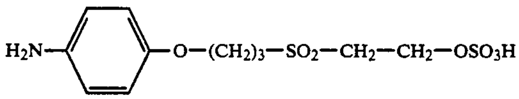

dissolved in 110 ml of water at a pH of 6 with 10% strength lithium hydroxide solution instead of the 21.3 g of 5-amino-2-[3-(β-sulphatoethylsulphonyl)-propoxy]-benzenesulphonic acid used above with the difluorotriazinylpyridone dyestuff. $\lambda_{max}$ = 421 nm in water.

Similar dyestuffs are obtained by reacting the components from Examples 58 to 69 with one another using the procedure of Example 57.

| No. | Azo component | Trihalogenotriazine | 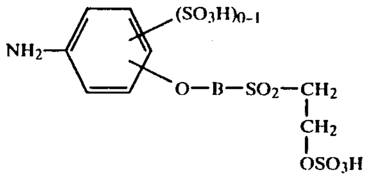 | Hue | $\lambda_{max}(H_2O)$ |
|---|---|---|---|---|---|
| 58 | 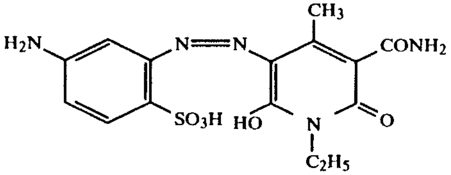 | 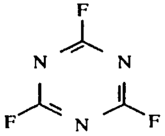 | 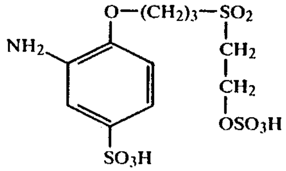 | greenish yellow | |
| 59 | 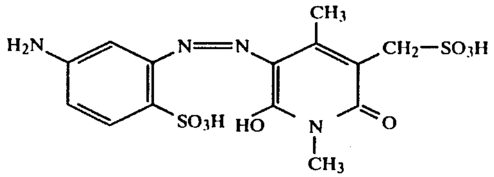 | 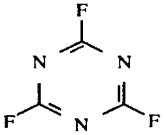 | 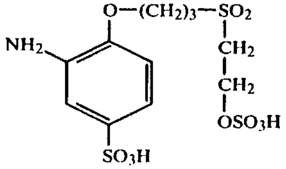 | greenish yellow | 420 nm |
| 60 | 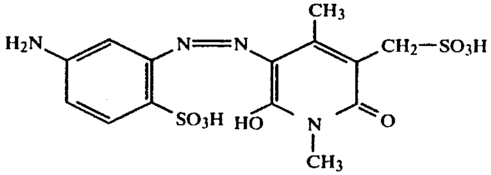 | 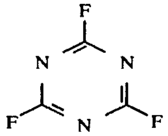 | 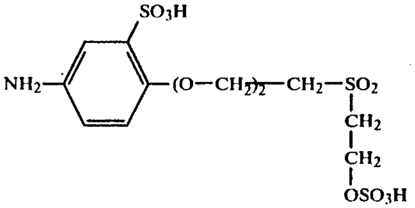 | greenish yellow | 421 nm |
| 61 | 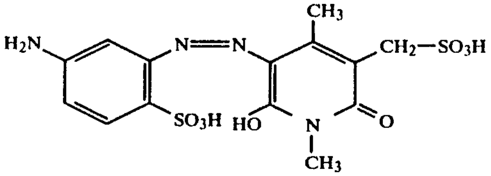 | 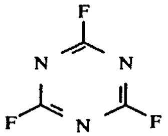 | 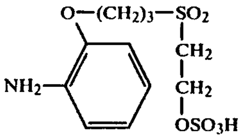 | greenish yellow | 421 nm |

-continued
| No. | Azo component | Trihalogenotriazine | 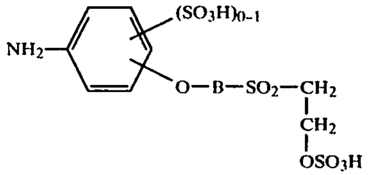 | Hue | $\lambda_{max}(H_2O)$ |
|---|---|---|---|---|---|
| 62 | 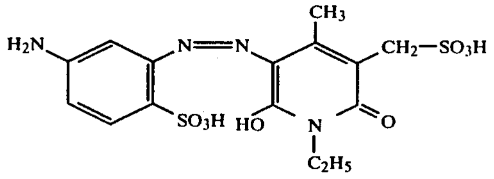 | 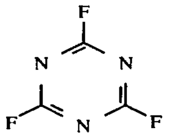 | 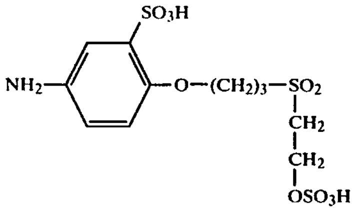 | greenish yellow | 423 nm |
| 63 | 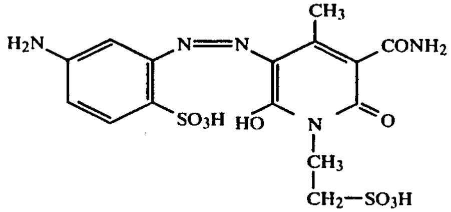 | 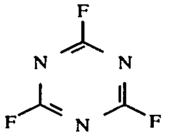 | 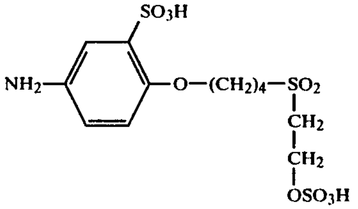 | greenish yellow | |
| 64 | 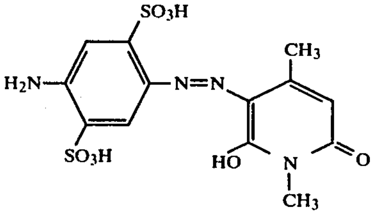 | 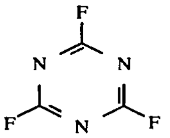 | 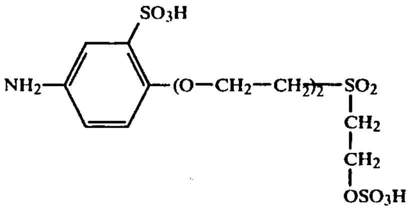 | yellow | |
| 65 | 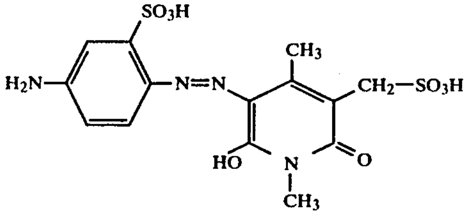 | 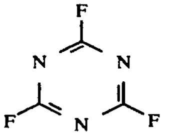 | 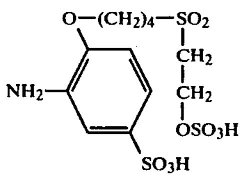 | yellow | |

-continued
| No. | Azo component | Trihalogenotriazine | 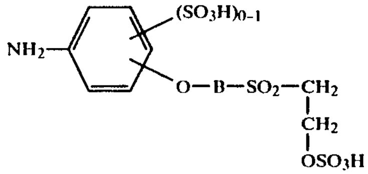 | Hue | $\lambda_{max}(H_2O)$ |
|---|---|---|---|---|---|
| 66 | 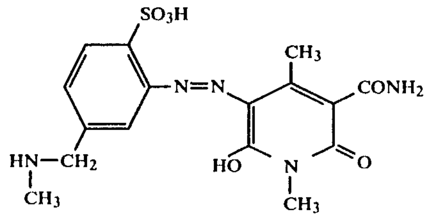 | 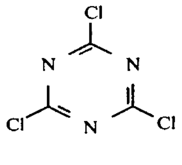 | 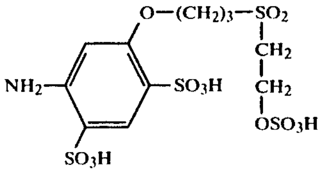 | greenish yellow | |
| 67 | 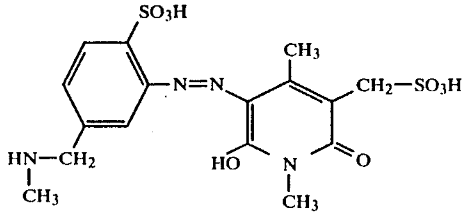 | 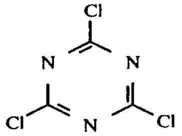 | 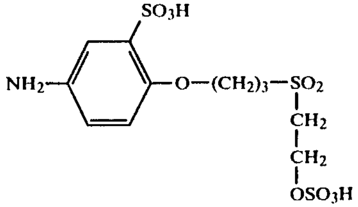 | greenish yellow | |
| 68 | 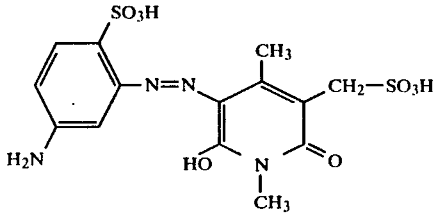 | 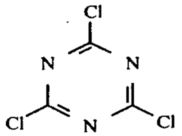 | 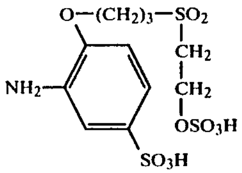 | greenish yellow | 421 nm |
| 69 | 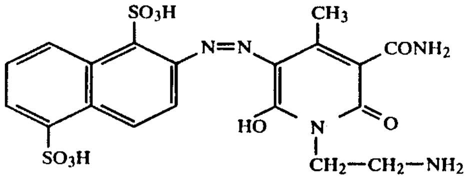 | 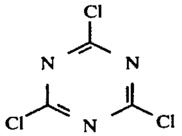 | 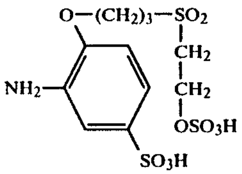 | yellow | |

EXAMPLE 70

40 g of 1-amino-4-(2'-aminomethyl-4'-methyl-6'-sulphophenylamino)-anthraquinone-2-sulphonic acid are dissolved in 800 ml of water and 100 ml of acetone by neutralisation with about 45 ml of 2N sodium hydroxide solution at a pH of 7.

The mixture is cooled to 10° C. and a solution of 17.5 g of cyanuric chloride in 100 ml of acetone is added dropwise over a period of 15 to 20 minutes. During the dropwise addition, the pH in the reaction mixture is maintained at 6.0 to 7.0 with 2N sodium carbonate solution. When sodium carbonate consumption has come to a standstill about 1 hour after the addition of cyanuric chloride, a neutralised solution of 39.7 g of the compound of the formula

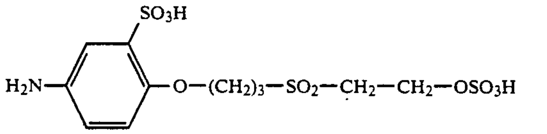

in 100 ml of water are run in at 20° C., and the pH is maintained at 6.5 with sodium carbonate solution. After condensation is complete, the dyestuff is either salted out or isolated by evaporating the solution in vacuo at 35° to 40° C., resulting in a salt-containing product. The dyestuff of the formula

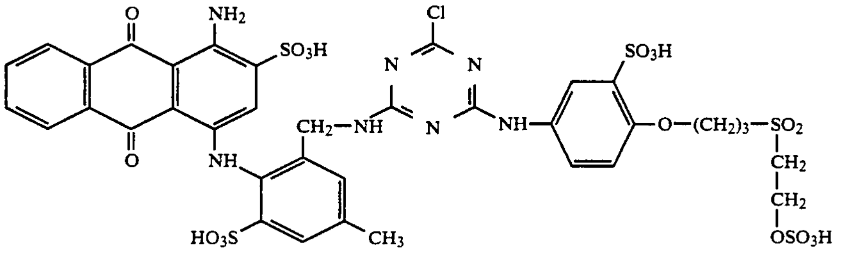

can be used for printing or dyeing of cellulose fabric by the continuous method and produces clear reddish blue shades. Very good fixation yields are obtained ($\lambda_{max}$=624 and 587 nm, in $H_2O$).

EXAMPLE 71

53.1 g of 1-amino-4-(3'-amino-5'-sulpho-2',4',6'-trimethylphenylamino)-anthraquinone-2-sulphonic acid are dissolved in 530 parts of water at a pH of 6.

19.4 g of cyanuric chloride are dissolved in 100 ml of methyl ethyl ketone and the solution is poured onto 100 g of ice. The dyestuff solution is then added dropwise to the cyanuric chloride suspension at 0° to 10° C., and the pH in the reaction mixture is maintained at 4.5 with 10% strength sodium carbonate solution. After conversion is complete, a neutralised solution of 47 g of the compound of the formula

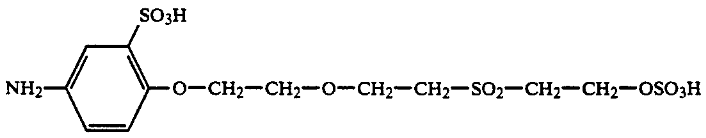

in 130 ml of water is added at 20° to 25° C. and the pH is maintained at 5.8 to 6.0 with sodium carbonate solution until condensation is complete. The dyestuff obtained of the formula

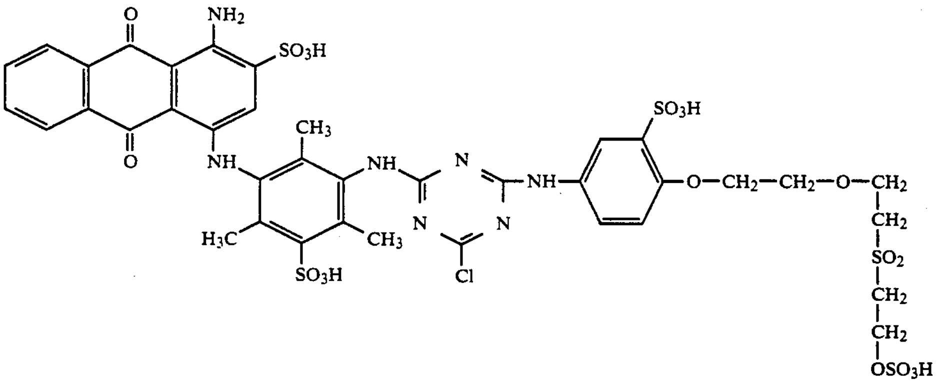

produces, by printing and continuous dyeing processes, on cotton clear, reddish blue shades with a very high fixation yield.

EXAMPLE 72

14.7 g of 1-amino-4-(3'-aminophenylamino)-anthraquinone-2,4'-disulphonic acid are dissolved in 250 ml of water at a pH of 5 and 0° to 5° C. 2.8 ml of cyanuric fluoride are added dropwise to the solution of the dyestuff component over a period of 5 to 10 minutes and the pH is maintained at 4.2 to 4.7 with 2N sodium carbonate solution. Stirring is continued for a short time, after which condensation to give the difluorotriazinyl dyestuff is complete.

A neutralised solution of 13.2 g of the compound of the formula

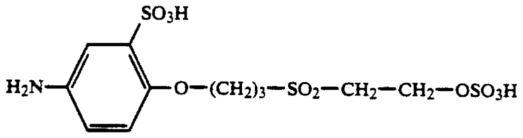

in 50 ml of water is then slowly added to the solution of the reactive dyestuff component, while maintaining the pH at 5.0 to 5.6. The pH is then maintained at 6.0 to 6.5 and the temperature is allowed gradually to increase to 20° C. over a period of 15 hours, after which condensation is complete. The dyestuff solution is then salted out over a period of 2 hours. The precipitated dyestuff of the formula

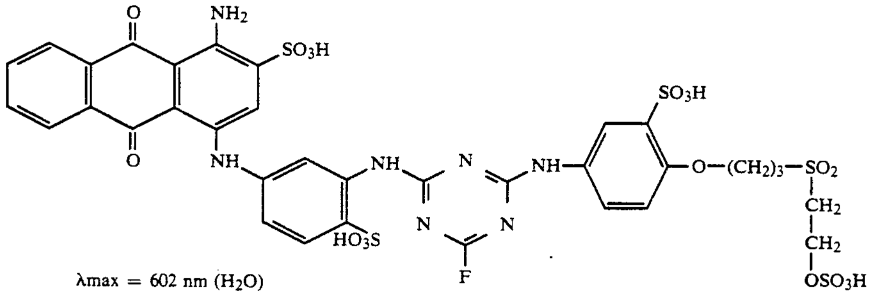

λmax = 602 nm ($H_2O$)

is filtered off with suction and washed with salt solution until the run-off is clear. Drying in vacuo at 45° C. gives a product which can be used to dye and print cellulose fabric in blue hues and with a high fixation yield.

EXAMPLE 73

18.0 g of the component of the formula

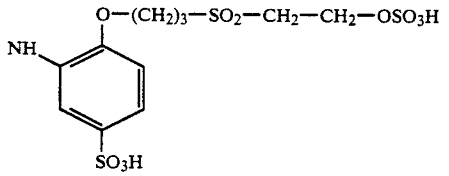

are brought to a pH of 4.0 in 80 ml of water. 1.9 g of sodium fluoride are added to the solution, and the mixture is cooled to 0° to 20° C. 4.2 ml of cyanuric fluoride are then run in with further cooling, and the pH is maintained between 4.0 and 4.5 with sodium carbonate solution. About 15 minutes after the cyanuric fluoride addition, conversion is complete. The solution is then brought to a pH of 4.5 to 5.0. A neutralised solution of 19.0 g of 1-amino-4-(3'-amino-2'-methylphenylamino)-anthraquinone-2,5'-disulphonic acid in 350 ml of water is then added dropwise to the reactive component obtained over a period of 30 minutes. During this, the temperature in the reaction solution is further maintained at 0° to 5° C. and the pH is maintained at 6.0 to 6.5 with sodium carbonate solution. After 2 hours, the temperature is allowed gradually to increase to 10° C. over a period of 15 hours. After condensation is complete, the dyestuff of the formula

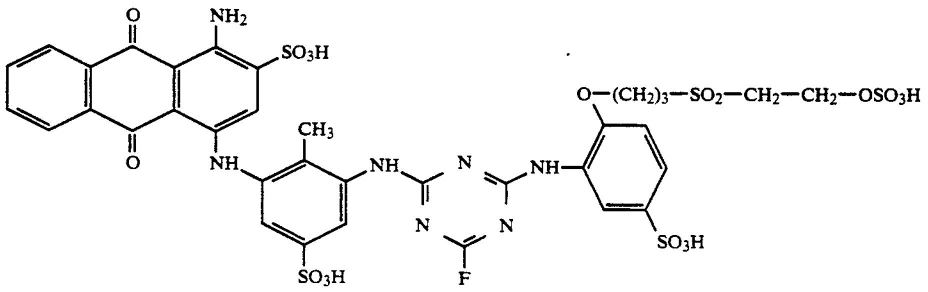

is salted out from the solution with sodium chloride, filtered off with suction, washed with 20% strength sodium chloride solution and dried at 45° C. in vacuo.

The dyestuff produces, on cotton, blue dyeings and prints with a high fixation yield.

Further blue anthraquinone dyestuffs having similar properties are obtained by condensing the anthraquinone components listed below of the general formula

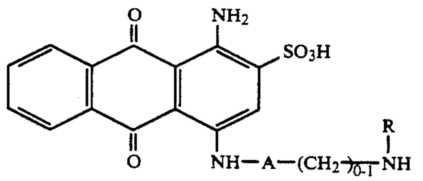

BAS = 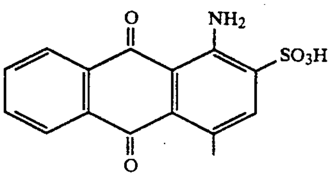

with the trihalogenotriazines and sulphatoethylsulphonylalkoxyanilines by one of the methods described above.

| No. | R<br>BAS—NH—A—$(CH_2)_{0-1}$—NH | Trihalogenotriazine | 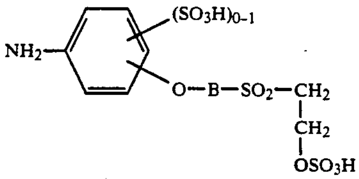 | Hue | $\lambda_{max}(H_2O)$ |
|---|---|---|---|---|---|
| 74 | 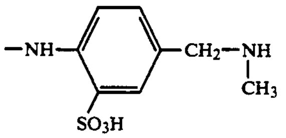 | 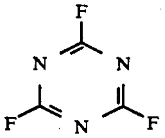 | 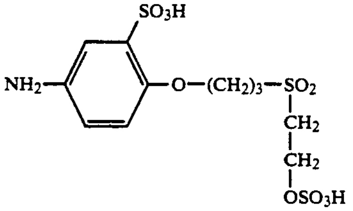 | blue | 599 nm |
| 75 | 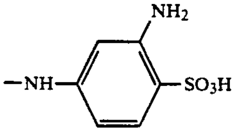 | 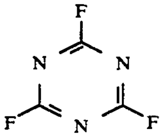 | 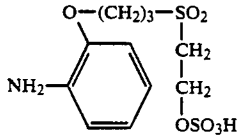 | blue | 597 nm |
| 76 | 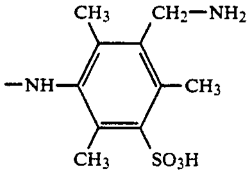 | 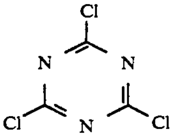 | 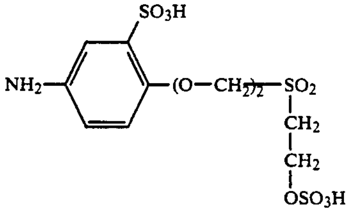 | reddish blue | |
| 77 | 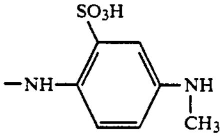 | 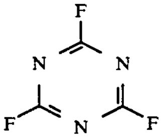 | 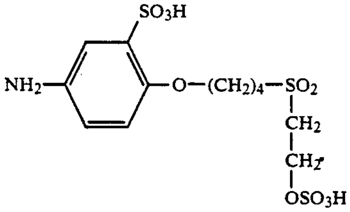 | blue | |
| 78 | 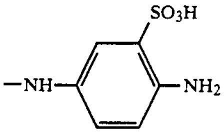 | 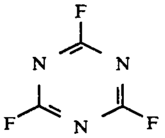 | 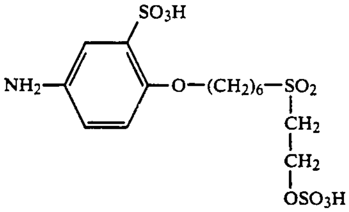 | greenish blue | |
| 79 | 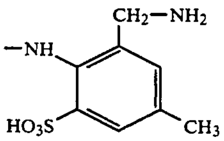 | 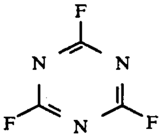 | 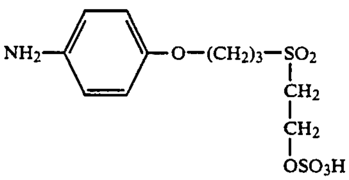 | reddish blue | |
| 80 | 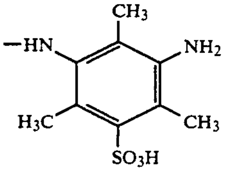 | 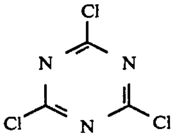 | 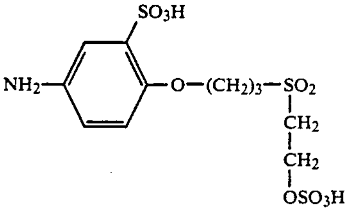 | reddish blue | |

-continued

| No. | 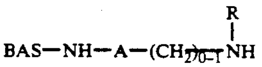 | Trihalogenotriazine | 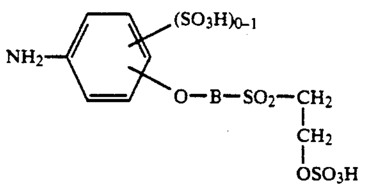 | Hue | $\lambda_{max}(H_2O)$ |
|---|---|---|---|---|---|
| 81 | 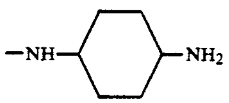 | 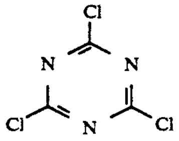 | 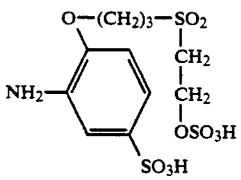 | clear blue | 634 nm, 593 nm |
| 82 | 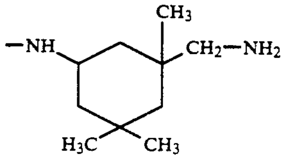 | 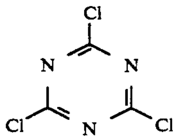 | 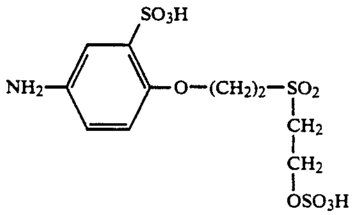 | clear blue | |
| 82a | 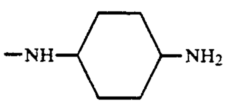 | 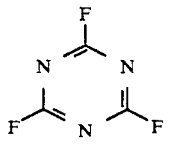 | 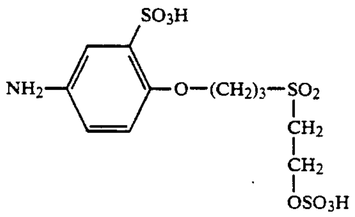 | clear blue | 635 nm, 593 nm |

EXAMPLE 83

23.6 g of the component of the formula

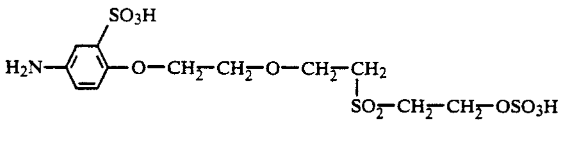

are brought to a pH of 4.0 in 90 ml of water. 2.2 g of sodium fluoride are added to the solution, and the mixture is cooled to 0° C. 4.9 ml of cyanuric fluoride are then run in, and the pH is maintained at 3.5 to 4.0 with 2N sodium carbonate solution. Stirring at 0° C. is continued for a short time, after which conversion is complete. The solution is brought to a pH of 4.5 to 5.0.

0.05 mol of the copper complex of N-(2-carboxy-5-sulphophenyl)-N'-(2'-hydroxy-3'-amino-5'-sulphophenyl)-ms-phenyl-formazan disodium salt is dissolved in 300 ml of water. After cooling to 0° to 5° C., the solution of the component prepared above is run in and the pH is maintained at 5.5 to 6.0 by adding sodium carbonate solution. After 2 hours, the temperature is allowed gradually to increase to 20° C. and, after condensation is complete, the dyestuff is salted out, filtered off with suction and, after buffering at a pH of 6, dried at 45° C. in vacuo.

The dyestuff obtained of the formula

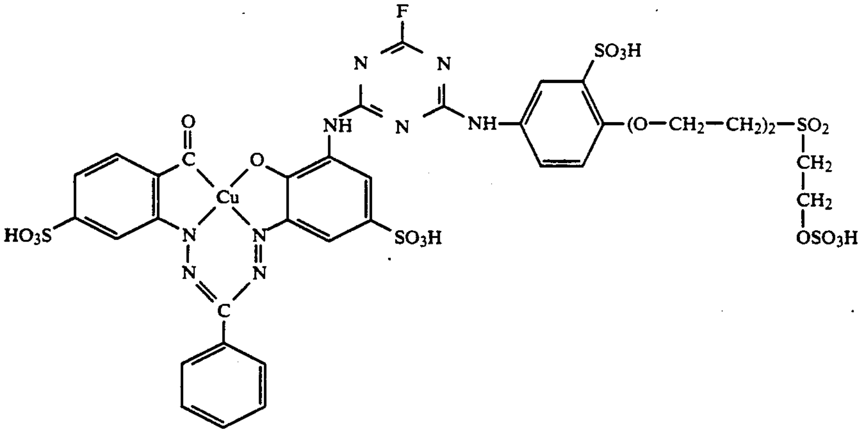

dyes cotton from a long liquor with very high fixation yields in blue hues.

$\lambda_{max}$=618 nm in water.

EXAMPLE 84

0.05 mol of the copper complex of N-(2-carboxy-5-sulphophenyl)-N'-(2'-hydroxy-3'-amino-5'-sulphophenyl)-ms-phenylformazan disodium salt is dissolved in 250 ml of water. After cooling to 0° to 3° C., 4.9 ml of cyanuric fluoride are added dropwise over a period of a few minutes, while maintaining the pH at 5.5 to 6.0 with 10% strength sodium carbonate solution. When condensation is complete after a short period of additional stirring, a solution of 23 g of the component

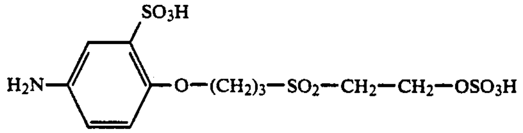

in 60 ml of water brought to a pH of 5 to 6 is added, and the pH is maintained at 5.5 to 6.0 with sodium carbonate solution. After condensation is complete, the dyestuff is salted out with sodium chloride, filtered off with suction and, after buffering to a pH of 6.0, dried at 45° C. in vacuo. It has the formula

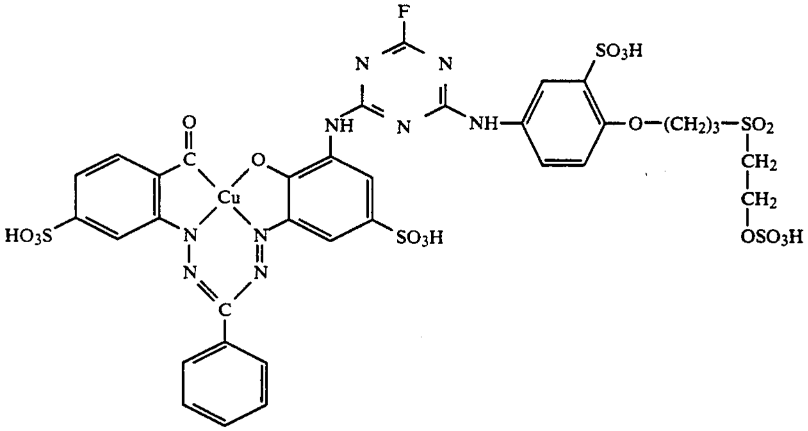

and dyes cotton from a long liquor with very high fixation yields in blue hues. $\lambda_{max}$=614 nm in water.

| No. | Aminoformazan | Trihalogeno-triazine | β-Sulphatoethylsulphonyl-alkoxyaniline | Hue | $\lambda_{max}$ ($H_2O$) |
|---|---|---|---|---|---|
| 85 | N-(2-Hydroxy-3-amino-5-sulphophenyl)-N'-(2'-carboxy-4'-sulphophenyl)-ms-(2"-chloro-5"-sulphophenyl)-formazan, Cu complex | 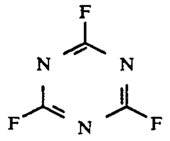 | 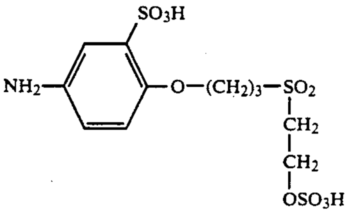 | blue | |

-continued

| No. | Aminoformazan | Trihalogeno-triazine | β-Sulphatoethylsulphonyl-alkoxyaniline | Hue | $\lambda_{max}$ ($H_2O$) |
|---|---|---|---|---|---|
| 86 | N-(2-Hydroxy-5-amino-3-sulphophenyl)-N'-(2',5'-disulphophenyl)-ms-phenyl-formazan, Cu complex | 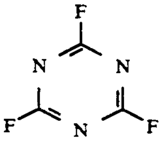 | 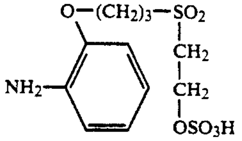 | blue | |
| 87 | 2-(2-Carboxy-4-aminophenyl)-N'-(2'-hydroxy-5'-methylsulfonyl-3'-sulphophenyl)-ms-(2"-sulphophenyl)-formazan, Cu complex | 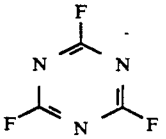 | 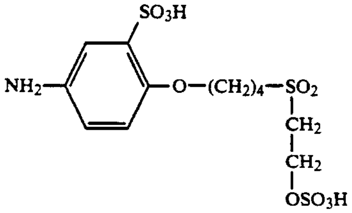 | blue | |
| 88 | N-(2-Carboxy-5-sulphophenyl)-N'-(2'-hydroxy-3',5'-disulphophenyl)-ms-(3"-aminophenyl)-formazan, Cu complex | 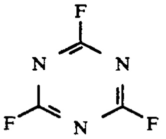 | 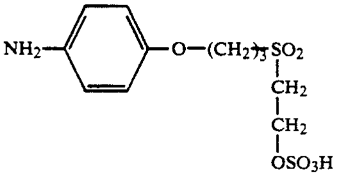 | greenish blue | |
| 89 | N-(4-Amino-2-sulphophenyl)-N'-(2'-hydroxy-4'-sulphophenyl)-ms-(4"-chloro-3"-sulphophenyl)-formazan, Cu complex | 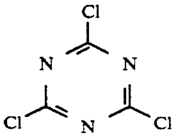 | 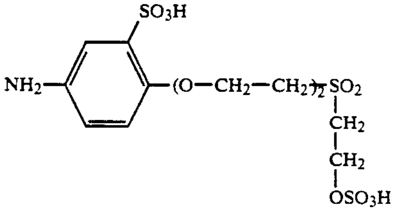 | blue | |
| 90 | N-(2-Hydroxy-3-amino-5-sulphophenyl)-N'-(2'-hydroxy-4'-sulphophenyl)-ms-(2'-sulphophenyl), Cu complex | 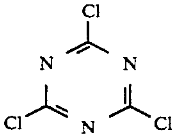 | 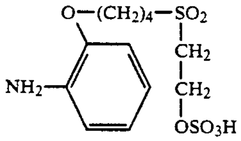 | navy | |
| 91 | N-(2-Carboxy-5-sulphophenyl)-N'-2-hydroxy-5'-amino-3'-sulphophenyl)-ms-(4"-sulphophenyl)-formazan, Cu complex | 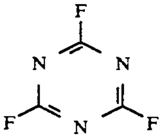 | 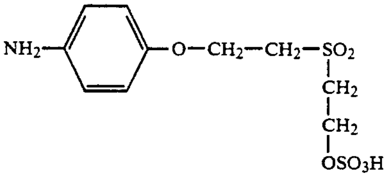 | blue | |
| 92 | N-(2-Carboxy-5-sulphophenyl)-N'-(2'-hydroxy-3'-amino-5'-sulphophenyl)-ms-phenylformazan, Cu complex | 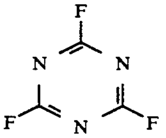 | 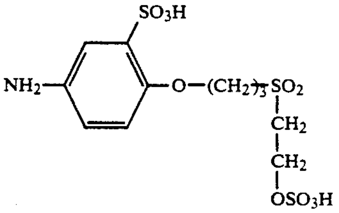 | blue | |
| 93 | N-(2-Carboxy-4-sulphophenyl)-N'-(2'-hydroxy-3'-amino-5'-sulphophenyl)-ms-phenylformazan, Cu complex | 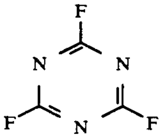 | 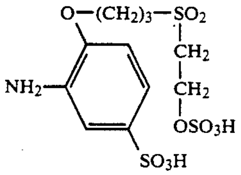 | blue | |

-continued

| No. | Aminoformazan | Trihalogeno-triazine | β-Sulphatoethylsulphonyl-alkoxyaniline | Hue | $\lambda_{max}$ ($H_2O$) |
|---|---|---|---|---|---|
| 94 | N-(2,4-Disulphophenyl)-N'-(2'-hydroxy-4,6-disulphophenyl)-ms-(3''-aminophenyl)-formazan, Cu complex | 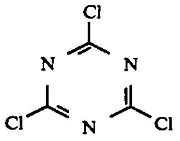 | 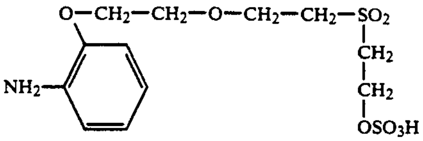 | blue | |
| 95 | N-(2-Carboxy-5-sulphophenyl)-N'-(2'-hydroxy-4'-methylsulphonyl-6'-sulphophenyl)-ms-(3''-aminophenyl)-formazan, Cu complex | 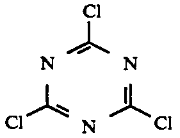 | 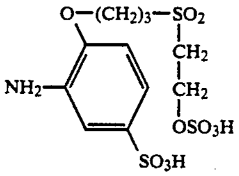 | blue | |
| 96 | N-(2-Hydroxy-5-sulphophenyl)-N'-(2'-hydroxy-3',5'-disulphophenyl)-ms-(4''-aminophenyl)-formazan, Cu complex | 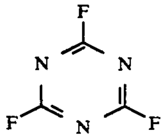 | 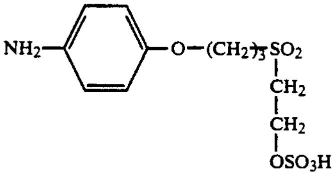 | blue | |
| 97 | N-(2-Carboxy-5-sulphophenyl)-N'-(2'-hydroxy-3'-amino-5'-sulphophenyl)-ms-(4''-methyl-3''-bromophenyl)-formazan, Cu complex | 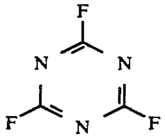 | 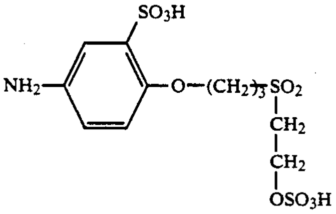 | blue | |
| 98 | N-(2-Carboxy-4-aminophenyl)-N'-(2'-hydroxy-4'-sulphonaphth-1'-yl)-ms-(2''-sulphophenyl)-formazan, Cu complex | 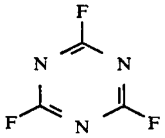 | 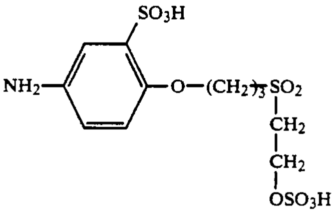 | blue | |
| 98a | N-(2-Carboxy-4-sulphophenyl)-N'-(2'-hydroxy-3'-amino-5'-sulphophenyl)-ms-phenylformazan, Cu complex | 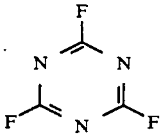 | 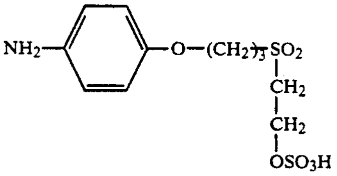 | blue | |
| 98b | N-(2-Carboxy-5-sulphophenyl)-N'-(2'-hydroxy-3'-amino-5'-sulphophenyl)-ms-phenylformazan, Cu complex | 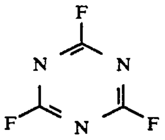 | 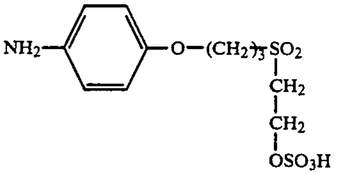 | blue | 618 nm |
| 98c | N-(2-Carboxy-5-sulphophenyl)-N'-(2'-hydroxy-3'-amino-5'-sulphophenyl)-ms-(2''-sulphophenyl)-formazan, Cu complex | 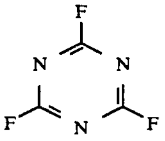 | 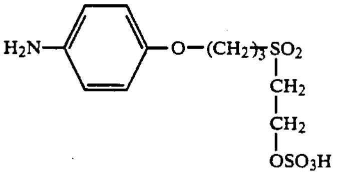 | blue | |

-continued

| No. | Aminoformazan | Trihalogeno-triazine | β-Sulphatoethylsulphonyl-alkoxyaniline | Hue | $\lambda_{max}$ ($H_2O$) |
|---|---|---|---|---|---|
| 98d | N-(2-carboxy-5-sulphophenyl)-N'-(2'-hydroxy-5'-amino-3'-sulphophenyl-ms-phenylformazan, Cu complex | 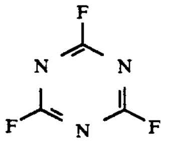 | 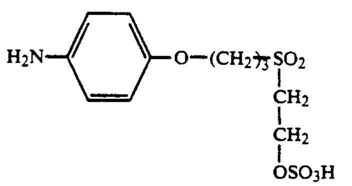 | blue | |

EXAMPLE 99

A neutralised solution of 15.5 g of the component of the formula

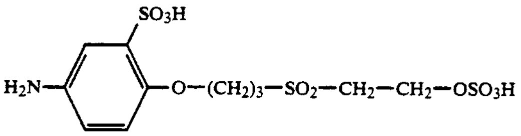

and 1.6 g of sodium fluoride in 60 ml of water is cooled to 0° to 2° C. 5.5 g of cyanuric fluoride are run in and the pH is maintained between 3.5 and 4.0 with 2N sodium carbonate solution. After condensation is complete, the pH is brought to 5.0.

32 g of the copper phthalocyanine component of the formula

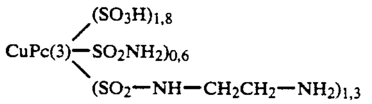

prepared by the procedure given in European Patent 0,073,267 are dissolved in 300 ml of water at a pH of 7.0 to 7.5. The solution of the above condensation product is then run into the dyestuff component at 0° to 5° C., and the pH in the reaction mixture is maintained at 7.0 to 7.5. After 3 hours, the temperature is allowed gradually to increase to 20° C. and the pH is further kept constant. After conversion is complete, the product obtained is salted out f rom the solution, filtered off with suction, buffered at a pH of 6.0 with a small amount of phosphate solution and dried at 45° C. in vacuo. The dyestuff has the formula

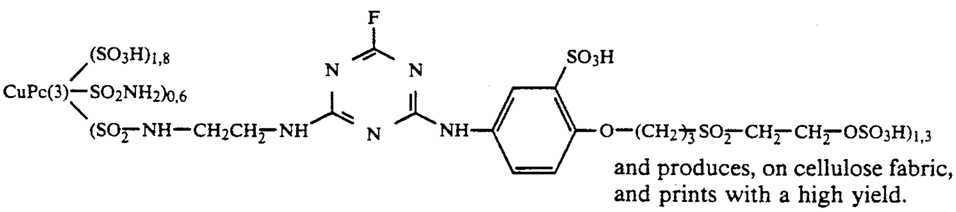

and dyes cotton from a long liquor and by the conventional continuous processes in greenish blue hues. $\lambda_{max}$=668 nm, 627 nm in water.

EXAMPLE 100

28.3 g of the copper phthalocyanine compound of the formula

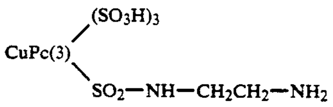

(prepared by condensing copper phthalocyaninetetrasulphonyl chloride/sulphonic acid with monoacetylethylenediamine, followed by hydrolysis by the procedure given in German Offenlegungsschrift 1,644,681, Example 2) are dissolved in 380 ml of water at a pH of 8.5. The solution is added dropwise over a period of 30 minutes to a suspension obtained by pouring a solution of 5.6 g of cyanuric chloride in 45 ml of acetone onto 45 g of ice.

The pH in the reaction mixture is maintained at 7.0 to 7.5 by adding 2N sodium hydroxide solution and the temperature is maintained at 0° to 5° C. Stirring is continued for 1 hour, after which the solution is clarified and 10.3 g of 2-[3-(2-sulphatoethylsulphonyl)-propoxy)-5-aminobenzenesulphonic acid are added to the filtrate in portions.

During the addition and later on, the pH in the reaction mixture is maintained at 6.0 to 6.5 and after the addition the temperature is increased to 20° to 25° C. After condensation is complete, the dyestuff is salted out from the solution with sodium chloride, filtered off with suction and dried at 40° to 50° C. in vacuo. The dyestuff has the formula

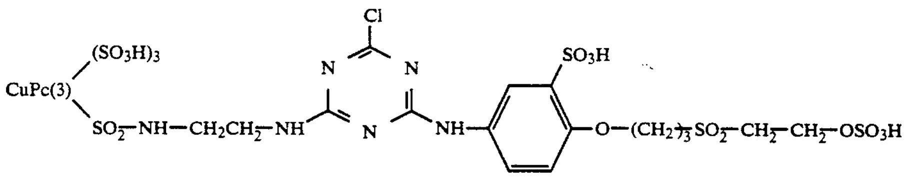

and produces, on cellulose fabric, greenish blue dyeings and prints with a high yield.

$\lambda_{max}$=668 run, 629 nm in $H_2O$.

EXAMPLE 101

31.2 g of the copper phthalocyanine compound of the formula

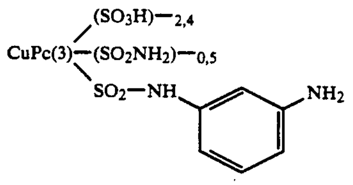

prepared by condensing copper phthalocyanine-tetrasulphonyl chloride/sulphonic acid with 3-aminoacetanilide and ammonia, followed by hydrolysis of the acetylamino group in dilute sodium hydroxide solution at 75° C., are dissolved in 420 ml of water at a pH of 7. The solution is added dropwise over a period of 30 minutes to a suspension prepared from a solution of 5.9 g of cyanuric chloride in 50 ml of acetone and 50 g of ice, and the temperature in the reaction mixture is maintained at 0° to 3° C. and the pH is maintained at 4.0 to 4.5 by metering in 2N sodium carbonate solution. 30 minutes after addition has ended, the resulting solution is clarified, and a neutral solution of 10.9 g of 4-[3-(2-sulphatoethylsulphonyl)propoxy)-aniline in 200 ml of water is added. By further addition of sodium carbonate, the condensation reaction is carried out at a pH of 6.0 to 6.5, during which the temperature is brought to 20° to 25° C. The dyestuff obtained is isolated either by evaporation in vacuo or by salting out and filtering off with suction followed by drying.

It has the formula

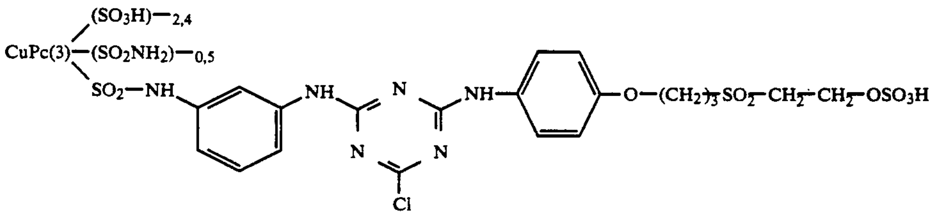

$\lambda_{max}$=668 nm, 629 nm in water and dyes and prints cotton, by processes known for reactive dyestuffs, in a high yield in greenish blue hues which have good fastness properties.

Further phthalocyanine reactive dyestuffs are obtained by condensing the phthalocyanine components, trihalogenotriazines and β-sulphatoethylsulphonylalkoxyanilines indicated in the list below with one another by one of the methods described above.

| No. | Phthalocyanine component | Trihalogenotriazine | β-Sulphatoethylsulphonylalkoxyaniline | Hue | $\lambda_{max}$ ($H_2O$) |
|---|---|---|---|---|---|
| 102 | 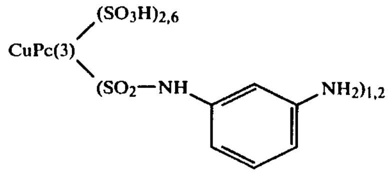 | 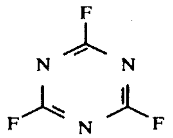 | 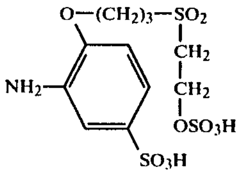 | greenish blue | |
| 103 | 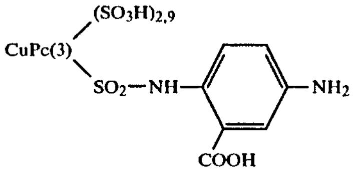 | 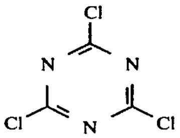 | 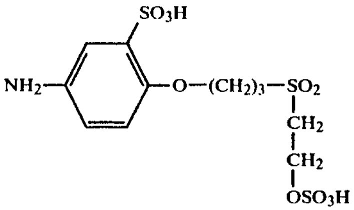 | greenish blue | |
| 104 | 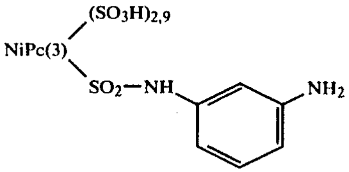 | 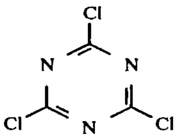 | 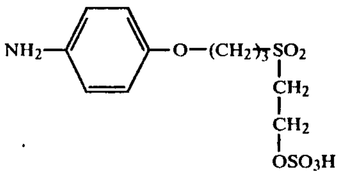 | bluish green | |
| 105 | 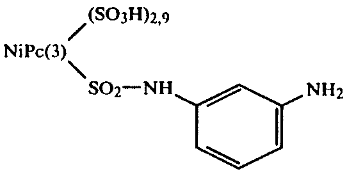 | 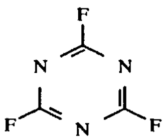 | 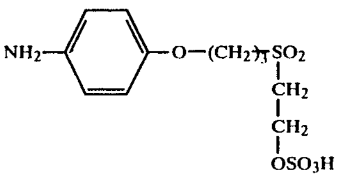 | bluish green | |
| 106 | 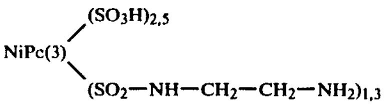 | 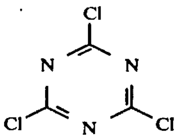 | 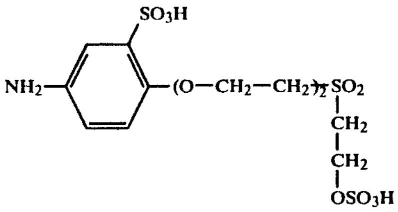 | bluish green | |

-continued
| No. | Phthalocyanine component | Trihalogenotriazine | β-Sulphatoethylsulphonylalkoxyaniline | Hue | $\lambda_{max}$ ($H_2O$) |
|---|---|---|---|---|---|
| 107 | 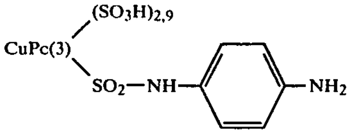 | 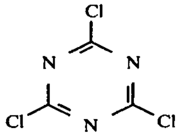 | 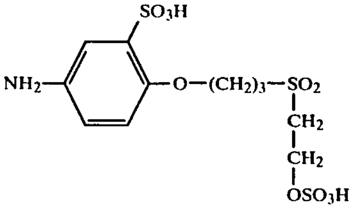 | greenish blue | |
| 108 | 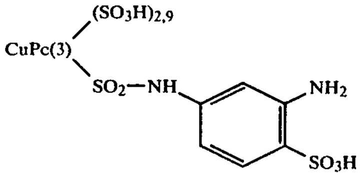 | 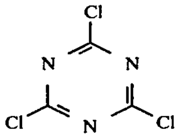 | 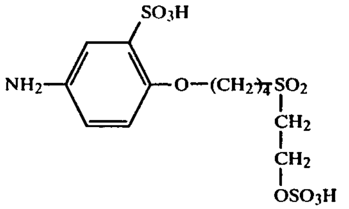 | greenish blue | |
| 109 | 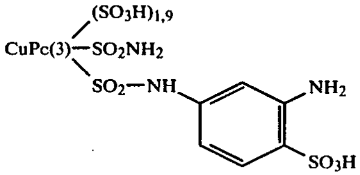 | 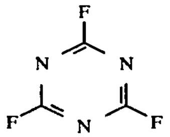 | 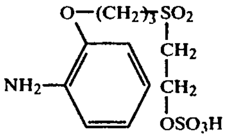 | greenish blue | |
| 110 | 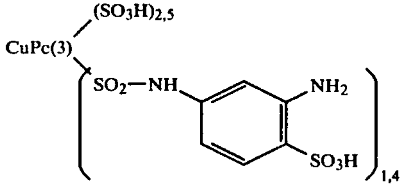 | 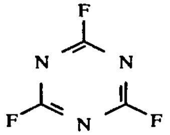 | 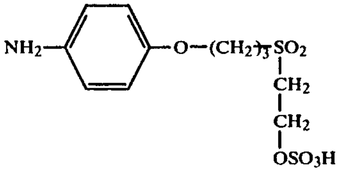 | greenish blue | |
| 111 | 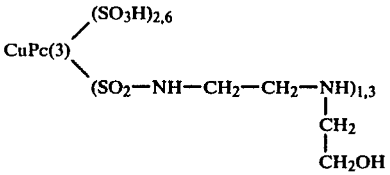 | 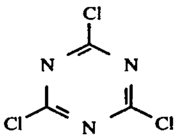 | 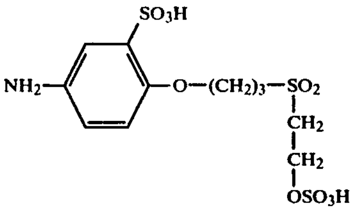 | greenish blue | |

-continued
| No. | Phthalocyanine component | Trihalogenotriazine | $\beta$-Sulphatoethylsulphonylalkoxyaniline | Hue | $\lambda_{max}$ ($H_2O$) |
|---|---|---|---|---|---|
| 112 | 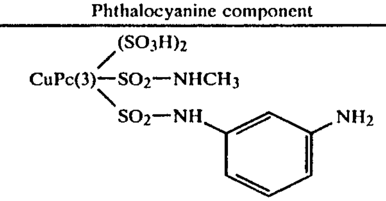 | 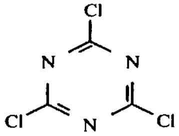 | 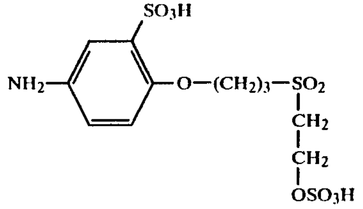 | greenish blue | |
| 113 | 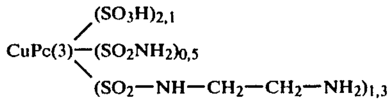 | 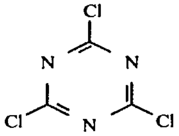 | 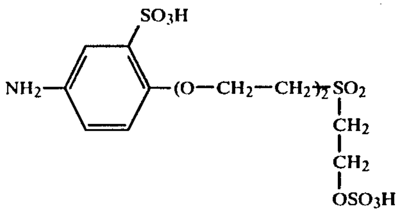 | greenish blue | |
| 113a | 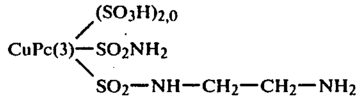 | 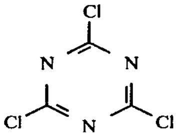 | 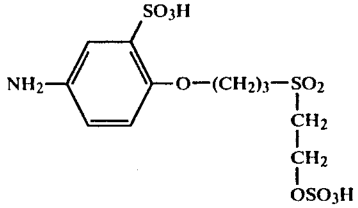 | türkis | 668 nm, 627 nm |

EXAMPLE 114

36.7 g of the amino-disazo compound prepared in the known manner of the formula

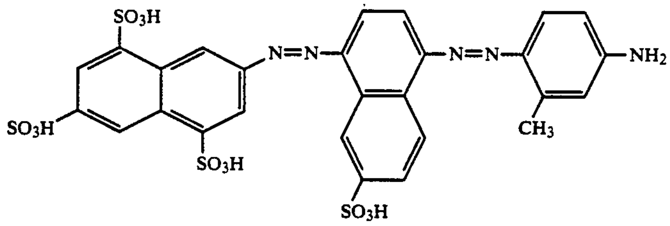

are dissolved in 400 ml of water at a pH of 6.0. After cooling the solution to 0° C., 5.0 ml of cyanuric fluoride are swiftly added dropwise and the pH is maintained at 4.5 to 5.0 with 2N sodium carbonate solution.

After this first condensation step is complete, 19.1 g of 4-[3-(2-sulphatoethylsulphonyl)- propoxy)-aniline are added and the pH is maintained at 5.5 to 6.0 with sodium carbonate solution. Stirring at 0° to 5° C. is continued for 2 hours, and the temperature is then allowed to rise to 20° C. with further pH control. The dyestuff obtained of the formula

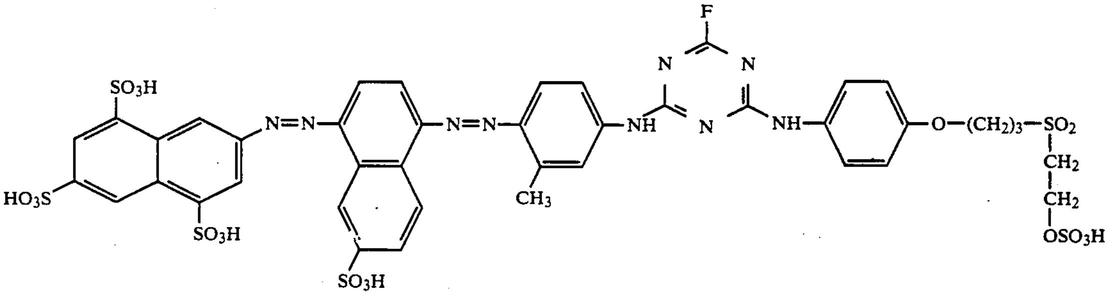

is salted out with sodium chloride, filtered off with suction and, after buffering at a pH of 6, dried at 45° C. in vacuo. It dyes cotton, by the processes known for reactive dyestuffs, with a high yield in brown hues.

EXAMPLE 115

If the compound of the formula

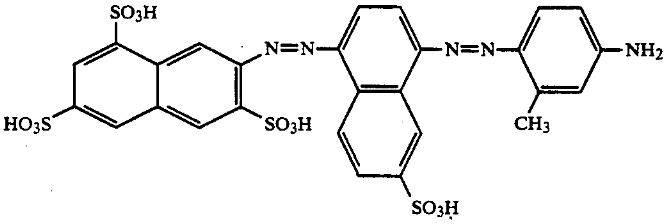

is condensed instead of the aminodisazo compound from Example 114 with cyanuric fluoride and then with the compound of the formula

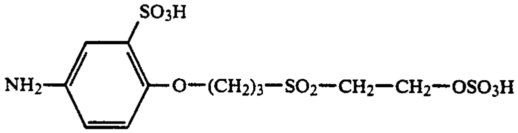

a dyestuff of the formula

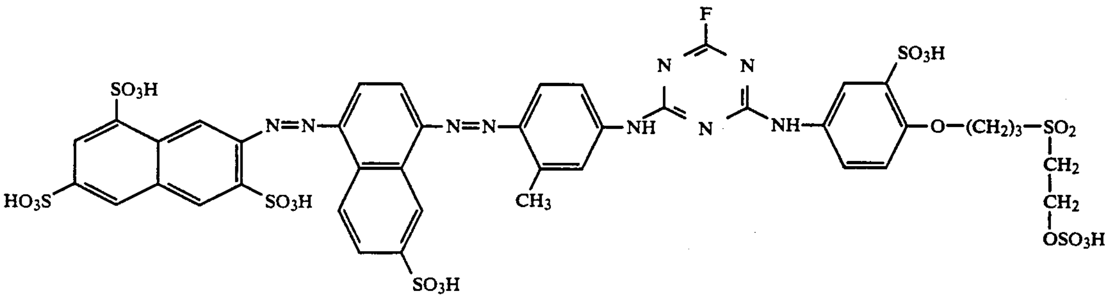

is obtained, which dyes cotton also with a high yield in brown hues.

Further brown reactive dyestuffs are obtained by condensing the following components.

| No. | Aminodisazo compound | Trihalogenotriazine | β-Sulphatoethylsulphonylalkoxyaniline | Hue |
|---|---|---|---|---|
| 116 | 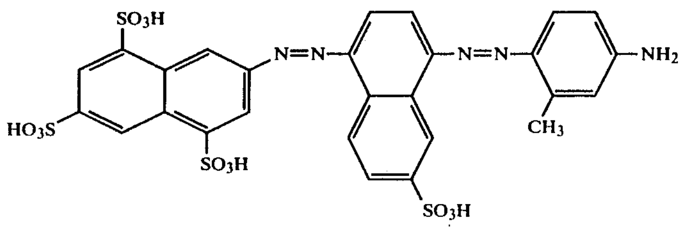 | 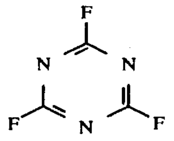 | 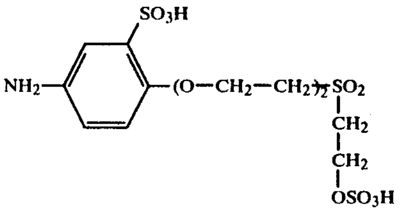 | brown |
| 117 | 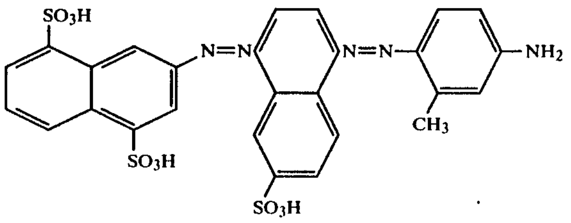 | 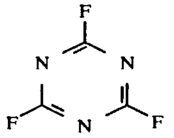 | 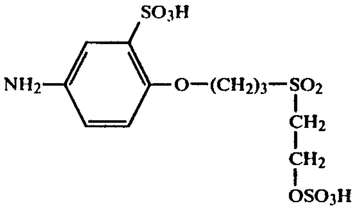 | brown |
| 118 | 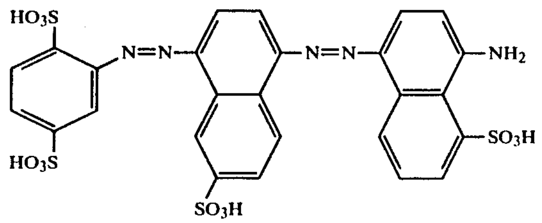 | 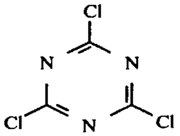 | 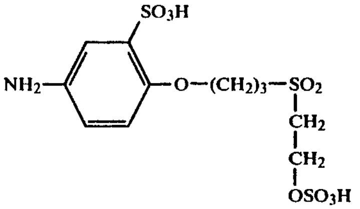 | brown |
| 119 | 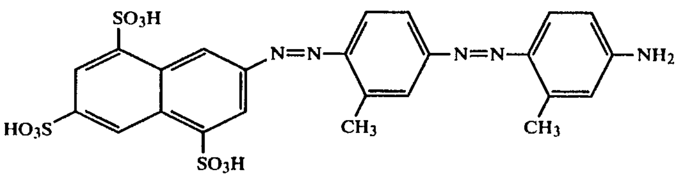 | 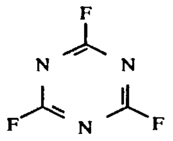 | 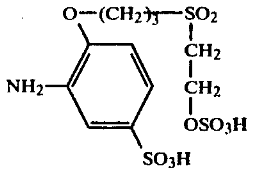 | orange-brown |

EXAMPLE 120

50.3 g of the aminoazo compound of the formula

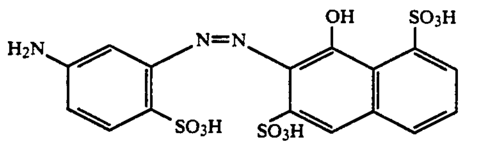

are dissolved in 400 ml of water at a pH of 6. The solution is cooled to 0° to 2° C., and 9.3 ml of cyanuric fluoride are added dropwise over a period of a few minutes. During this operation, the pH is maintained at 4.5 with 2N sodium carbonate solution, and stirring of the mixture under the same conditions is continued for a short period. When sodium carbonate consumption has come to a standstill, a solution of 35.4 g of 4-[3-(2-sulphatoethylsulphonyl)-propoxy)-aniline in 180 ml of water brought to a pH of 6 with 10% strength lithium hydroxide solution is run in, and the pH in the reaction mixture is maintained at 5.5 to 6.0. After 3 hours, the temperature is allowed gradually to increase to 20° C., and the dyestuff obtained of the formula

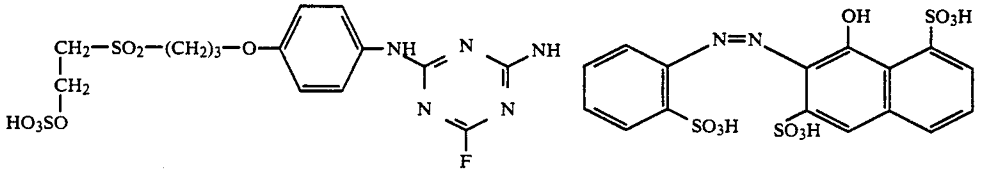

is isolated by salting it out and filtering it off with suction. Gentle drying gives a powder which dyes cotton by the customary methods with a high yield in scarlet hues.

EXAMPLE 121

If the aminoazo compound in Example 120 is replaced by an equivalent amount of the isomeric compound

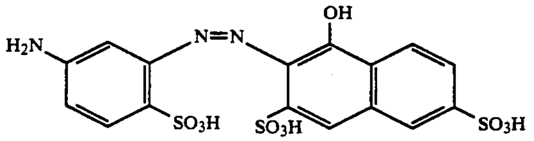

and condensed with cyanuric fluoride and, in a second step, with a compound of the formula

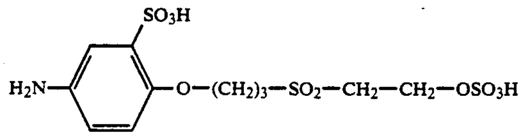

the dyestuff of the formula

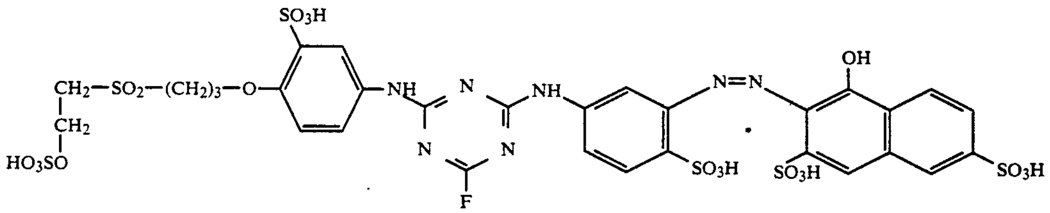

is obtained, which dyes cotton in reddish orange hues with high fixation yields.

Further reactive dyestuffs based on aminoazonaphthol compounds are obtained by condensing the components below.

| No. | Aminoazonaphthol component | Trihalogenotriazine | β-Sulphatoethylsulphonylalkoxyaniline | Hue |
|---|---|---|---|---|
| 122 | 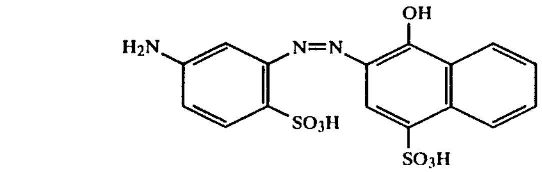 | 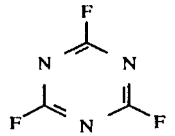 | 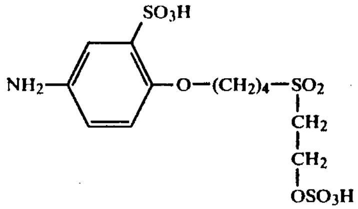 | orange |
| 123 | 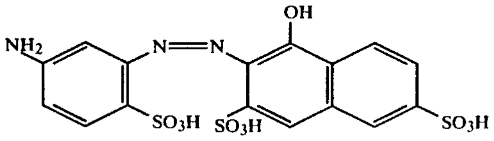 | 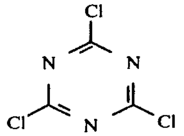 | 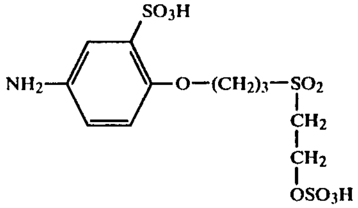 | orange |
| 124 | 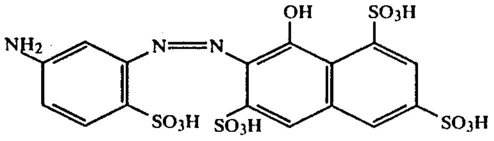 | 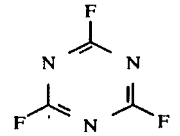 | 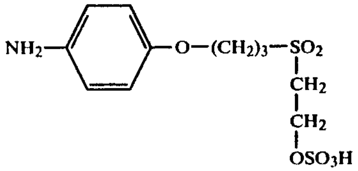 | yellowish red |
| 125 | 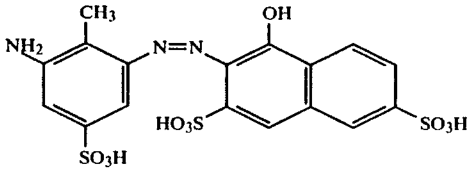 | 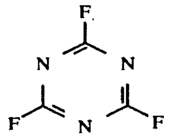 | 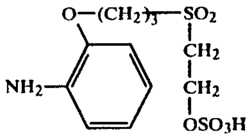 | orange |
| 126 | 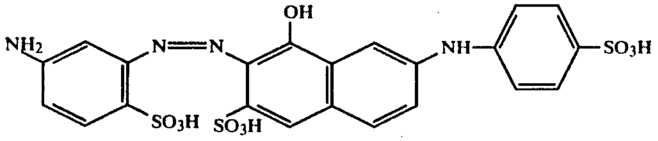 | 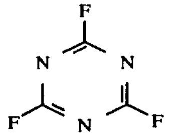 | 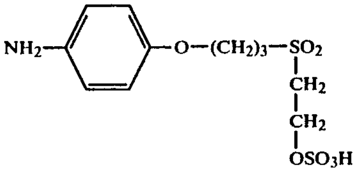 | brown |

-continued
| No. | Aminoazonaphthol component | Trihalogenotriazine | β-Sulphatoethylsulphonylalkoxyaniline | Hue |
|---|---|---|---|---|
| 127 | 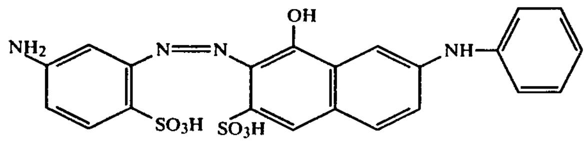 | 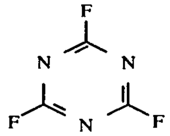 | 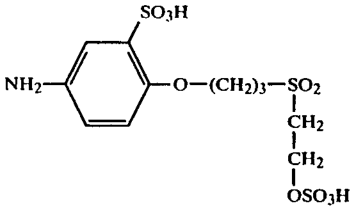 | brown |

EXAMPLE 126

18.8 g of 2,4-diaminobenzenesulphonic acid are condensed in 100 ml of water at 0° to 3° C. and a pH of 4.5 with 18.5 g of cyanuric chloride. 105 ml of 10% strength hydrochloric acid are added, 6.9 g of $NaNO_2$ in 60 ml of water are then added and the mixture is stirred until diazotisation is complete.

A neutral aqueous solution of 36.1 g of 1-acetylamino-8-hydroxynaphthalene-4,6-disulphonic acid is run into the diazo suspension, and the pH is brought to 6.5 to 7.0 with sodium carbonate solution in order to effect coupling. The temperature is allowed to rise to 10° C. over a period of 2 hours and to 20° C. over a further 2 hours. After coupling is complete, 34 g of 4-[3-(2-sulphatoethylsulphonyl)-propoxy)-aniline are introduced in portions into the batch, and the pH is further maintained at 6.5. When condensation is complete, the dyestuff obtained of the formula

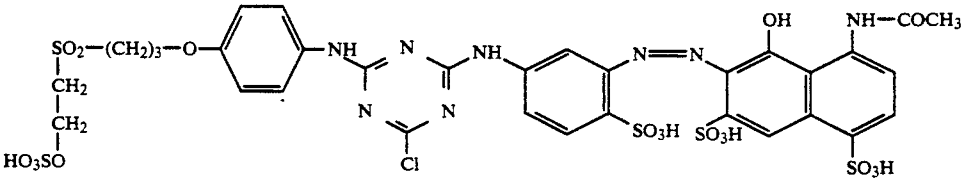

is salted out, filtered off with suction, and dried at 45° C. in vacuo. It dyes cotton in red hues with a high fixation yield.

Similar dyestuffs are obtained by condensing the components indicated in the list below with one another.

| No. | Diaminobenzenesulphonic acid | Trihalogenotriazine | Coupling component | β-Sulphatoethylsulphonylalkoxyaniline | Hue |
|---|---|---|---|---|---|
| 129 | 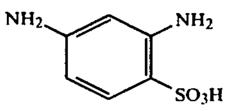 | 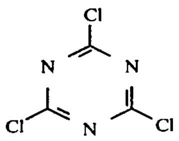 | 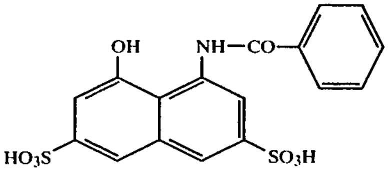 | 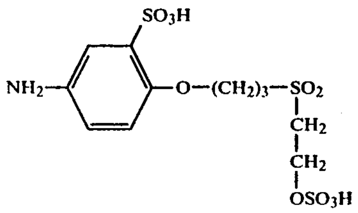 | red |
| 130 | 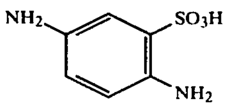 | 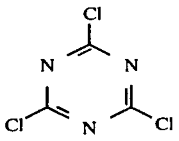 | 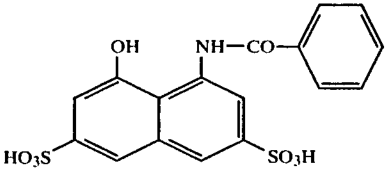 | 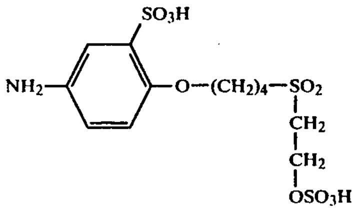 | red |
| 131 | 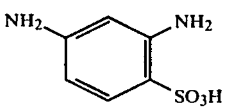 | 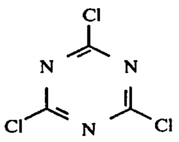 | 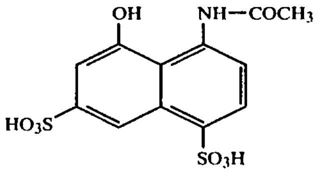 | 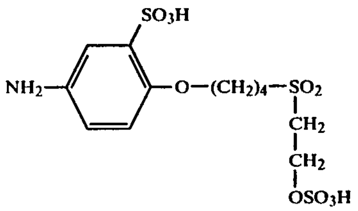 | red |
| 132 | 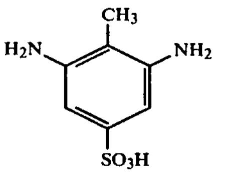 | 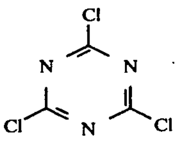 | 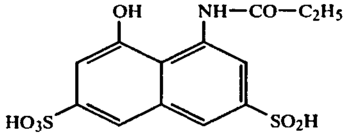 | 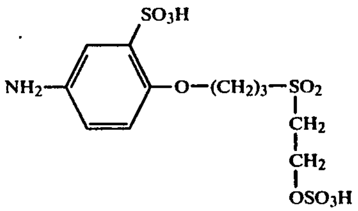 | red |

-continued
| No. | Diaminobenzenesulphonic acid | Trihalogenotriazine | Coupling component | β-Sulphatoethylsulphonylalkoxyaniline | Hue |
|---|---|---|---|---|---|
| 133 | 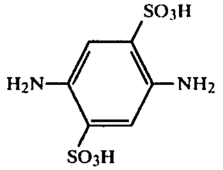 | 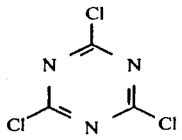 | 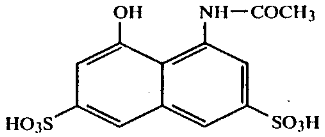 | 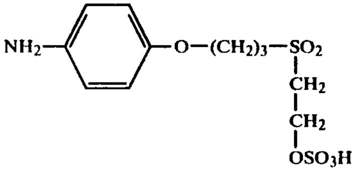 | red |
| 134 | 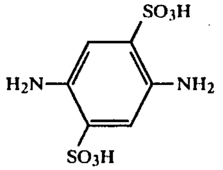 | 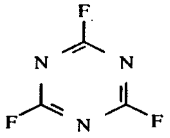 | 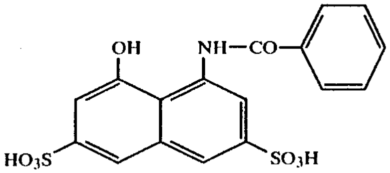 | 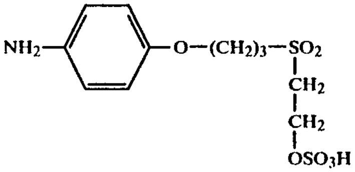 | red |
| 135 | 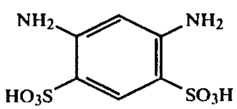 | 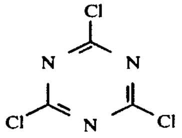 | 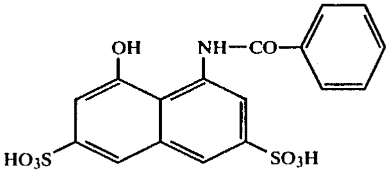 | 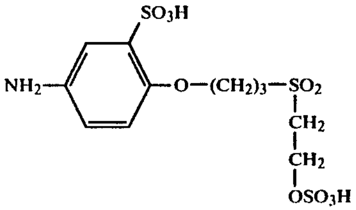 | red |

EXAMPLE 136

According to Example 99, 21.0 g of the component of the formula

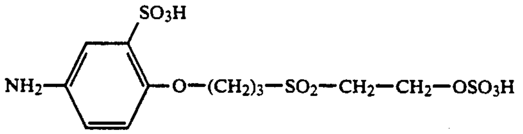

are condensed with 7.4 g of cyanuric fluoride in 80 ml of water in the presence of 2.1 g of sodium fluoride. The solution obtained of the condensation product is run into a solution of 31 g of the azo compound of the formula

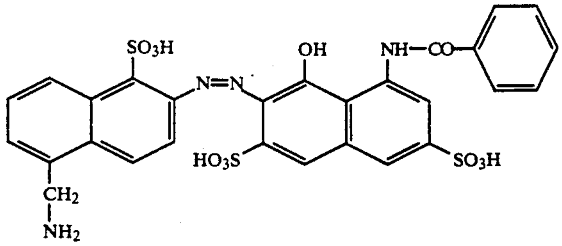

in 300 ml of water brought to a pH of 7 and cooled to 0° to 5° C., and the pH in the mixture is maintained at 6.5 with dilute sodium carbonate solution. After 3 hours, the temperature is gradually increased to 20° C. After condensation is complete, the dyestuff is isolated by salting it out and filtering it off with suction and, after buffering to a PH of 6.5, it is dried at 45° C. in vacuo. It has the formula

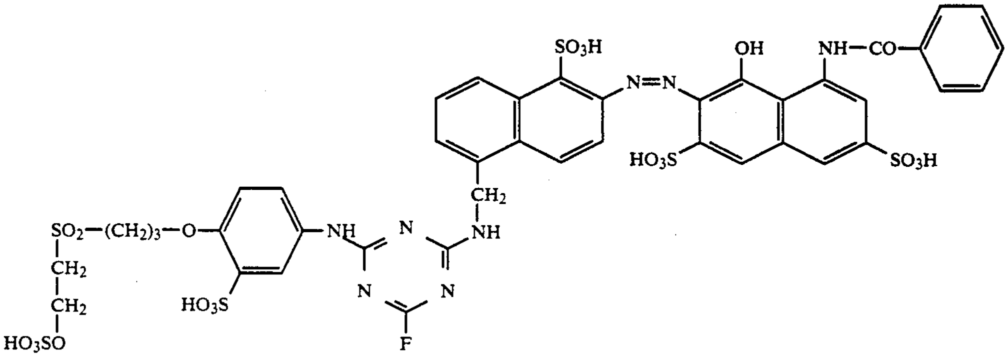

and dyes cotton from a long liquor in bluish red hues with a high fixation yield.

Similar red dyestuffs are obtained by reacting the following components.

| No. | Azo component | Trihalogenotriazine | 2-Sulphatoethylsulphonylalkoxyaniline |
|---|---|---|---|
| 137 | 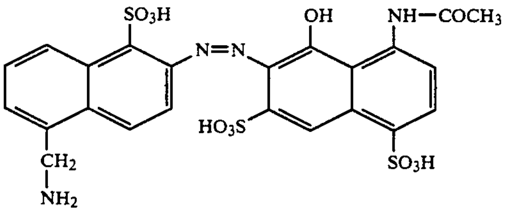 | 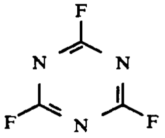 | 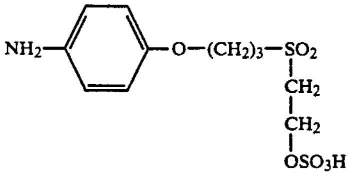 |
| 138 | 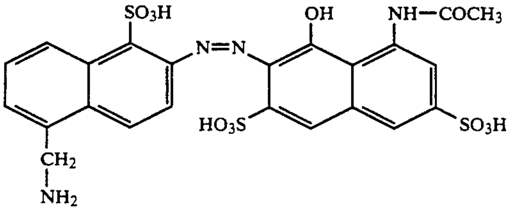 | 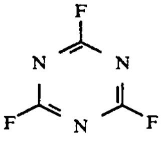 | 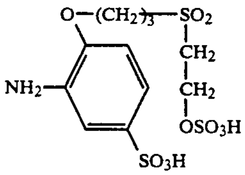 |

-continued

| No. | Azo component | Trihalogenotriazine | 2-Sulphatoethylsulphonylalkoxyaniline |
|---|---|---|---|
| 139 | 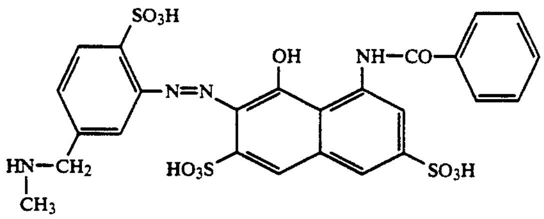 | 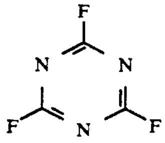 | 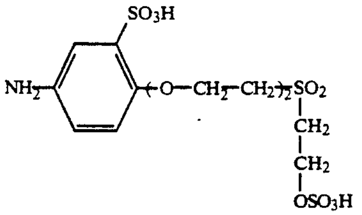 |
| 140 | 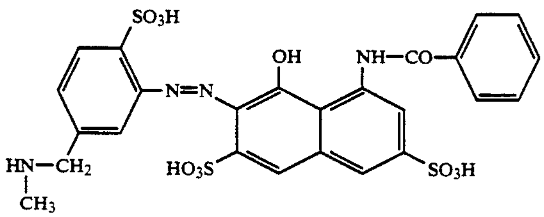 | 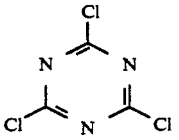 | 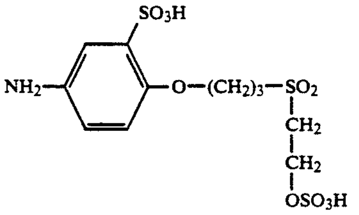 |

EXAMPLE 141

According to Example 99, 21 g of 5-amino-2-[3-(2-sulphatoethylsulphonyl)-propoxy]-benzenesulphonic acid in 80 ml of water and 2.1 g of sodium fluoride are condensed with 7.5 g of cyanuric fluoride.

22.1 g of the triphendioxazine compound of the formula

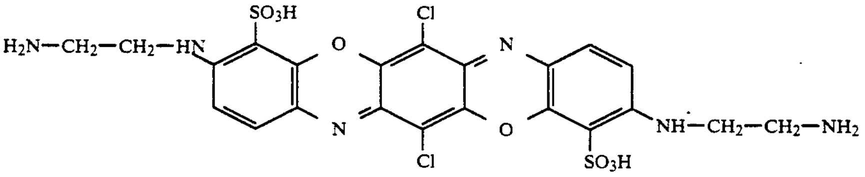

are dissolved in 300 ml of water by adding sodium hydroxide solution at a pH of 11.5-12.

This solution and that of the reactive components prepared above are added dropwise simultaneously to 80 ml of initially introduced ice water, and the pH in the reaction mixture is maintained at 8-8.5 with 2N sodium hydroxide solution and the temperature is further maintained at 0°-2° C. After several hours, conversion is complete. The temperature is allowed to rise to 20° C. overnight. The dyestuff is salted out, filtered off with suction and, after buffering to a pH of 6.7, dried at 45° C. in vacuo. It has the formula

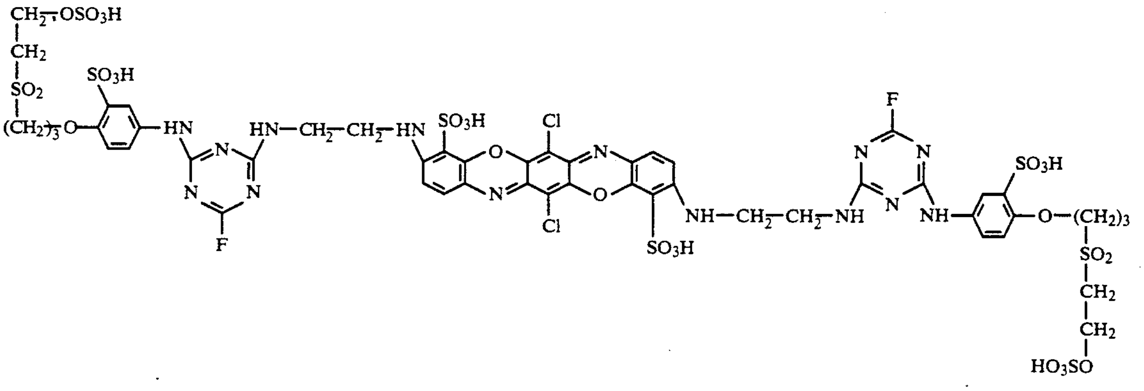

and dyes cotton by the customary methods in strong blue shades with high fixation yields.

EXAMPLE 142

27 g of the triphendioxazine compound of the formula

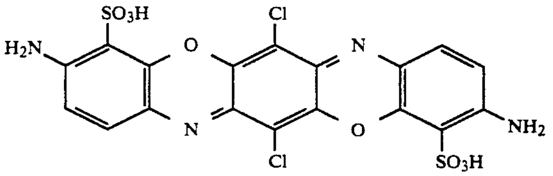

are dissolved in 1,000 ml of water by bringing the pH to 7.0 with 10% strength lithium hydroxide.

The mixture is cooled to 0° to 5° C., and a solution of 9.2 g of cyanuric chloride in 50 ml of acetone is added dropwise.

The pH in the reaction mixture is maintained at 6.0 to 6.5 by dropwise addition of lithium hydroxide solution. To complete the reaction, the temperature is raised to 20° C. over a period of 2 hours and the pH is further maintained within the above limits until consumption of the neutralising agent has come to a standstill. A neutralised solution of 20.8 g of 5-amino-2-[3-(β-sulphatoethylsulphonyl)-propoxy)-benzenesulphonic acid in 80 ml of water is then added to the primary condensation product and the pH is further maintained at 6.0 to 6.5 with lithium hydroxide.

The dyestuff obtained of the formula

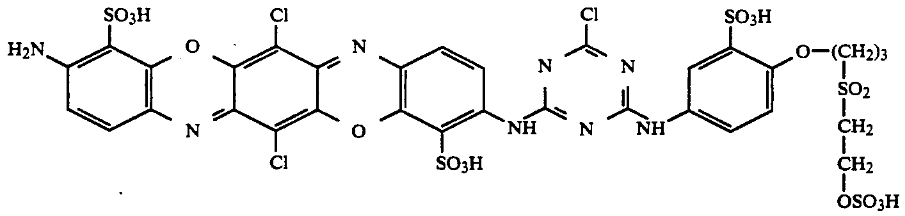

dyes cotton from a long liquor at an optimum dyeing temperature of 70° C. to 80° C. in strongly reddish blue hues.

Further triphendioxazine reactive dyestuffs are obtained by a procedure analogous to that for Examples 141 and 143 by condensing the following component:

| No. | Triphendioxazine | Trihalogenotriazine | β-Sulphatoethylsulphonylalkoxyaniline | Hue |
|---|---|---|---|---|
| 143 | 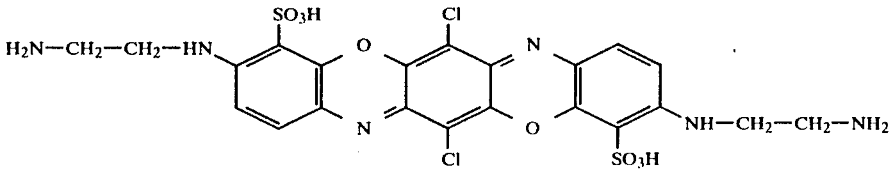 | 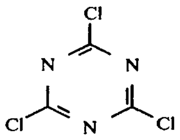 | 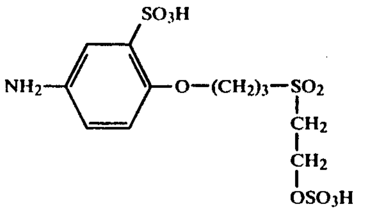 | blue |
| 144 | 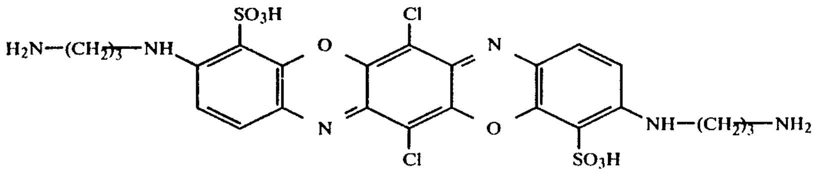 | 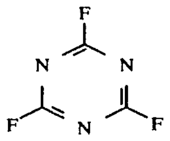 | 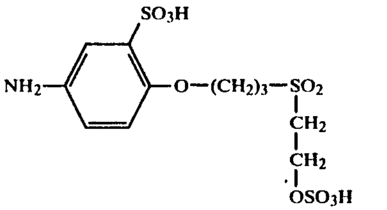 | blue |
| 145 | 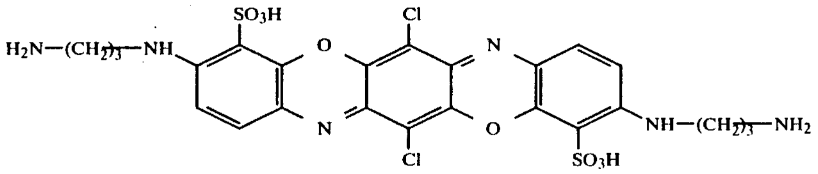 | 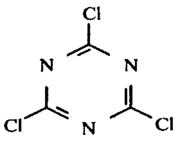 | 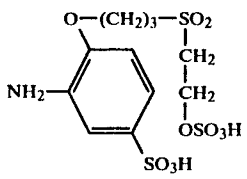 | blue |
| 145a | 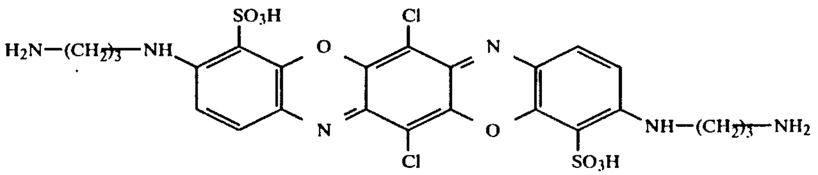 | 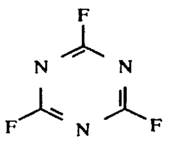 | 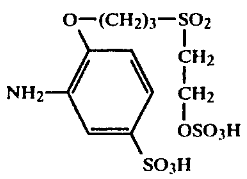 | blue |
| 146 | 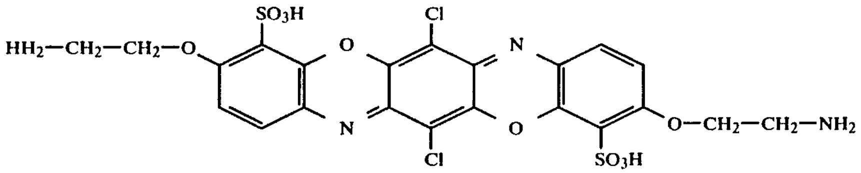 | 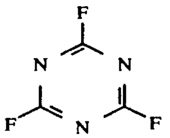 | 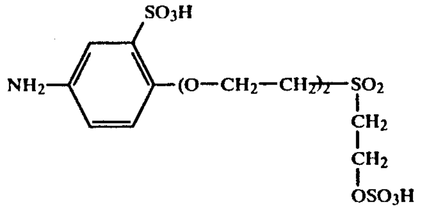 | bluish red |

-continued
| No. | Triphendioxazine | Trihalogenotriazine | $\beta$-Sulphatoethylsulphonylalkoxyaniline | Hue |
|---|---|---|---|---|
| 147 | 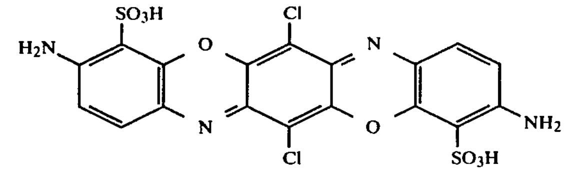 | 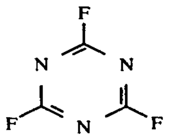 | 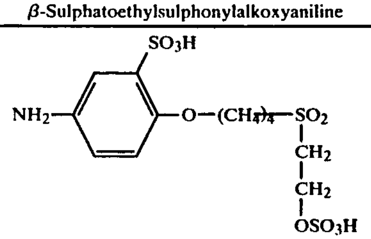 | reddish blue |
| 148 | 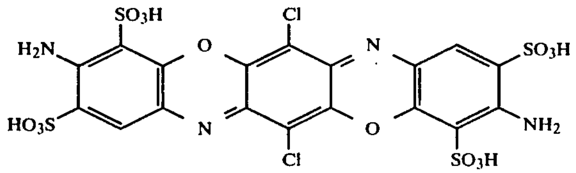 | 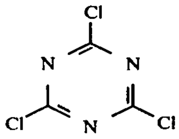 | 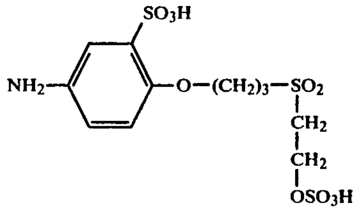 | reddish blue |

EXAMPLE 149

35.2 g of the known compound

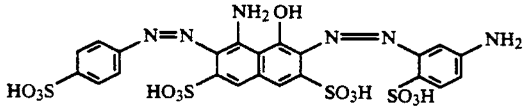

are dissolved in 350 ml of water, and the pH of the solution is brought to 5.0. The solution is cooled to 0° C., 7.4 g of cyanuric fluoride are added dropwise and the pH is maintained at 4.5 with 2N sodium carbonate solution.

After conversion is complete, a neutralised solution of 23. 0 g of 5-amino-2- [3- (2-sulphatoethylsulphonyl) -propoxy)-benzenesulphonic acid in 70 ml of water is added, and the pH is maintained at 6. 0 with 2N sodium carbonate solution, during which the temperature is first maintained at 0° to 5° C. for 4 hours and then gradually increased to 20° C.

After condensation is complete, the dyestuff, after buffering to a pH of 6, is isolated either directly by spray-drying or by salting out, filtering off with suction and vacuum-drying at 40° C. The dyestuff has the formula

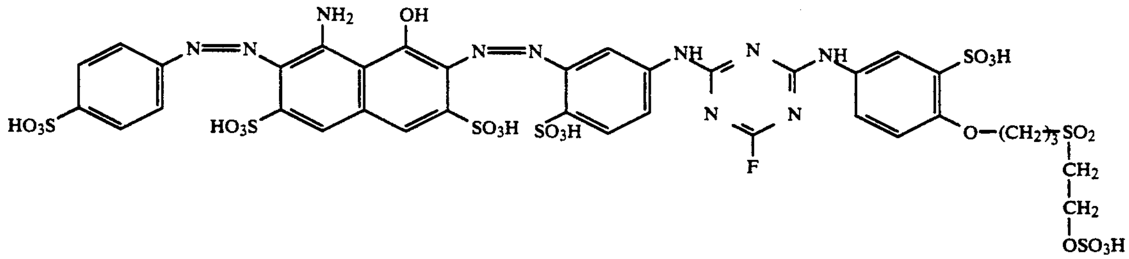

and dyes cotton by the dyeing techniques customary for reactive dyestuffs in navy hues with high yields.

Further similar reactive dyestuffs which dye cellulose fibres navy to black are obtained by condensing the aminodisazo components indicated in the list below of the general formula

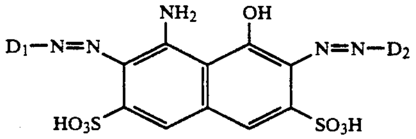

with the trihalogenotriazines and β-sulphatoethylsulphonylalkoxyanilines.

| | Aminodisazo component | | | | |
|---|---|---|---|---|---|
| No. | $D_1$ | $D_2$ | Trihalogenotriazine | β-Sulphatoethylsulphonylalkoxyaniline | Hue |
| 150 | 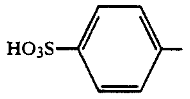 | 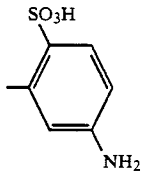 | 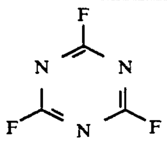 | 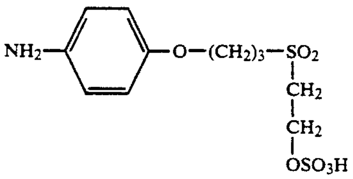 | navy |
| 151 | 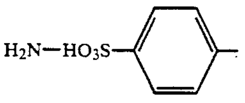 | 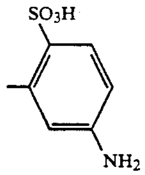 | 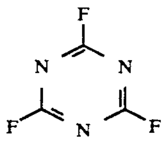 | 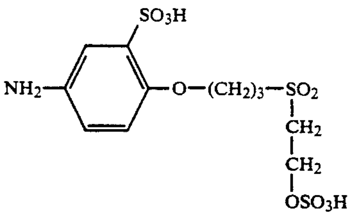 | navy |
| 152 | 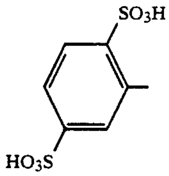 | 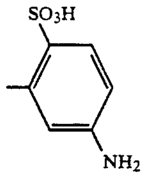 | 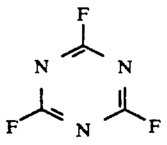 | 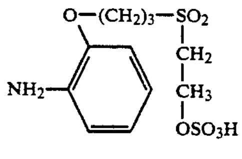 | navy |
| 152a | 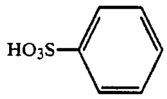 | 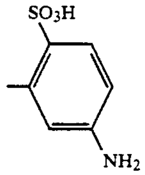 | 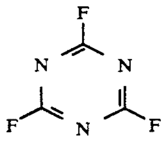 | 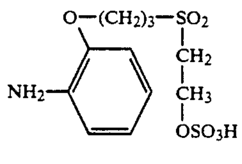 | navy |

-continued
| No. | Aminodisazo component D1 | D2 | Trihalogenotriazine | β-Sulphatoethylsulphonylalkoxyaniline | Hue |
|---|---|---|---|---|---|
| 153 | 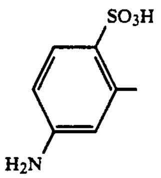 | 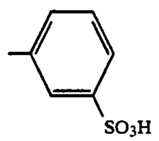 | 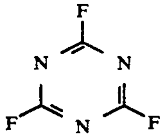 | 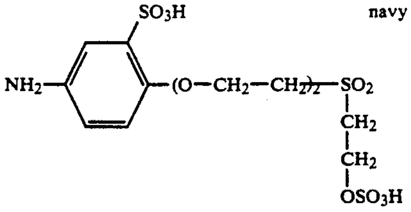 | navy |
| 154 | 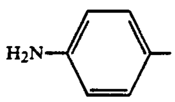 | 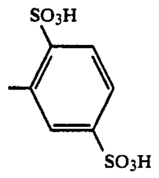 | 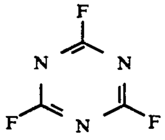 | 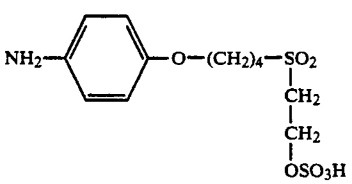 | greenish black |
| 155 | 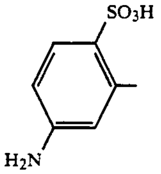 | 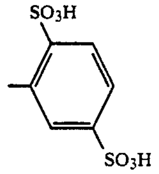 | 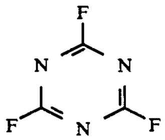 | 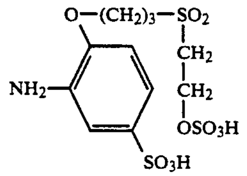 | navy |
| 156 | 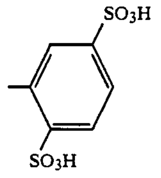 | 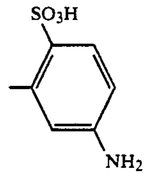 | 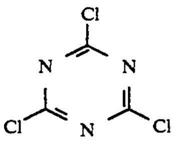 | 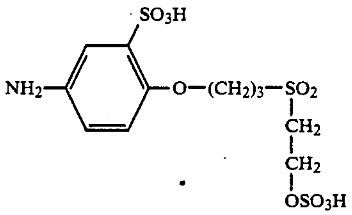 | navy |
| 157 | 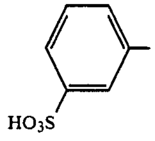 | 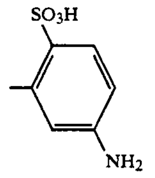 | 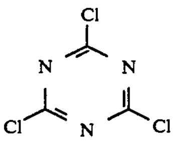 | 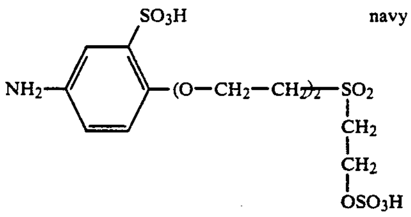 | navy |
| 158 | 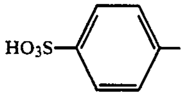 | 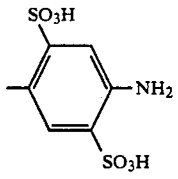 | 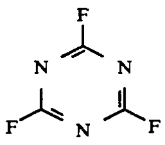 | 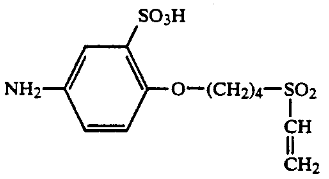 | black |
| 159 | 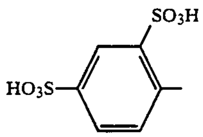 | 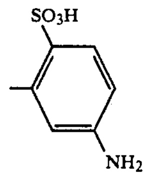 | 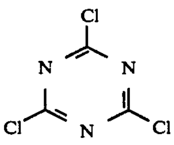 | 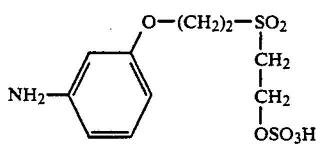 | navy |

-continued

| No. | Aminodisazo component D1 | Aminodisazo component D2 | Trihalogenotriazine | β-Sulphatoethylsulphonylalkoxyaniline | Hue |
|---|---|---|---|---|---|
| 160 | 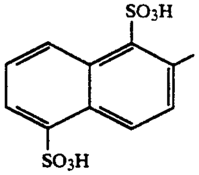 | 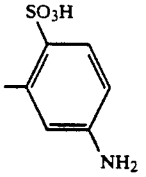 | 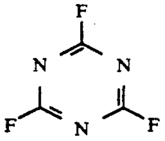 | 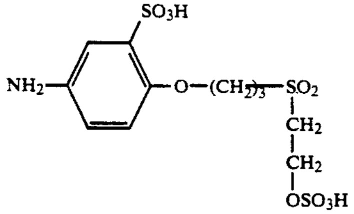 | black |

EXAMPLE 161

50 mmol of the known copper complex compound of the formula

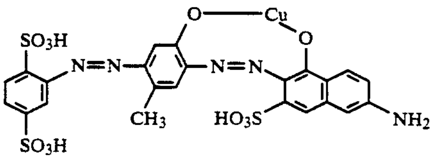

are dissolved in 600 ml of water at a pH of 6.5. The mixture is cooled to 0°-30° C., and 7.4 g of cyanuric fluoride are added dropwise to this solution over a period of a few minutes. During the dropwise addition, the pH is maintained at 4.5-5.0 with 2N sodium carbonate solution. Stirring is continued for another quarter of an hour, after which a neutralised solution of 23.0 g of the compound of the formula

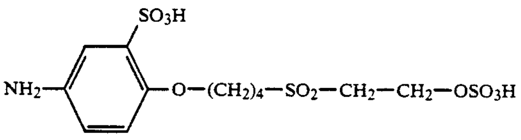

in 100 ml of water is added to the primary condensation product, and the pH in the reaction mixture is maintained at 5.0-6.0 with sodium carbonate solution. When sodium carbonate consumption has gradually come to a standstill, the temperature is allowed to rise to 20° C. After conversion is complete, the dyestuff of the formula

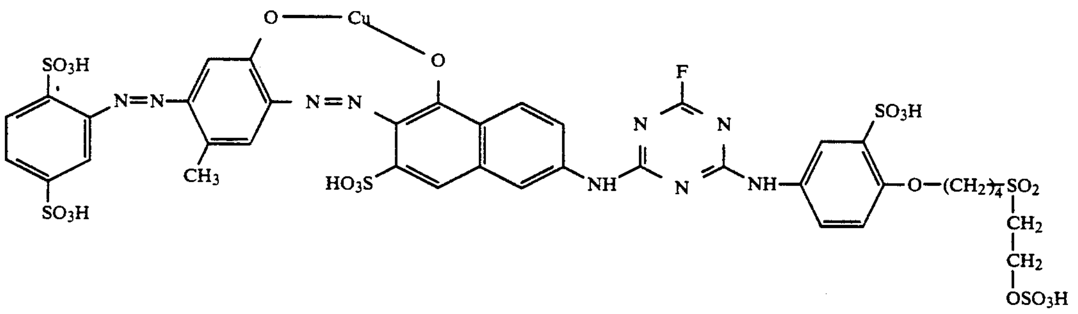

is salted out, isolated, and, after buffering to a pH of 6, dried at 45° C. in vacuo.

The product dyes cellulose fibres, by the dyeing techniques customary for reactive dyestuffs, in navy hues with a very high fixation yield.

EXAMPLE 162

A neutralised solution of 24.1 g of the component of the formula

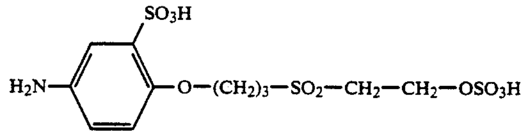

and 2.4 g of sodium fluoride in 100 ml of water is condensed analogously to Example 99 with 8.6 g of cyanuric fluoride.

The solution obtained is run in at 0°-2° C. to a neutral solution of 50 mmol of the known copper complex compound of the formula

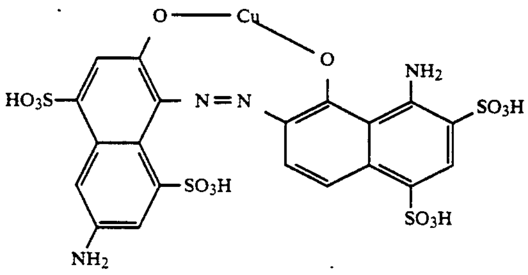

and the pH in the reaction mixture is maintained at 5-6 with 2N sodium carbonate solution. When sodium carbonate uptake subsides after a few hours, the temperature is slowly raised to 20° C.

After condensation is complete, the dyestuff of the formula

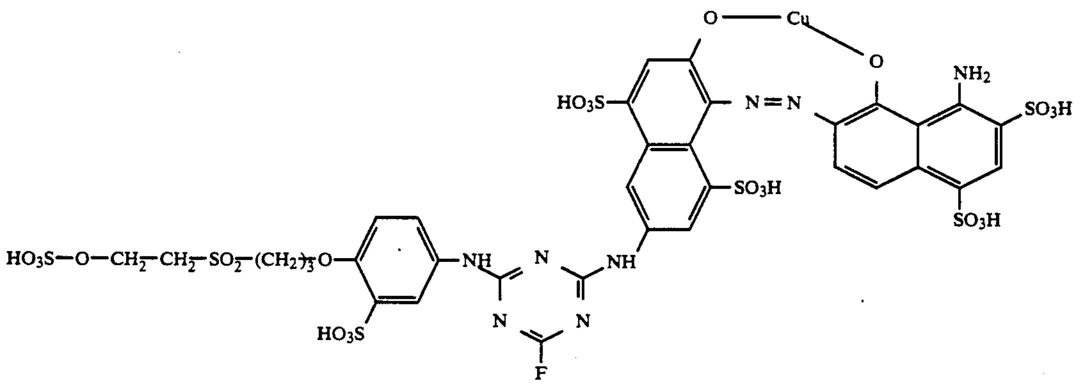

is salted out, isolated and dried at 45° C. in vacuo. It dyes cellulose fibres, by the drying techniques customary for reaction dyestuffs, in blue hues.

Further reactive dyestuffs which dye cotton by the customary dyeing techniques with a very high yield are obtained by condensing the known copper complex compounds indicated in the list below with the trihalogenotriazines and the β-sulphatoethylsulphonylalkoxyanilines using the procedures described in Examples 161 or 162.

| No. | Copper complex compound | Trihalogenotriazine | β-Sulphatoethylsulphonylalkoxyaniline | hue |
| --- | --- | --- | --- | --- |
| 163 | 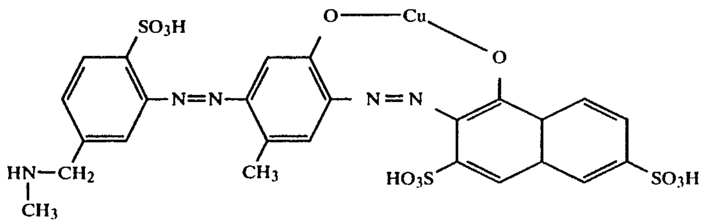 | 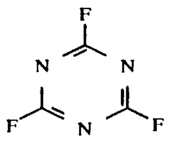 | 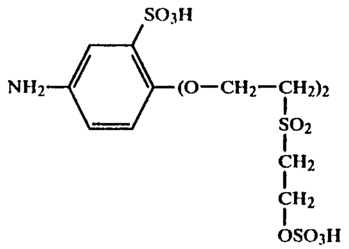 | navy |
| 164 | 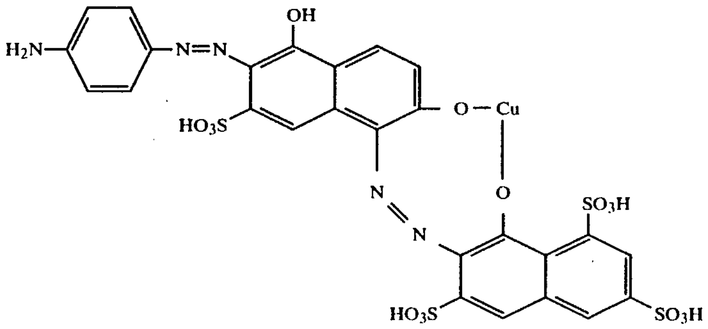 | 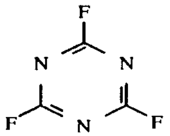 | 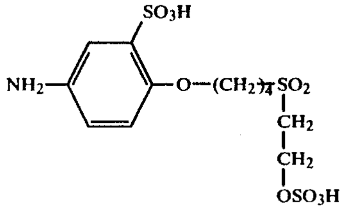 | navy |
| 165 | 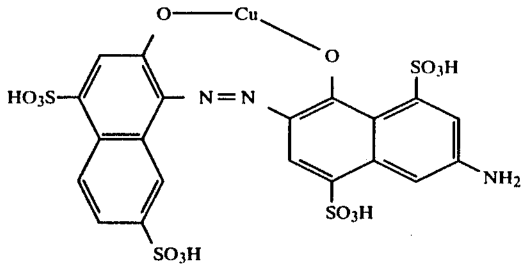 | 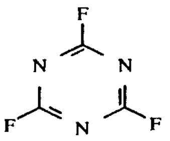 | 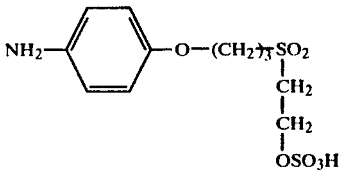 | reddish navy |

-continued
| No. | Copper complex compound | Trihalogenotriazine | β-Sulphatoethylsulphonylalkoxyaniline | hue |
|---|---|---|---|---|
| 166 | 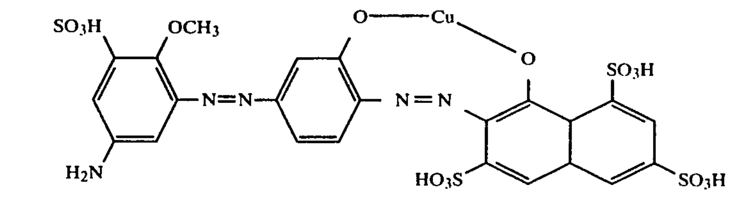 | 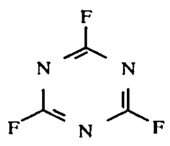 | 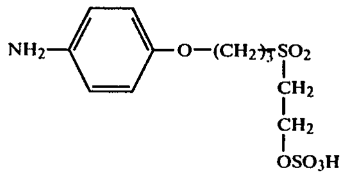 | navy |
| 167 | 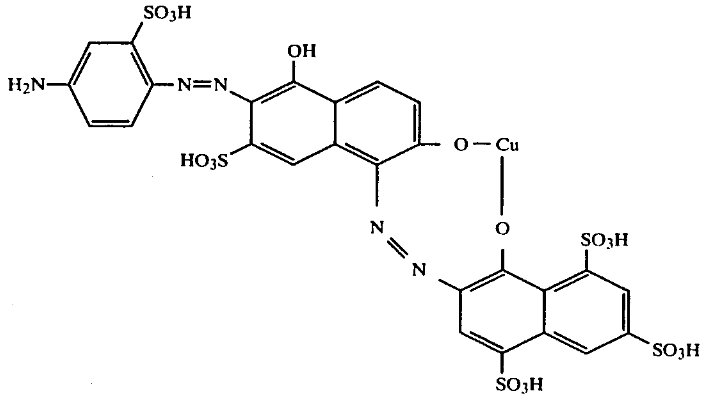 | 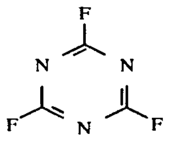 | 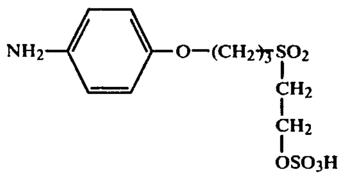 | navy |
| 168 | 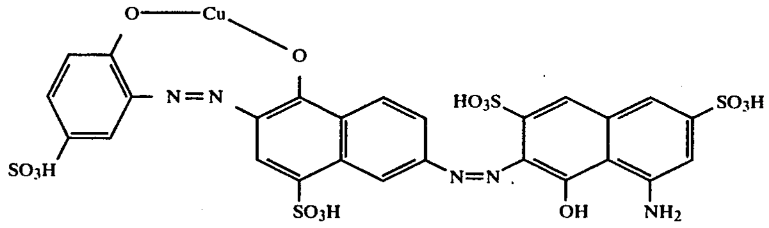 | 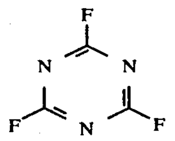 | 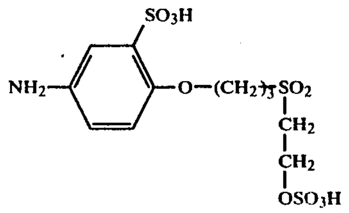 | dark blue |

-continued
| No. | Copper complex compound | Trihalogenotriazine | β-Sulphatoethylsulphonylalkoxyaniline | hue |
|---|---|---|---|---|
| 169 | 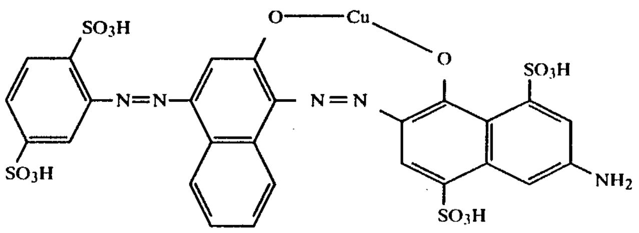 | 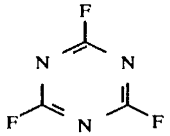 | 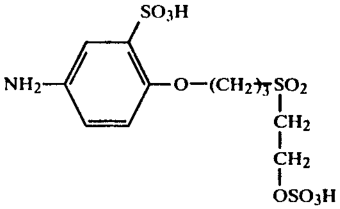 | green |
| 170 | 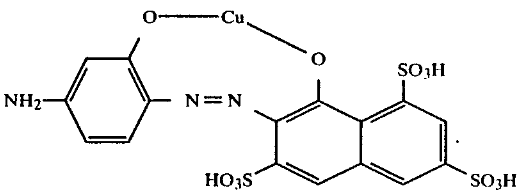 | 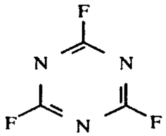 | 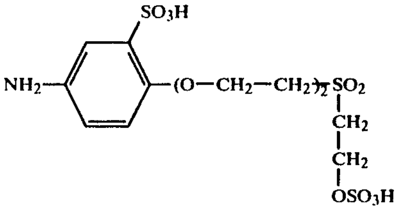 | red-violet |
| 171 | 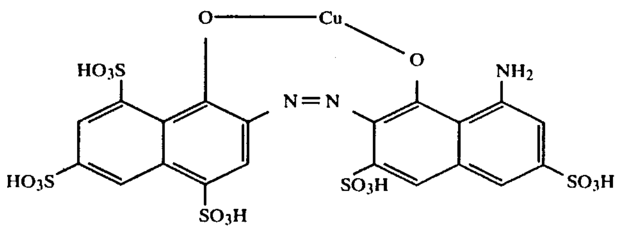 | 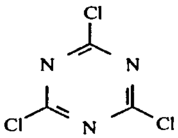 | 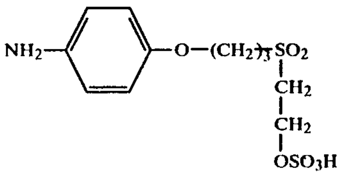 | navy |
| 172 | 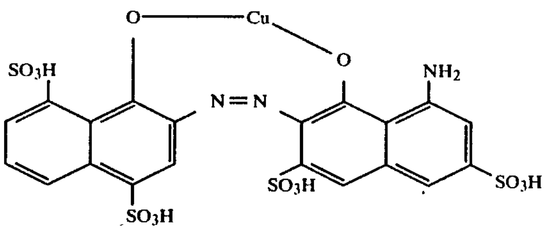 | 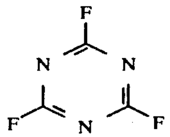 | 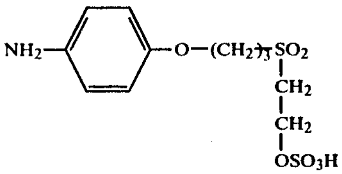 | navy |

-continued
| No. | Copper complex compound | Trihalogenotriazine | β-Sulphatoethylsulphonylalkoxyaniline | hue |
| --- | --- | --- | --- | --- |
| 173 | 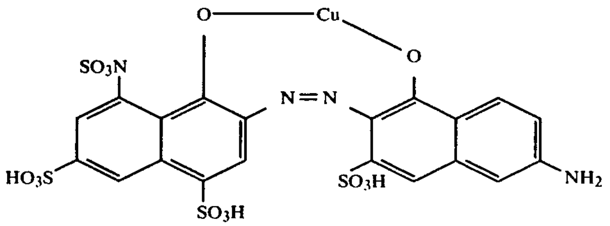 | 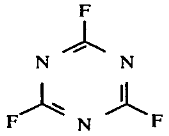 | 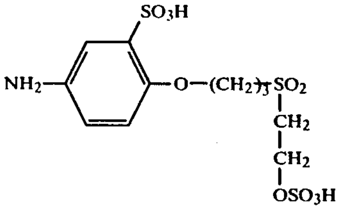 | blue-violet |

EXAMPLE 174

50 mmol of the 1:2 chromium complex of the formula

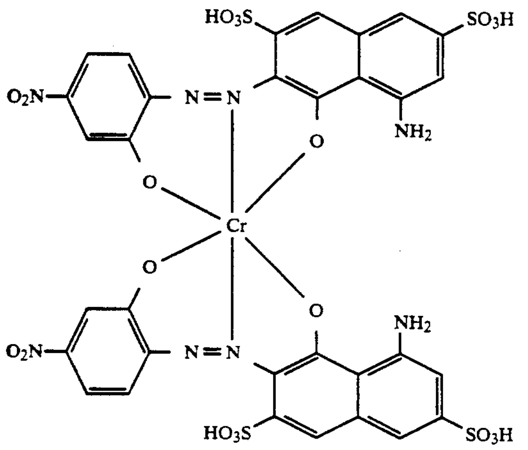

which can be obtained by coupling diazotised 5-nitro-2-aminophenol with 1-amino-8-hydroxynaphthalene-3,6-disulphonic acid, followed by conversion into the 1:2 Cr complex, are dissolved in 750 parts of water at a pH of 7, and a solution prepared, using the procedure of Example 99, from 48.2 g of 5-amino-2-[3-(2-sulphatoethylsulphonyl)-propoxy]-benzenesulphonic acid and 15.5 g of cyanuric fluoride and containing the compound

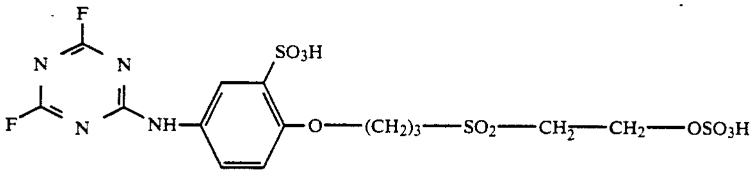

is added. The pH is maintained at 6–6.5 and the temperature is maintained at 20°–25° C. After condensation is complete, the reactive dyestuff obtained is salted out, filtered off with suction and, after buffering to a pH of 6.5, gently dried in vacuo. Using the dark powder obtained, cotton is dyed in greenish grey hues.

If a 1:1 mixture of the chromium complex and the corresponding cobalt complex is used instead of the abovementioned pure chromium complex, a dyestuff mixture is isolated which dyes cotton in neutral grey or black hues having good light fastness properties.

EXAMPLE 175

50 mmol of the Co complex of the formula

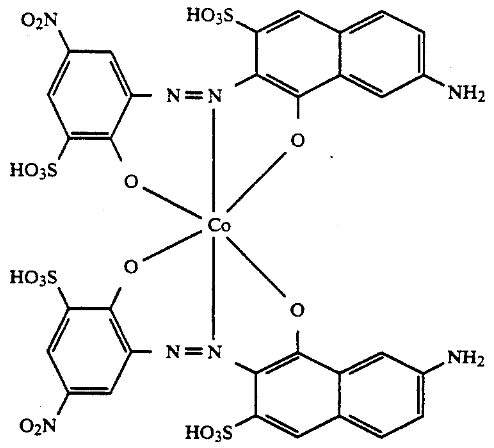

are dissolved in 800 parts by volume of water at a pH of 6, and the solution is cooled to 0°–5° C. 14.9 g of cyanuric fluoride are added dropwise with vigorous stirring, and the pH is maintained at 4.5–5.0 with 2N sodium carbonate solution. After the primary condensation is complete, a neutral solution is added which contains 23.0 g of the component

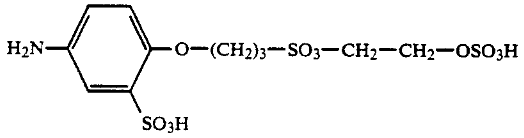

and 18.6 g of the component of the formula

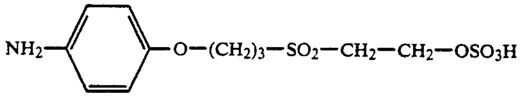

in 150 ml of water. The pH is maintained at 5.5–6.0, and the temperature is allowed to rise to 20° C. after 2 hours. When condensation is complete, the reactive dyestuff obtained is salted out, filtered off with suction and dried at 45° C. in vacuo. The powder obtained dyes cotton, by the techniques customary for reactive dyestuffs, with a high yield in brown hues which have good light fastness properties.

EXAMPLE 176

50 mmol of the triphendioxazine compound of the formula

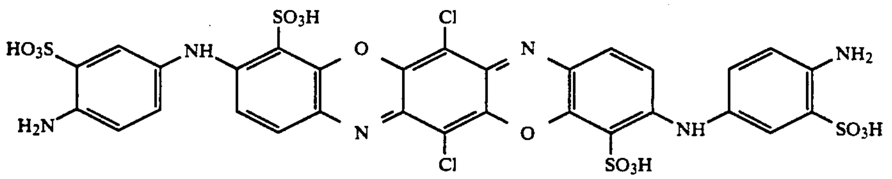

are dissolved in 900 ml of water at a pH of 6. 14.9 g of cyanuric fluoride are added dropwise to the solution at 0°-3° C. and the pH is maintained at 4.5-5.0 with 2N sodium carbonate solution.

Stirring is continued for a short period, after which a neutral solution of 46.1 g of 5-amino-2-[3-(β-sulphatoethylsulphonyl)-propoxy]-benzenesulphonic acid in 160 ml of water is added to the primary condensation product, and the pH is maintained at 6.0. After condensation has been completed by gradually increasing the temperature to 20° C., the dyestuff of the formula

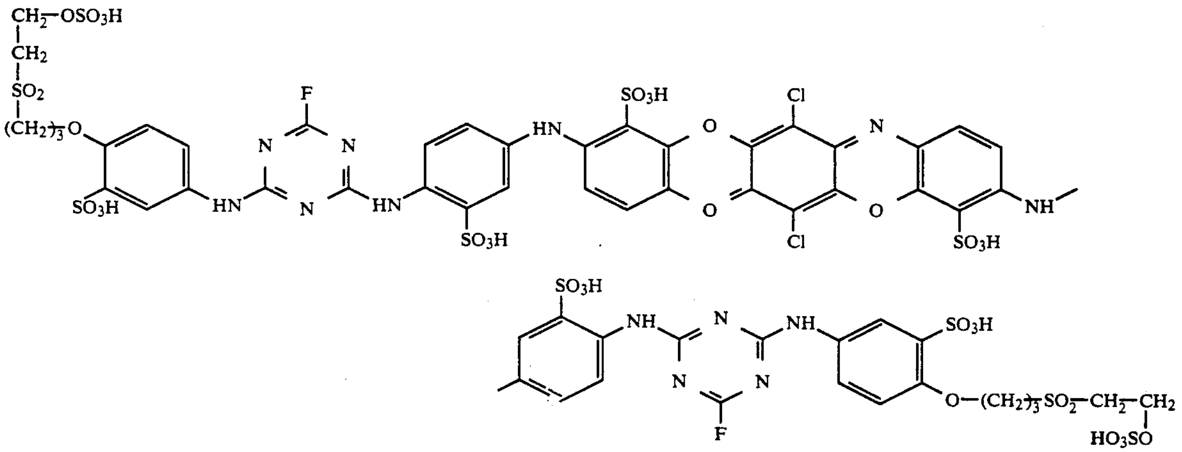

is salted out, isolated and dried.

It dyes cellulose fibres in greenish blue hues.

EXAMPLE 177

21.9 g of 1-(4-benzoylamino)-8-hydroxynaphthalene-3,6-disulphonic acid are dissolved in 250 ml of water at a pH of 5.5. After cooling the solution to 0°-3° C., 7.1 g of cyanuric fluoride are swiftly added dropwise, and the pH in the reaction mixture is maintained at 4.5 with dilute sodium carbonate solution. Stirring is continued for a short period, after which a neutral solution of 22.0 g of 5-amino-2-[3-(β-sulphatoethylsulphonyl)-propoxy]-benzenesulphonic acid in 80 ml of water cooled to 0° C. is added, and the pH is maintained at 5.5-6.0 overnight. After condensation is complete, a diazonium salt suspension obtained in the usual manner by diazotisation of 8.7 g of 2-aminobenzenesulphonic acid is added, and coupling is completed by addition of sodium carbonate at a pH of 6.5-7 first at 0° C. for several hours and later on with an increase to 20° C. The dyestuff obtained of the formula

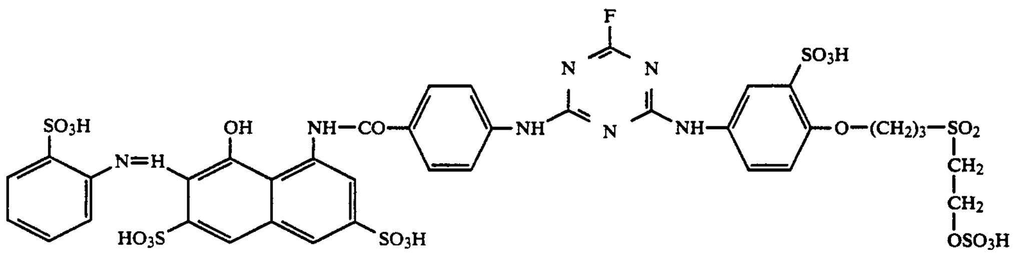

is isolated and dried. It produces on cotton, from a long liquor, strong red dyeings having good light and wet fastness.

EXAMPLE 178

25.7 g of the triazole of the formula

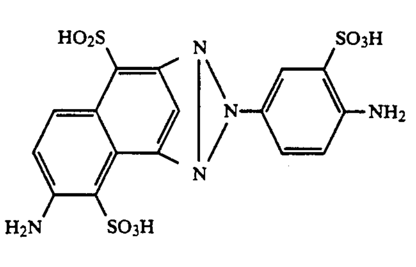

prepared by the procedure given in European Patent 0,013,879 are dissolved in 700 ml of water at a pH of 6.5. The solution is cooled to 0° C., and 6.9 g of cyanuric fluoride are slowly added dropwise. The pH is maintained at 6.0-6.5 with sodium bicarbonate solution. When the reaction is complete after a few minutes, a neutral, cooled solution of 21.8 g of 5-amino2-[3-(β-sulphatoethylsulphonyl)-propoxy]-benzenesulphonic acid in 80 ml of water is added, and the pH is further maintained at 6.5 with sodium carbonate solution.

After 2 hours, the temperature is allowed to rise to 20° C. 3.7 g of sodium nitrite are added, and 20 ml of 28% strength hydrochloric acid are run in. After one hour of after-reaction, any excess nitrous accid is destroyed with sulphamic acid. 6.5 g of barbituric acid are sprinkled in and coupling is carried out first at a PH of 5 by adding sodium acetate and later on at a pH of 5.5–6 using sodium carbonate. After coupling is complete, the dyestuff is isolated and dried at 40° C. in vacuo. It has the formula

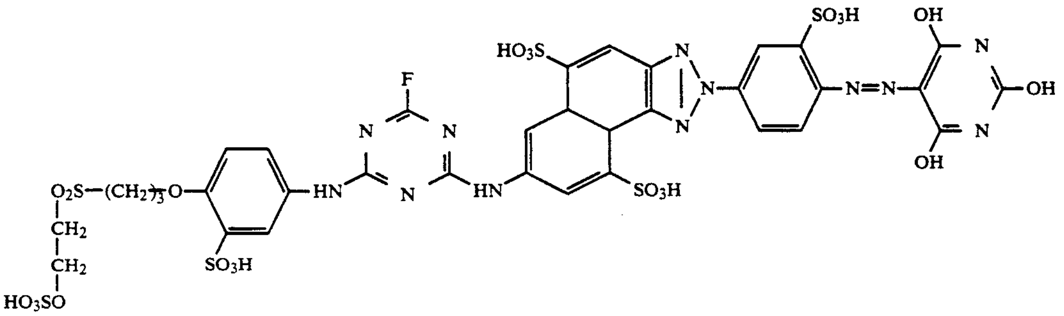

and dyes cotton in brilliant yellow shades.

Similar yellow dyestuffs are obtained by using the following coupling components instead of barbituric acid:

2,6-dihydroxypyridine-4-carboxylic acid
1-(4-sulphophenyl)-3-methyl-5-pyrazolone
1-(4-sulphophenyl)-5-pyrazolone-3-carboxylic acid
1,4-dimethyl-2-hydroxy-6-pyridone-5-carboxamide
1,4-dimethyl-2-hydroxy-3-sulphomethyl-6-pyridone-5-carboxamide
N-(2'-methoxy-5'-methyl-4'-sulphophenyl) aceto acetamide
N-(2',5'-dimethoxy-4'-sulphophenyl ) aceto acetamide
1-phenyl-3-methyl-5-aminopyrazole
1-(6,8-disulphonaphth-2-yl)-3-methyl-5-pyrazolone
1,4-dimethyl-2-hydroxy-5-cyano-6-pyridone

EXAMPLE 179

260 g of powdered potassium hydroxide are dissolved in 2,000 ml of 1,3-propanediol at 70° C. 500 g of 1-chloro-2-nitrobenzene are added dropwise to the solution at 50° C., the mixture is heated at 50° C. for 5 hours and then at 60° C. until conversion is complete. The batch is poured onto 6,000 ml of ice water, the precipitated oil is separated off, washed several times with water and dried in a rotary evaporator.

457 g of the oil obtained are dissolved in 460 ml of pyridine. A solution of 445 g of p-toluenesulphonyl chloride in 450 ml of pyridine is added dropwise to this mixture at 5°–15° C. over a period of 1 hour. After stirring at 0°–5° C. for 3 hours, the precipitated crystals are filtered off with suction, washed with 1.8 l of cold methanol at 0°–5° C., then with 2 l of water and dried at 50° C. in vacuo.

475.0 g of the tosyl ester obtained of the formula

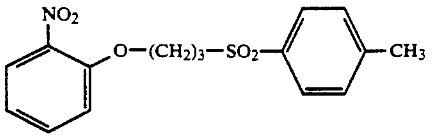

are heated together with 115 g of 2-mercaptoethanol and 215 g of potassium carbonate in 1,200 ml of acetonitrile at 83° C. with reflux for 4 hours. The mixture is then taken up in 6 l of water, the precipitated yellow oil is separated off and washed with water. 355 g of the 1-nitro-2-(3-(2-hydroxyethylthio)-propoxylbenzene obtained are oxidised to the sulphone in 2,000 ml of water with 250 ml of 35% strength $H_2O_2$ in a known manner at 55°–60° C. after addition of 4 g of sodium tungstate.

The product obtained is filtered off with suction, washed with ice water and dried at 55° C. in vacuo.

373 g of the 1-nitro-2-[3-(2-hydroxyethylsulphonyl)-propoxy]-benzene obtained are hydrogenated catalytically at 60° C. in 1,600 ml of methanol in the presence of 7 g of Raney nickel under a hydrogen pressure of 30 bar. After filtering off nickel while hot, evaporation of the filtrate gives the amine of the formula

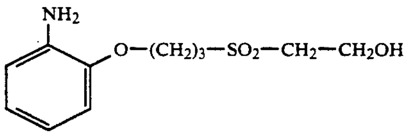

in the form of brownish crystals.

$^1$H-NMR ($D_6$-DMSO)

| | | |
|---|---|---|
| δ = 2.08–2.2 | ppm | (2H, m) |
| δ = 3.26 | ppm | (2H, t) |
| δ = 3.36 | ppm | (2H, t) |
| δ = 3.82 | ppm | (2H, q) |
| δ = 4.02 | ppm | (2H, t) |
| δ = 5.14 | ppm | (1H, t) |
| δ = 6.45–6.50 | ppm | (1H, m) |
| δ = 6.60–6.68 | ppm | (2H, m) |
| δ = 6.72 | ppm | (1H, m) |

250 g of the above amine are added dropwise as a hot melt of 60° C. into a mixture at 0°–2° C. of 610 ml of 96% pure sulphuric acid and 24 ml of water over a period of 1½ hours. Stirring at 0° C. is continued for 1 hour, the solution is poured into 3,000 g of ice and 1,500 ml of water, the suspension is stirred for another hour, the crystals are filtered off with suction and washed free of sulphuric acid with 2 l of isopropanol. They are dried at 45° C. in vacuo.

The product has the formula

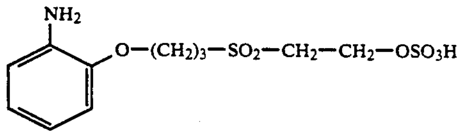

$^1$H-NMR ($D_6$-DMSO)

| | | |
|---|---|---|
| δ = 2.13-2.26 | ppm | (2H, m) |
| δ = 3.40-3.48 | ppm | (4H, m) |
| δ = 4.13-4.23 | ppm | (4H, m) |
| δ = 7.01-7.06 | ppm | (1H, m) |
| δ = 7.18 | ppm | (1H, m) |
| δ = 7.33-7.45 | ppm | (2H, m) |
| δ = ~9.6 | ppm | (broad) |

If 100 g of the above 1-amino-2-[-3-(2-hydroxyethyl-sulphonyl)-propoxyl-benzene are added dropwise as a melt into 300 ml of 20% strength oleum at 0°-2° C., stirring is continued for some time until no more change can be detected in the solution by chromatography, the mixture is poured onto 2.6 kg of ice, excess sulphuric acid is removed by introducing 558 g of calcium carbonate up to a pH of 4.5, the calcium sulphate is filtered off with suction and washed with 1 l of water, and the filtrate is concentrated to about 500 ml, a solution of the product of the formula

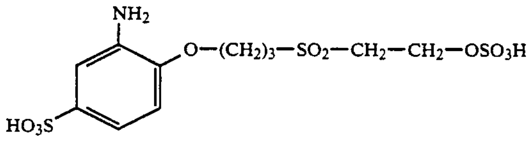

whose content is determined by titration with sodium nitrite is obtained.

EXAMPLE 180

313 g of 1-[2-(2-hydroxyethoxy)-ethoxy]-4-nitrobenzene are heated in 930 ml of thionyl chloride and 5 ml of dimethylformamide with reflux for 3 hours. The solution is poured onto 3.5 kg of ice and 3.5 l of water, the crystalline white precipitate is filtered off with suction and freed from acid residues by washing with cold water. The product can be dried at 55° C. in vacuo.

330 g of 1-[2-(2-chloroethoxy)-ethoxy]-4-nitrobenzene are reacted with 130 g of 2-mercaptoethanol and 235 g of potassium carbonate by refluxing in 900 ml of acetonitrile. After complete conversion, the mixture is poured into 3 l of water, the pH is brought to 6-7 with dilute sulphuric acid, and, after addition of 4 g of sodium tungstate, the thio ether is oxidised in the known manner at 55°-60° C. using 280 g of 35% strength hydrogen peroxide. The product obtained of the formula

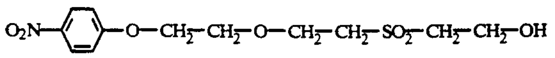

is dried at 50° C. in vacuo. M.p. 58°-59° C.

$^1$H-NMR ($D_6$-DMSO)

| | | |
|---|---|---|
| δ = 3.28 | ppm | (2H, t) |
| δ = 3.44 | ppm | (2H, t) |
| δ = 3.78-3.90 | ppm | (6H, m) |
| δ = 4.18 | ppm | (2H, m) |
| δ = 5.10 | ppm | (1H, t) |
| δ = 7.17 | ppm | (2H, d,d) |
| δ = 8.22 | ppm | (2H, d,d) |

Catalytic hydrogenation of 360 g of the above nitro compound in 1,500 ml of methanol in the presence of Raney nickel at 65° C. and a hydrogen pressure of 70 bar gives a solution which, after filtering off the nickel and evaporating the filtrate towards the end in vacuo, leaves the amine of the formula

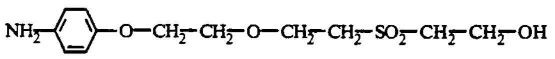

as a brown oil.

$^1$H-NMR ($D_6$-DMSO)

| | | |
|---|---|---|
| δ = 3.26 | ppm | (2H, t) |
| δ = 3.41 | ppm | (2H, t) |
| δ = 3.70 | ppm | (2H, t) |
| δ = 3.82-3.88 | ppm | (4H, m) |
| δ = 3.95 | ppm | (2H, m) |
| δ = 5.07 | ppm | (1H, t) |
| δ = 6.50 | ppm | (2H, d,d) |
| δ = 6.66 | ppm | (2H, d,d) |

Running 100 g of the above oil into 250 ml of 96% pure sulphuric acid at 0°-3° C., stirring the mixture at 0° C. for a few hours, stirring it into 1.8 kg of ice, liming the solution with 410 g of $CaCO_3$ up to a pH of 4.7, filtering off the calcium sulphate and concentrating the solution in vacuo down to 500 ml gives a solution of the substance of the formula

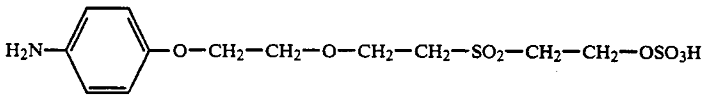

which is suitable for synthetic purposes and whose content can be determined by titration with sodium nitrite.

If the above amino-β-hydroxyethylsulphonyl-alkoxy-benzene is run into 20% strength oleum instead of 96% pure sulphuric acid, the mixture is stirred until it is completely sulphonated and sulphated at 20° C., suitable workup gives the solution of a compound of the formula

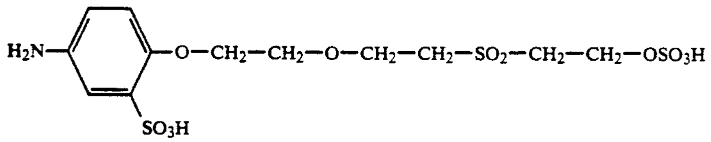

which, determining its content, can also be used for synthetic purposes.

EXAMPLE 181

80.0 g of the compound of the formula

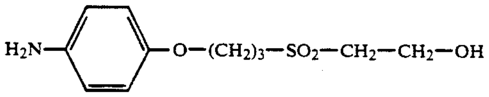

prepared by the procedure given in European Patent 0,355,492 are stirred into 160 ml of 96% pure sulphuric acid at 0° C. The mixture is allowed to reach 20° C. over a period of 1 hour, the solution is poured onto 800 g of ice and 320 ml of water, the prism-like crystals, after additional stirring for a short period, are filtered off with suction and the adhering sulphuric acid is displaced by washing with isopropanol. The product can be dried at 50° C. in vacuo. It has the formula

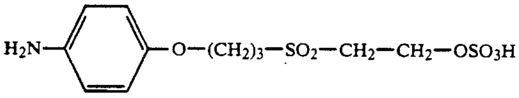

If the above compound is stirred into 20% strength oleum instead of into 96% pure sulphuric acid, and the product is then worked up, as described in Example 180, by adding $CaCO_3$ to the aqueous sulphuric acid solution, the solution of a compound of the formula

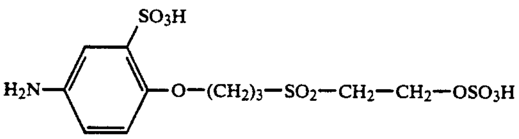

is obtained, which, after determining its content, can also be used for dyestuff syntheses.

EXAMPLE 182

3.0 g of pyridine-3-carboxylic acid are added, after coupling, to a dyestuff solution synthesised according to Example 1. The solution is heated to 75° to 80° C. and the pH is maintained at 7.0 with 2N sodium carbonate solution until the exchange of a fluorine atom for the nicotinic acid radical is complete. After cooling, the dyestuff can be salted out or the solution, after desalting and concentrating, can be used as a liquid dyestuff.

The dyestuff has the formula

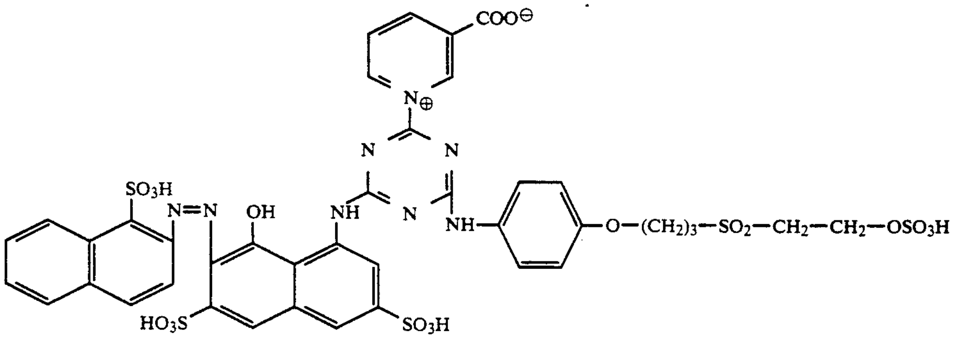

and dyes cotton, similarly to the dyestuff from Example 1, from a long liquor.

The other fluoro- or chlorotriazine dyestuffs described in the preceding examples can also be converted into the 3-carboxypyridiniumtriazine dyestuffs in a similar manner.

EXAMPLE 183

The products obtained in Example 179 can also be prepared in the following manner:

209 g of 2-nitrophenol, 262 g of 1,3-bromochloropropane and 228 g of potassium carbonate are heated to 60° C. in 1,000 ml of ethanol and then refluxed until the 2-nitrophenol has disappeared. The reaction product of the formula

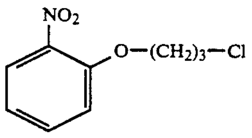

can be precipitated from the mixture obtained by dilution with 5 l of water in the form of a yellow oil.

The intermediate can either be converted directly without isolating it or after dissolving it again in 1,000 ml of ethanol or acetonitrile to the thioether

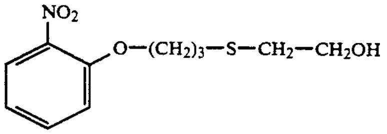

using 156 g of 2-mercaptoethanol and 276 g of potassium carbonate at 60°-80° C. and this thioether can be oxidised in the known manner after the dilution of the solution with 3 l of water and addition of 4.5 g of sodium tungstate at 55°-60° C. and 35% strength $H_2O_2$. The nitrosulphone obtained of the formula

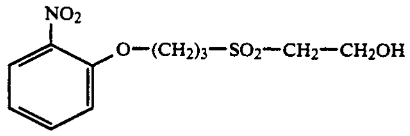

is reduced, in the manner described in Example 179, catalytically to give the amino compound, which can then be either sulphated or sulphated and sulphonated.

The corresponding m and p compounds can be prepared analogously from m- or p-nitrophenol and 1,3-bromochloropropane.

We claim:

1. A reactive dyestuff of the formula

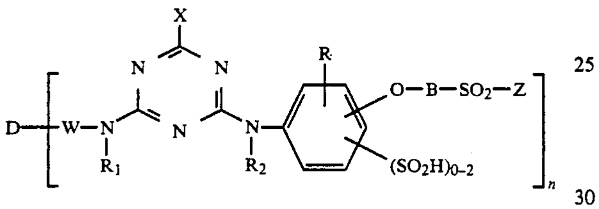

in which

D denotes a radical of an organic dyestuff,

W denotes a direct bond or bridging member, $R_1$ denotes H or alkyl, $R_2$ denotes H or alkyl, R denotes H, $C_1$-$C_2$-alkyl, halogen, or $C_1$-$C_4$-alkoxy, B denotes

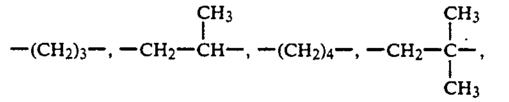

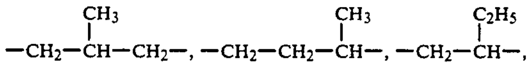

$-(CH_2)_5-$, $-(CH_2)_6-$, $-CH_2-CH_2O-CH_2-CH_2-$,

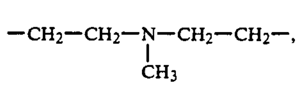

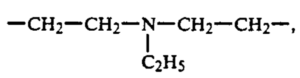

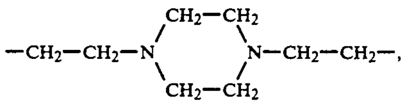

or $-CH_2-CH_2-SO_2-CH_2-CH_2-$,

X denotes F, Cl,

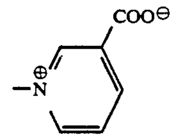

Z denotes $-CH{=}CH_2$, $-CH_2-CH_2-OSO_3H$, $-CH_2-CH_2-Cl$, $-CH_2-CH_2-Br$, $-CH_2-CH_2-S_2O_3H$, $-CH_2-CH_2-O-CO-CH_3$, $-CH_2-CH_2-OPO_3H_2$, or $-CH_2-CH_2-OH$, n denotes 1 or 2.

2. A reactive dyestuff according to claim 1, characterised in that D is a radical from the monoazo, polyazo, metal complex, anthraquinone, phthalocyanine, formazan, azomethine, dioxazine, phenazine, stilbene, triphenylmethane, xanthene, thioxanthone or nitroaryl series.

3. A reactive dyestuff according to claim 1 characterised in that W denotes:

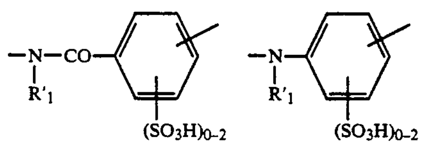

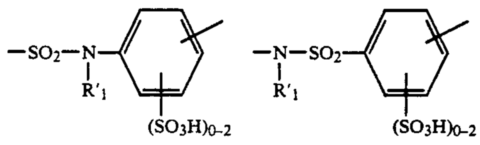

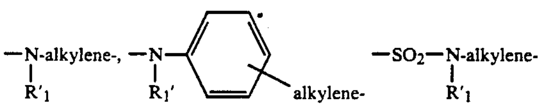

-O-alkylene-, -alkylene-, -alkylene-CO-, or -alkylene-$SO_2$-, in which $R'_1$ represents hydrogen or alkyl, and alkylene denotes an alkylene radical having 1 to 6 C atoms.

4. A reactive dyestuff according to claim 1, having one of the following formulas (VII)-(XXIII):

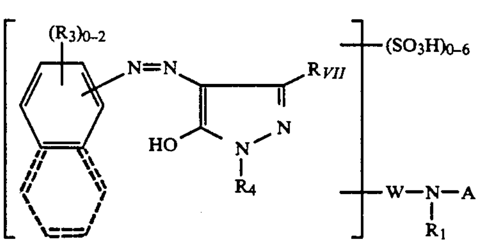

(VII)

where $R_3$ is alkyl, alkoxy, or halogen, $R_4$ is H, alkyl, aryl, hetaryl, or aralkyl $R_{VII}$ is COOH, or $CH_3$

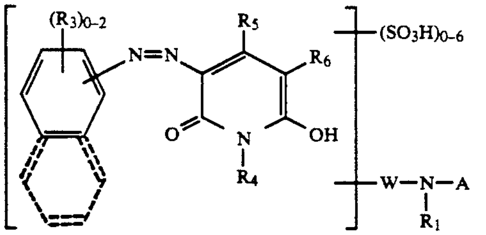

(VIII)

where $R_3$ is alkyl, alkoxy, or halogen, $R_4$ is alkyl, aralkyl, or aryl, $R_5$ is alkyl, aryl, aralkyl, or hetaryl, $R_6$ is H, $COOR_3$,

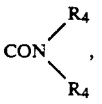

,

CN, $CH_2$—$SO_3H$, $SO_3H$, or

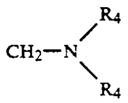

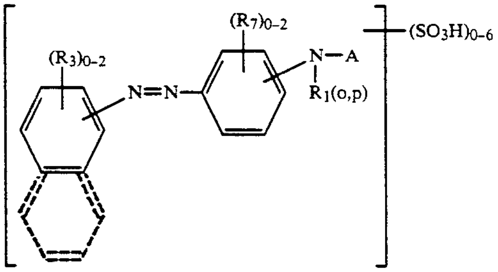

(IX)

where $R_3$ is alkyl, alkoxy, or halogen, $R_7$ is H, alkyl, alkoxy, acylamino, amino, or ureido, o,p is in o or p position relative to the azo group

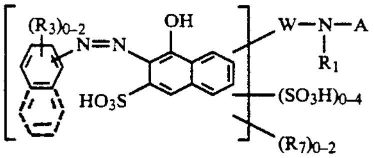

(X)

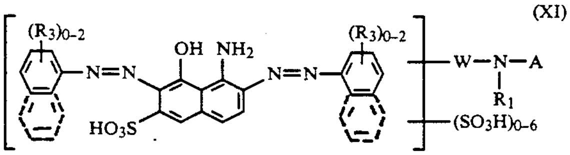

(XI)

-continued

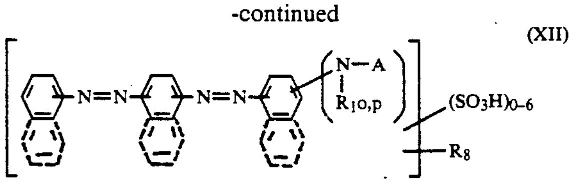

(XII)

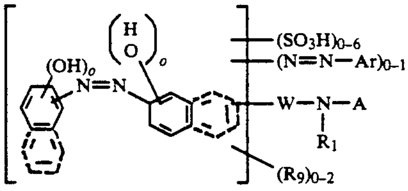

(XIII)

where in (X) to (XIII):

$R_3$ is alkyl, alkoxy, or halogen, $R_7$ is alkyl, alkoxy, or acylamino, $R_8$ is alkyl, alkoxy, acylamino, or ureido, o is in ortho position relative to the azo group, $R_9$ is $R_8$, or $NO_2$, and for (XIII), X is F, and Ar is

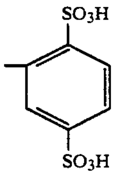

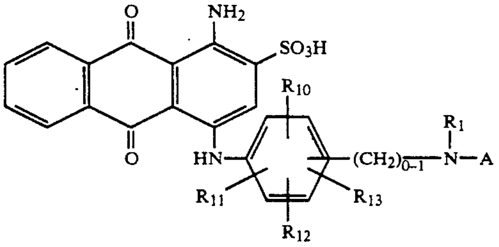

(XIV)

where $R_{10}$ is H, $C_1$-$C_4$-alkyl, halogen, $C_1$-$C_4$-alkoxy, carboxyl, or $SO_3H$, $R_{11}$ is H, $C_1$-$C_4$-alkyl, or $SO_3H$, $R_{12}$ is H, $C_1$-$C_4$-alkyl, Cl, or Br, $R_{13}$ is H, or $C_1$-$C_4$-alkyl,

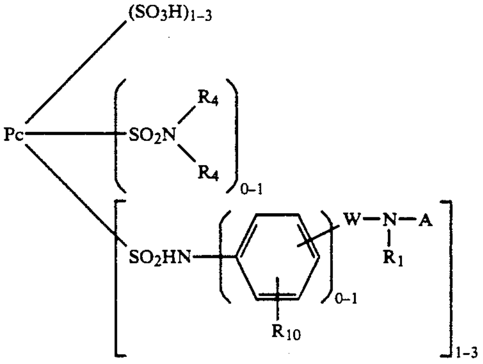

(XV)

where $R_4$ is H, or alkyl, $R_{10}$ is H, $SO_3H$, or COOH,

Pc is Cu or Ni phthalocyanine radical (XVI)

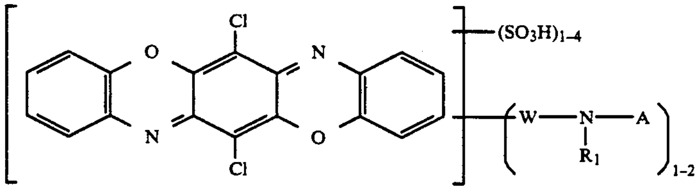

(XVII)

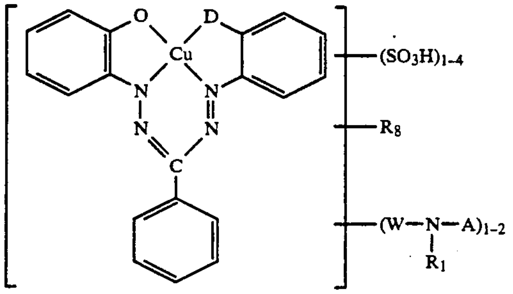

where
$R_8$ is alkyl, halogen, or alkylsulphonyl,
D is a substituent capable of complex formation, (XVIII)

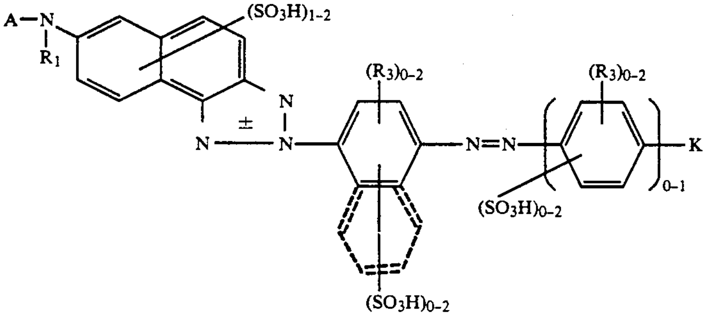

where
$R_3$ is alkyl, alkoxy, or halogen,
K is the radical of a coupling component, (XIX)

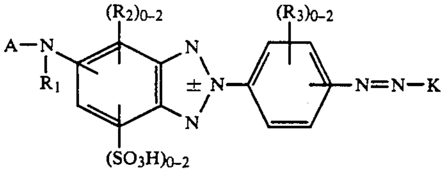

where
$R_2$ is alkyl, or halogen,
$R_3$ is alkyl, or alkoxy,
K is the radical of a coupling component (XX)

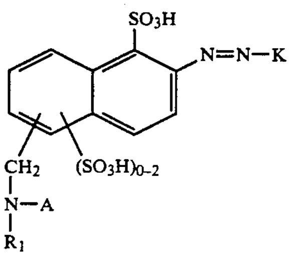

where (XXI)

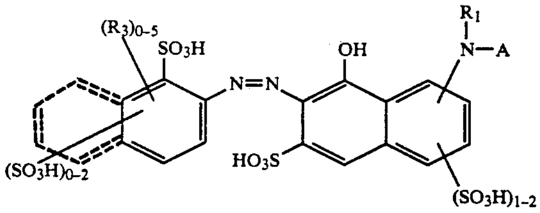

K is the radical of a coupling component
$R_3$ is alkyl, alkoxy, or acylamino (XXII)

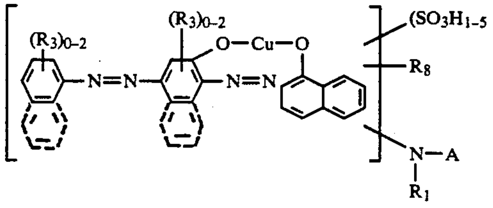

$R_3$ is alkyl, or alkoxy,
$R_8$ is H, $NH_2$, or acylamino (XXIII)
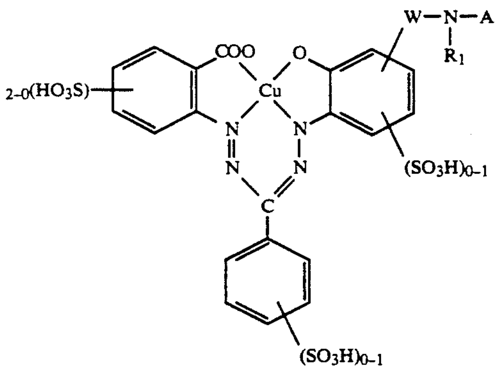
and wherein each of the formulas (XII) - (XXIII), A denotes a radical of the formula:
(VIa)
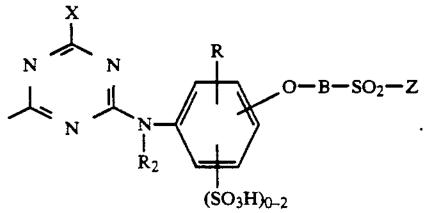
5. A process for the dyeing and printing of substrates using a reactive dyestuff by applying thereto a reactive dyestuff according to claim 8.
* * * * *

UNITED STATES PATENT AND TRADEMARK OFFICE
CERTIFICATE OF CORRECTION

PATENT NO. : 5,256,774 Page 1 of 3

DATED : October 26, 1993

INVENTOR(S) : Harms, et al.

It is certified that error appears in the above-indentified patent and that said Letters Patent is hereby corrected as shown below:

| | |
|---|---|
| Title Page & Col. 1 line 3 | Title [54] Line 4 delete " TRLAZINYL " and substitute -- TRIAZINYL -- |
| Title Page | ABSTRACT: Line 3 delete |

"
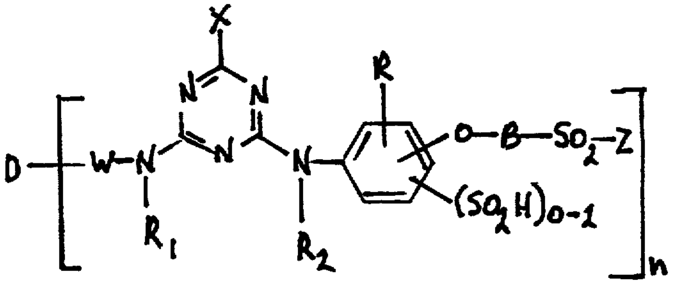
"

and substitute

--
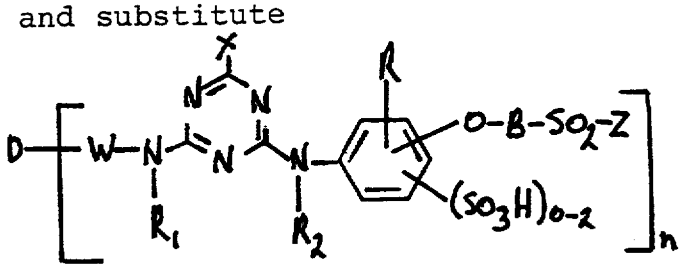
--

UNITED STATES PATENT AND TRADEMARK OFFICE
CERTIFICATE OF CORRECTION

PATENT NO. : 5,256,774

DATED : October 26, 1993

INVENTOR(S) : Harms, et al.

It is certified that error appears in the above-indentified patent and that said Letters Patent is hereby corrected as shown below:

Col. 131, line 29 Delete "

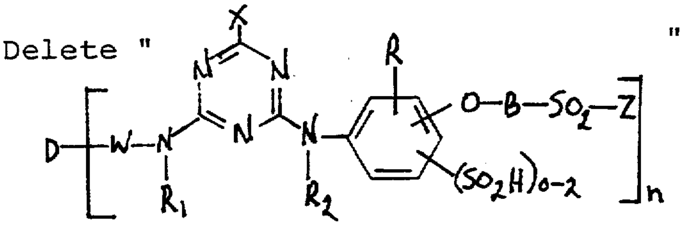

" and substitute --

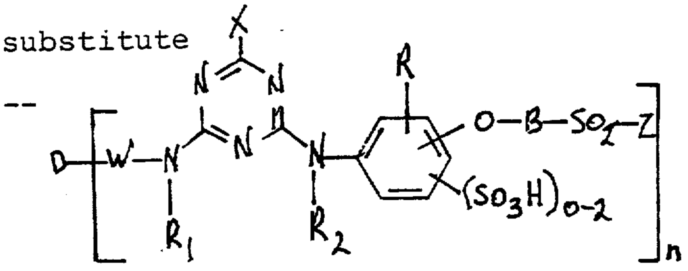

--

Col. 136, line 42 Insert -- K is the radical of a coupling component --

Col. 136, line 54 Delete " K is the radical of a coupling component

UNITED STATES PATENT AND TRADEMARK OFFICE

CERTIFICATE OF CORRECTION

PATENT NO. : 5,256,774

DATED : October 26, 1993

INVENTOR(S) : Harms, et al.

It is certified that error appears in the above-indentified patent and that said Letters Patent is hereby corrected as shown below:

Col. 138, last line Delete claim " 8 " and substitute claim -- 1 --

Signed and Sealed this

Twelfth Day of September, 1995

Attest:

BRUCE LEHMAN

Attesting Officer

Commissioner of Patents and Trademarks